United States Patent

Ohmori et al.

[11] Patent Number: 5,841,752
[45] Date of Patent: *Nov. 24, 1998

[54] DISC DRIVE UNIT

[75] Inventors: Kiyoshi Ohmori; Sunao Aoki, both of Kanagawa; Takeshi Funahashi, Saitama; Yoshikatsu Niwa, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 512,889

[22] Filed: Aug. 9, 1995

[30] Foreign Application Priority Data

Aug. 11, 1994 [JP] Japan .................... 6-189185

[51] Int. Cl.⁶ ............. G11B 33/02; G11B 17/04
[52] U.S. Cl. .............. 369/75.2; 369/77.2; 360/99.07
[58] Field of Search ................ 369/75.1, 75.2, 369/77.1, 77.2, 13; 360/114, 99.06, 99.07, 99.02, 99.03

[56] References Cited

U.S. PATENT DOCUMENTS

| | | | |
|---|---|---|---|
| 4,694,442 | 9/1987 | Gijzen et al. | 369/44 |
| 4,730,299 | 3/1988 | Kamoshita et al. | 369/264 |
| 4,899,238 | 2/1990 | Inoue et al. | 360/99.06 |
| 4,914,647 | 4/1990 | Ono et al. | 369/77.2 |
| 4,941,140 | 7/1990 | Ono et al. | 369/264 |
| 4,945,433 | 7/1990 | Suzuki et al. | 360/99 |
| 5,043,969 | 8/1991 | Carey et al. | 369/77.2 |
| 5,056,078 | 10/1991 | Carey et al. | 369/77.2 |
| 5,103,435 | 4/1992 | Nemoto et al. | 369/13 |
| 5,119,357 | 6/1992 | Tsuruta et al. | 369/75.2 |
| 5,122,998 | 6/1992 | Mizuno et al. | 369/13 |
| 5,123,004 | 6/1992 | Arai | 369/75.2 |
| 5,163,038 | 11/1992 | Arai | 369/77.2 |
| 5,182,742 | 1/1993 | Ohmori et al. | 369/116 |

(List continued on next page.)

FOREIGN PATENT DOCUMENTS

| | | |
|---|---|---|
| 349 279 A2 | 1/1990 | European Pat. Off. . |
| 0 415 543 A3 | 7/1990 | European Pat. Off. . |
| 0 427 330 A3 | 11/1990 | European Pat. Off. . |
| 0 439 286 A3 | 1/1991 | European Pat. Off. . |
| 0 509 531 A2 | 10/1992 | European Pat. Off. . |
| 0 532 247 A2 | 3/1993 | European Pat. Off. . |
| 0 564 148 A1 | 10/1993 | European Pat. Off. . |
| 0 571 227 A2 | 11/1993 | European Pat. Off. . |
| 0 579 172 A2 | 1/1994 | European Pat. Off. . |
| 3337 689 A1 | 4/1984 | Germany . |
| 57-30140 | 2/1982 | Japan . |
| 57-154669 | 9/1982 | Japan . |
| 63-173306 | 7/1988 | Japan . |
| 1-220257 | 9/1989 | Japan . |
| 3-19160 | 1/1991 | Japan . |
| 0 473 413 A3 | 4/1991 | Japan . |

(List continued on next page.)

*Primary Examiner*—Stuart S. Levy
*Assistant Examiner*—William J. Klimowicz
*Attorney, Agent, or Firm*—Limbach & Limbach L.L.P.

[57] ABSTRACT

A disc drive unit for driving a disc recording medium such as a magneto-optical disc accommodated in a disc cassette, comprises a chassis, a cassette holder having a pair of wall sections and moveable up and down between upper and lower positions with respect to the chassis, and the disc cassette being injectable into and ejectable from the cassette holder, a disc rotating mechanism being moveable up and down between upper and lower positions with respect to the chassis and chucked with the disc recording medium for rotatively driving the disc recording medium, height-level positioning members provided at the chassis, so that at least their upper ends are located at a higher level than the lower wall section of the cassette holder, when the cassette holder is held at its lower position, and a loading motor unit for shifting the cassette holder from its upper position to its lower position and for shifting the disc rotating mechanism from its lower position to its upper position, during loading of the disc cassette.

10 Claims, 41 Drawing Sheets

U.S. PATENT DOCUMENTS

| | | | |
|---|---|---|---|
| 5,187,701 | 2/1993 | Verheyen | 369/75.2 |
| 5,198,944 | 3/1993 | McReynolds et al. | 360/99.06 |
| 5,224,079 | 6/1993 | Inoue | 369/13 |
| 5,237,555 | 8/1993 | Tsuruta et al. | 369/77.2 |
| 5,251,195 | 10/1993 | Kawakami et al. | 369/75.2 |
| 5,268,882 | 12/1993 | Mukawa | 369/13 |
| 5,313,351 | 5/1994 | Lee | 360/99.07 |
| 5,473,593 | 12/1995 | Wheeler | 369/77.1 |
| 5,500,844 | 3/1996 | Kim et al. | 369/77.2 |
| 5,563,865 | 10/1996 | Wheeler | 369/77.1 |
| 5,623,457 | 4/1997 | Seto et al. | 369/13 |
| 5,636,198 | 6/1997 | Maeng | 369/191 |

FOREIGN PATENT DOCUMENTS

| | | |
|---|---|---|
| 3-80562 | 4/1991 | Japan . |
| 3-104069 | 5/1991 | Japan . |
| 4-79065 | 3/1992 | Japan . |
| 4-186555 | 7/1992 | Japan . |
| 5-62279 | 3/1993 | Japan . |
| 5-128616 | 5/1993 | Japan . |
| 5-334762 | 12/1993 | Japan . |
| 6-20326 | 1/1994 | Japan . |
| 6-4805 | 1/1994 | Japan . |

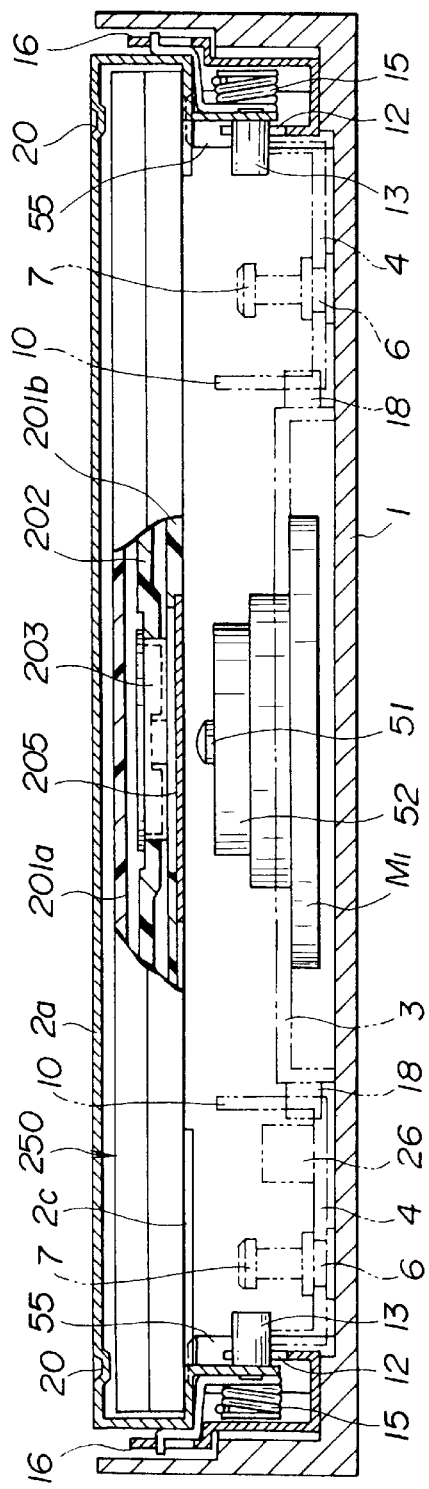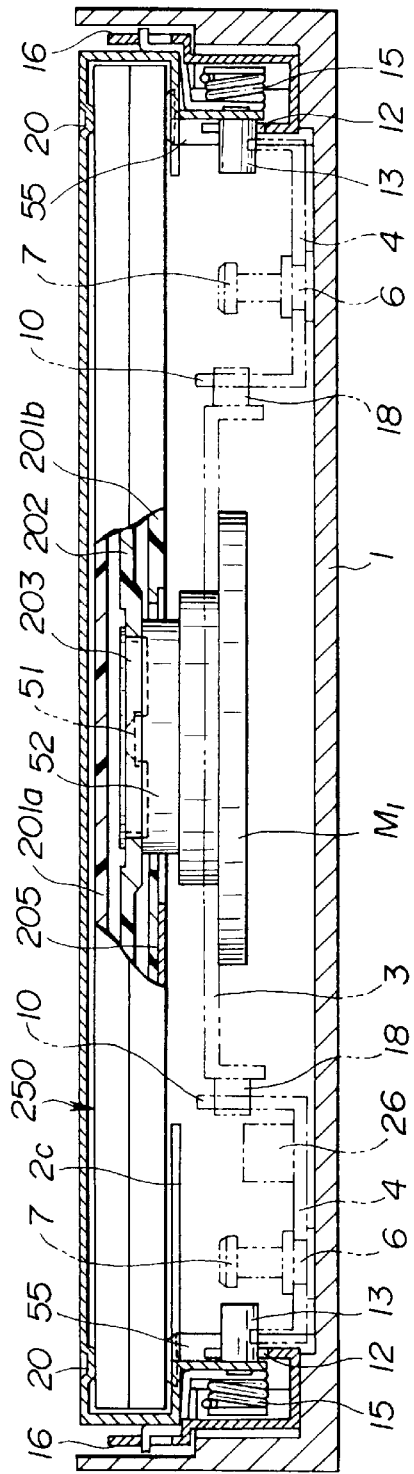

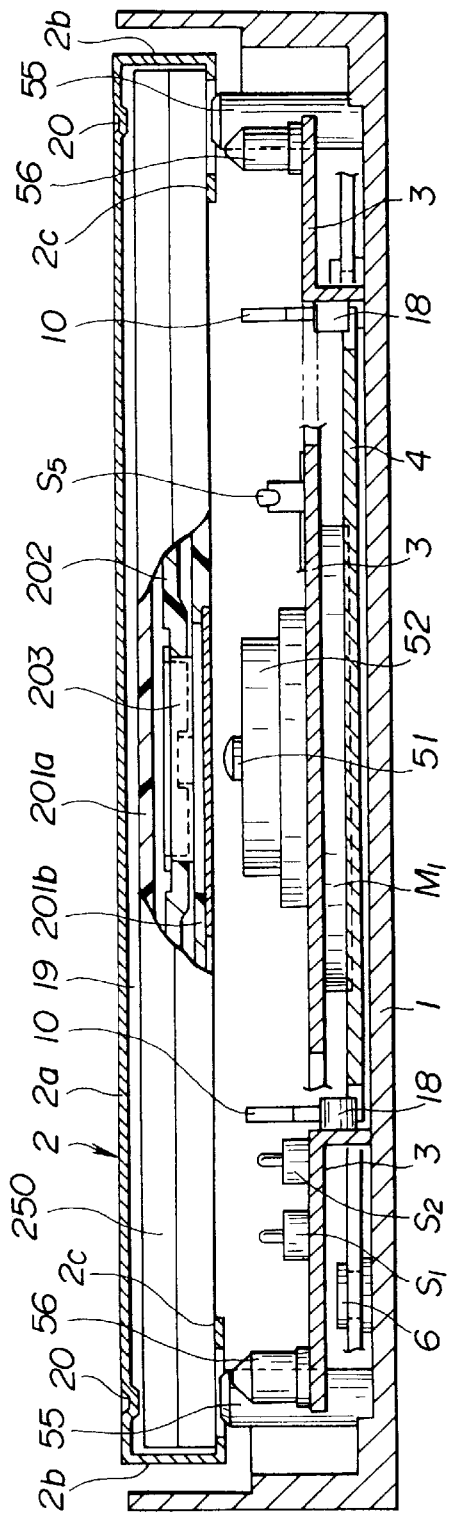
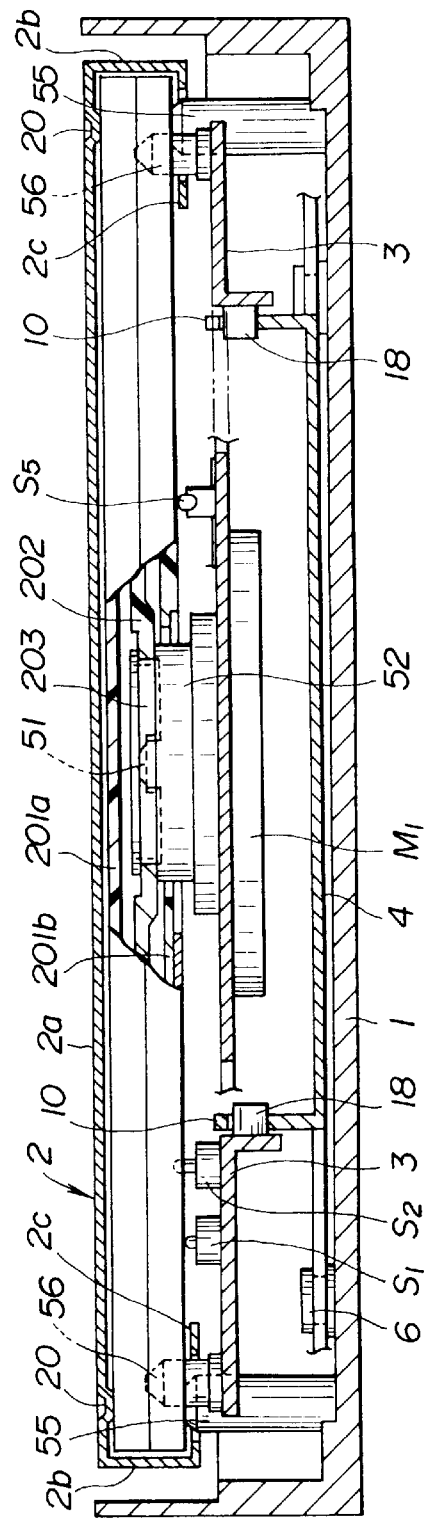
FIG. 14A
FIG. 14B 5,841,752

DISC DRIVE UNIT

BACKGROUND OF THE INVENTION

1. Field of the Invention

The present invention relates to a disc drive unit which is used to drive a recording medium such as a disc-like storage medium.

2. Description of the Related Art

A magneto-optical disc drive, which is capable of recording data by way of a magnetic field modulation direct-overwrite method, has been disclosed in copending U.S. patent application Ser. Nos. 08/090,918 and 08/228,682, now abandoned, both assigned to the assignee of the present application, the teachings of which are hereby incorporated by reference. Such a magneto-optical disc drive is hereinbelow detailed by reference to FIGS. 38 to 45.

Referring to FIGS. 38 through 45, a slide plate 211 is arranged on a chassis 210 so that the slide plate is slidable in directions indicated by the arrows A and A', and so that the slide plate is switched between an unloading position and a loading position. One end of a coil spring 213 is hanged to the slide plate 211, so that the slide plate 211 is urged toward its loading position (in the direction indicated by the arrow A) by way of contraction of the coil spring. A cassette holder 214 is fixedly mounted on the chassis 210 at a reference level by way of a plurality of support portions 210a. The cassette holder 214 is comprised of an upper wall section 214a, a lower wall section 214b and left and right side wall sections 214c in a manner so as to define an internal space which space is surrounded by these wall sections. The cassette holder 214 is constructed such that the disc cassette 250 is insertable into and ejectable out of the internal space defined in the holder. A shutter operating mechanism 330 is provided on the upper wall section 214a of the cassette holder 214, whereas an auto-inject mechanism 320 and a slide-plate lock mechanism 310 are provided on the lower wall section 214b of the cassette holder.

The auto-inject mechanism 320 has a first inject plate 215, a second inject plate 216, and a third inject plate 221. The first inject plate 215 is guided by a support pin 219 of the cassette holder 214 so that the first inject plate is moveable in the directions indicated by the arrows A and A'. The second inject plate 216 is rotatable about a pivotal shaft 217 of the first inject plate 215, so that the second inject plate 216 can rotate in the directions indicated by the arrows B and B'. A support pin 219 of the cassette holder 214 is inserted into a cam groove 218 of the second inject plate 216. The second inject plate 216 is formed with a cassette inject pin 220. The third inject plate 221 is arranged to be rotatable about a support shaft 222 of the cassette holder 214 so that the third inject plate 221 is rotatable in the directions indicated by the arrows C and C'. One end of the third inject plate 221 is engaged with the first inject plate 215. The third inject plate 221 is formed with a hold pin 223 at its another end. One end of a coil spring 224 is hanged to the third inject plate 221. By way of the coil spring 224, the third inject plate 221 is urged in the rotational direction indicated by the arrow C. In case that the slide plate 211 is positioned in the unloading position, an inject hold piece 225 of the slide plate 211 is engaged with the hold pin 223 of the third inject plate 221, so as to restrict the rotational motion of the third inject plate 221.

The slide-plate lock mechanism 310 has a nailed lock-plate 226. The nailed lock-plate 226 is rotatable about a support shaft 227, which shaft is fixedly connected onto the lower wall section 214b of the cassette holder 214, in the directions indicated by the arrows D and D' in FIGS. 38 and 39. Hanged to the nailed lock-plate 226 is one end of a coiled torsion spring 228. The nailed lock-plate 226 is forced in the direction indicated by the arrow D by means of the bias of the torsion spring. The slide plate 211 is locked in its unloading position by way of engagement between the nailed lock-plate 226 and a lock pin 229 attached to the slide plate 211.

A plurality of leaf-spring like cassette pushing portions 230a are provided on the upper wall section 214a of the cassette holder 214, in such a manner as to downwardly push the disc cassette 250 held in the cassette holder 214.

On the other hand, a disc rotating mechanism 340 has a spindle lifting plate 231 which plate is provided to be moveable upward and downward with respect to the chassis 210. The lifting plate 231 is operated between a downwardly-moved position shown in FIG. 41 and an upwardly-moved position shown in FIG. 42, while guiding the lifting plate 231 by a pair of sloped grooves 211a of the slide plate 211. Fixedly connected onto the spindle lifting plate 231 are a spindle motor 232 and a turn table 233.

A cassette positioning mechanism 350 has a pair of right and left positioning pins 234 which are formed on the spindle lifting plate 231 and upwardly extend from the plate 231. By way of the positioning pin pair 234, the positioning (in the horizontal direction) of the disc cassette 250 to the casing 201 of the disc cassette is made. The lower wall section 214b of the cassette holder 214 also serves as a positioning member necessary for the positioning (in the vertical direction) of the disc cassette 250 to the casing.

A cassette auto-eject mechanism 360 includes a loading motor $M_2$, and a reduction-gear box (not shown) which acts to reduce the output speed of the loading motor $M_2$ and to transmit increased output torque to an output pin 234m of the motor, and a bent piece 235m which is arranged in an engaging position of the output pin 234m so as to provide a sliding movement of the slide plate 211. When the loading motor $M_2$ is rotated in a direction indicated by an arrow R1 in FIG. 45, the slide plate 211 is moved in the direction indicated by the arrow A' by way of the rotational force of the motor, with the result that the slide plate is shifted from the loading position to the unloading position.

A shutter opening and closing mechanism 330 has a shutter opening pin 237 being moveable along a cam groove 236 and a coiled torsion spring 238 biasing the shutter opening pin 237 toward the start position (See FIGS. 38 and 39) of the pin 237. The slide plate 211 is held in its unloading position by way of engagement between the lock pin 229 of the slide plate 211 and the nailed lock-plate 226. The rotational motion of the third inject plate 221 is restricted by way of engagement between the inject hold piece 225 of the slide plate 211 and the hold pin 223 of the third inject plate 221, and thus the cassette inject pin 220 is held at the stand-by position. Under this condition, when the disc cassette 250 is inserted into the cassette holder 214, the inserted front end surface 201c of the disc cassette 250 pushes the shutter opening pin 237, and thus the shutter opening pin 237 is moved along the cam hole 236 against the bias of the coiled torsion spring 238, and whereby the shutter 205 is opened. When the disc cassette 250 is further inserted into the cassette holder 214, the inserted front end surface 201c of the disc cassette 250 pushes the release lever 226a, and consequently the nailed lock-plate 226 rotates in the direction indicated by the arrow D' against the bias of the coiled torsion spring 228. When the nailed lock-plate 226 is unlocked from the lock pin 229, the slide plate 211 moves in the direction (toward the loading position) indicated by the arrow A' against the bias of the coil spring 213. The movement of the slide plate 211 causes the third inject plate 221 to rotate in the direction indicated by the arrow C by way of contraction of the coil spring 224. The rotational movement of the third inject plate 221 causes the first inject plate 215 to move in the direction indicated by the arrow A' and causes the second inject plate 216 to rotate in the direction indicated by the arrow B. As a result, the cassette inject pin 220 is inserted into the cassette inject groove 208 of the disc cassette 250. When the first inject plate 215 further moves in the direction indicated by the arrow A, the cassette inject pin 220 pushes the casing 201, and as a result the disc cassette 250 is automatically injected into the cassette holder 214. The disc cassette can be inserted until the inserted front end surface 201c of the disc cassette 250 abuts the cassette stopper 239. In this manner, the disc cassette 250 is held in its loaded position. On the other hand, the slide plate 211 continues to slide even after the disc cassette 250 has been loaded and inserted into the cassette holder. As a consequence, the spindle lifting plate 231 is displaced from the downwardly-moved position shown in FIG. 41 to the upwardly-moved position shown in FIG. 42. Then, the turn table 233 is attracted to the hub 203 of the disc cassette 250, so that the magneto-optical disc 202 is conditioned in a particular state in which the disc 202 can be rotated by the spindle motor 232 and so that the positioning pin pair 234 is inserted into the associated positioning groove 206 of the disc cassette 250. That is, as seen in FIG. 42, the positioning (in the vertical direction) of the disc cassette 250 can be achieved by press-contact of the casing 201 onto the lower wall surface 214b of the cassette holder 214 by the aid of the cassette pushing portions 230a, whereas the positioning (in the horizontal direction) of the disc cassette 250 can be achieved by way of insertion of a pair of positioning pins 234 into the associated positioning grooves 206. With the above-noted arrangement of the prior art disc drive unit, since the cassette pushing portions 230a are arranged in such a manner as to project into the internal space of the cassette holder 214, the disc cassette 250 moves in the cassette holder 214, while being in sliding-contact with the cassette pushing portions 230a. As appreciated, the sliding-contact could function as a resistance during eject motion or inject motion of the disc cassette 250, and thus the disc cassette cannot smoothly inject into or eject from the cassette holder. To overcome the resistance due to the sliding-contact, the conventional disc drive requires a comparatively large-sized coil spring 224 employed in the auto-inject mechanism 320 to provide a large contraction of the spring 224. Necessarily, a required torque of the loading motor $M_2$ must be set at a comparatively high level, so as to overcome the large contraction of the spring 224. Furthermore, the durability of the disc cassette may be degraded, owing to the sliding motion of the pushing portions 230a on the upper surface of the disc cassette 250.

Reference numeral 370 denotes a head mechanism. The head mechanism 370 has a head carriage 236m. As seen in FIGS. 43 to 45, the head carriage 236m is provided to be moveable in a radial direction of the magneto-optical disc 202. The head carriage 236m is equipped with an optical head (optical pick-up) including an objective lens 78 and a magnetic head 80, both opposing to each other. The magnetic head 80 is mounted on the head carriage 236m through a leaf-spring like head arm 81. As shown in FIG. 45, a magnetic-head lifting mechanism 380 includes the loading motor $M_2$, the reduction-gear box (not shown) which acts to reduce the output speed of the loading motor $M_2$ and to transmit the increased output torque to the output pin 234m, a linear-motion to rotational-motion converter 382 provided for applying a rotational force to a lifter 240 by way of angular displacement of the output pin 234m, and the lifter 240 pivotally supported on the head carriage 236m. The linear-motion to rotational-motion converter 382 has a slider 241 which slides in the directions indicated by the arrows B and B' by way of the angular displacement of the output pin 234m, a first lifter control member 242 and a second lifter control member 243 both control members rotating according to the angular displacement of the slider 241. Rotational movement of the first lifter control member 242 in the direction indicated by the arrow C causes a lever portion 240a of the lifter 240 to be pushed downward, and thus the lifter 240 is shifted to its upper position. Rotational movement of the second lifter control member 243 in the direction indicated by the arrow D causes the lever portion 240a of the lifter 240 to be pushed upward, and thus the lifter 240 is shifted to its lower position. The lifter 240 is rotated between the upper and lower positions. With the lifter located in the upper position, as indicated by the solid line of FIG. 45, the magnetic head 80 is positioned in its unloading state wherein the magnetic head is upwardly located away from the magneto-optical disc 202. With the lifter located in the lower position, as indicated by the phantom line of FIG. 45, the magnetic head 80 is positioned in its loading state wherein the magnetic head is in close vicinity to the magneto-optical head 202. That is to say, the loading motor $M_2$ and the reduction-gear box (not shown) are common to the cassette auto-eject mechanism 360 and the magnetic-head lifting mechanism 380. The cassette eject operation is achieved by rotating the output pin 234m in the direction indicated by the arrow R1, while the magnetic head lifting operation is achieved by rotating the output pin 234m in the direction indicated by the arrow R2. Conventionally, it is desirable that the cassette eject operation should be as fast as possible. For instance, in case that diskettes are mounted on a jukebox, an exchanging speed at which one diskette is exchanged for another, is very important. The exchanging speed is highly dependent on an eject speed of the cassette. In contrast, it is desirable that the head descending operation should be as slow as possible, in order to prevent undesirable scratch on the surface of the disc, resulting from contact between the magnetic head 80 and the disc surface, and the problem of focusing-error. For the reasons as set out above, in consideration of harmonization of both the cassette eject operation and the head descending operation, the rotational speed (a medium speed) of the loading motor $M_2$ would be determined. However, the determined speed satisfied neither the cassette eject speed nor the head descending speed.

SUMMARY OF THE INVENTION

It is, therefore an object of the present invention to provide an improved disc drive unit which avoids the foregoing disadvantages.

It is another object of the invention to provide a disc drive unit which can ensure a smooth inject motion and a smooth eject motion of the disc cassette to and from the cassette holder.

It is a further object of the invention to provide a disc drive unit which is capable of performing a quick eject operation of a cassette and preventing problems of the scratch of a disc surface during descending a head and the focusing-error.

In order to accomplish the aforementioned objects, a disc driving apparatus for driving a disc recording medium accommodated in a disc cassette, the apparatus comprises a chassis, a cassette holder having an upper wall section and a lower wall section spaced apart from the upper wall section by a distance slightly greater than a thickness of the disc recording medium, and being moveable up and down between an upper position and a lower position with respect to the chassis, and the disc cassette being injectable into and ejectable from an internal space defined between the upper and lower wall sections, a disc rotating mechanism provided to be moveable up and down between an upper position and a lower position with respect to the chassis, and being chucked with the disc recording medium, for rotatively driving the disc recording medium, height-level positioning members provided at the chassis, so that at least an upper end of each of the height-level positioning members is located at a higher level than the lower wall section of the cassette holder, when the cassette holder is held at its lower position, and moving means for moving the cassette holder from its upper position to its lower position and for shifting the disc rotating mechanism from its lower position to its upper position, during loading of the disc cassette. With the above-noted arrangement, a sliding-contact between the cassette holder and the disc cassette is effectively avoided during the cassette eject or during the cassette inject.

The height-level positioning members are provided on four places of the chassis, to support a bottom of the disc cassette in a vicinity of four corners of the disc cassette having a substantially square shape. The cassette holder has projected portions downwardly projecting from its upper wall section so that the projected portions face the respective height-level positioning members. The moving means comprises a loading motor and a gear being rotatively driven by the loading motor and having a motion transmission area in which a toothed portion is formed within a first predetermined angular range of the gear and a dead area in which a non-toothed portion is formed within a second predetermined angular range of the gear. The apparatus further comprises a flexible base plate attached to the disc rotating mechanism so that a portion of the flexible base plate is deformable elastically, and a temperature sensor being attached to the portion of the flexible base plate to abut with a lower surface of the disc cassette when the disc rotating mechanism is held in its upper position. The apparatus may further comprise a magnetic head applying a magnetic field to the disc recording medium consisting of a magneto-optical disc, a magnetic-head moving mechanism moving the magnetic head from its loading position to its unloading position, an eject mechanism ejecting the disc cassette, a motor, transmission means for transmitting a rotational force of the motor to the magnetic-head moving mechanism by rotation of the motor in its one rotational direction and for transmitting the rotational force of the motor to the eject mechanism by rotation of the motor in its other rotational direction, and control means for controlling the motor so that a rotational speed of the motor in the other rotational direction is faster than a rotational speed of the motor in the one rotational direction.

According to another aspect of the invention, a disc driving apparatus for driving a magneto-optical disc recording medium accommodated in a disc cassette, the apparatus comprises a magnetic head for applying a magnetic field to a magneto-optical disc, a magnetic-head moving mechanism for moving the magnetic head between a loading position and an unloading position, an eject mechanism for ejecting the disc cassette, a motor, transmission means for transmitting a rotational force of the motor to the magnetic-head moving mechanism by rotation of the motor in its one rotational direction, and for transmitting the rotational force of the motor to the eject mechanism by rotation of the motor in its other rotational direction, and control means for controlling the motor so that a rotational speed of the motor in the other rotational direction is faster than a rotational speed of the motor in the one rotational direction, in order to ensure a quick ejecting operation of the disc cassette. When the magnetic-head moving mechanism is driven by the motor, the control means controls the motor to rotate the motor at a comparatively fast speed for a predetermined period of time at a beginning of rotation of the motor, and to rotate the motor at a comparatively slow speed after the predetermined period of time has elapsed, in order to prevent problems of the scratch of a disc surface during descending the magnetic head and the focusing-error.

BRIEF DESCRIPTION OF THE DRAWINGS

FIG. 5A is a perspective view illustrating the cassette holder, whereas

FIG. 13A is a lateral cross-sectional view illustrating the disc drive unit in the cassette stand-by state, whereas FIG. 13B is a lateral cross-sectional view illustrating the disc drive unit in the cassette loading state.

FIG. 14A is a lateral cross-sectional view illustrating the disc drive unit in the cassette stand-by state, whereas FIG. 14B is a lateral cross-sectional view illustrating the disc drive unit in the cassette loading state.

FIG. 22A is a perspective view illustrating an installation state of a temperature sensor, whereas

DESCRIPTION OF THE PREFERRED EMBODIMENTS

Figure 1:
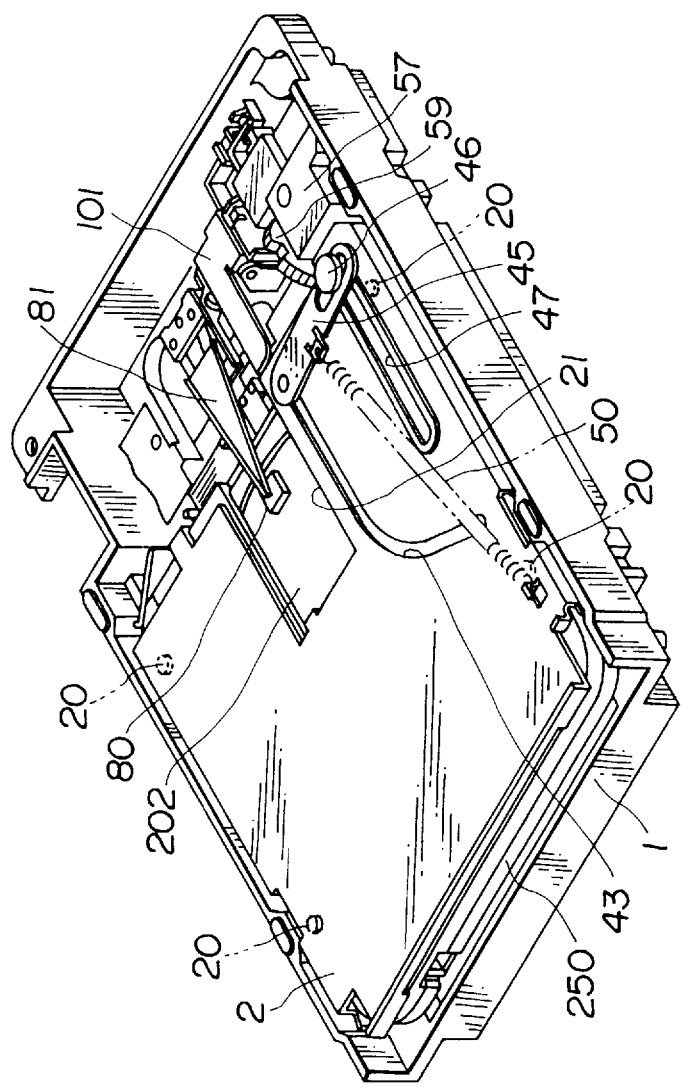
FIG. 1 is a perspective view illustrating a disc drive unit of the present invention.

Hereinafter explained in accordance with the drawings is the embodiment of the present invention. Referring to FIGS. 1 to 37, there is shown one embodiment of the disc drive unit according to the invention. In the shown embodiment, the same reference numerals used in the previously-noted disc drive unit shown in FIGS. 38 to 45 will be applied to the corresponding elements used in the preferred embodiment of FIGS. 1 to 37, for the purpose of comparison between the previously proposed disc drive unit and the improved disc drive unit of the present invention.

Figure 36:
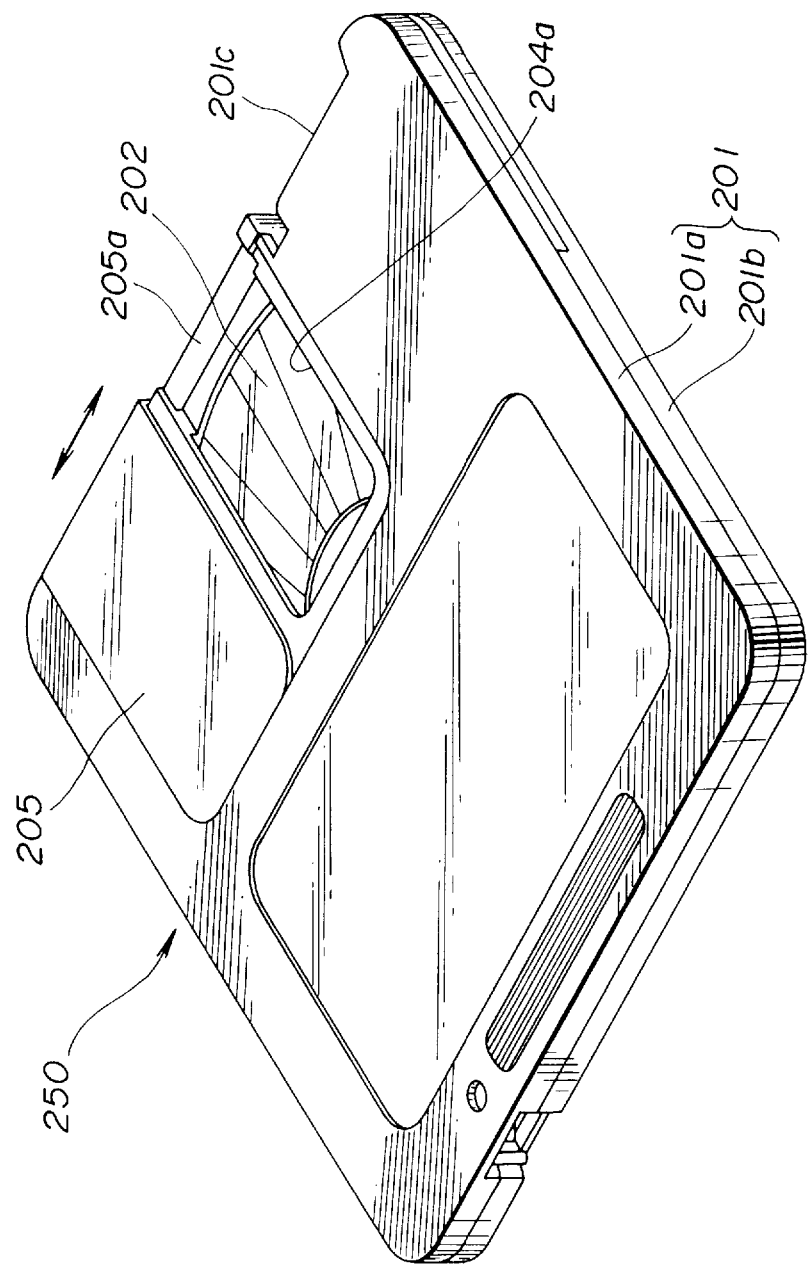
FIG. 36 is a perspective view illustrating the disc cassette, viewing the upper side.
Figure 37:
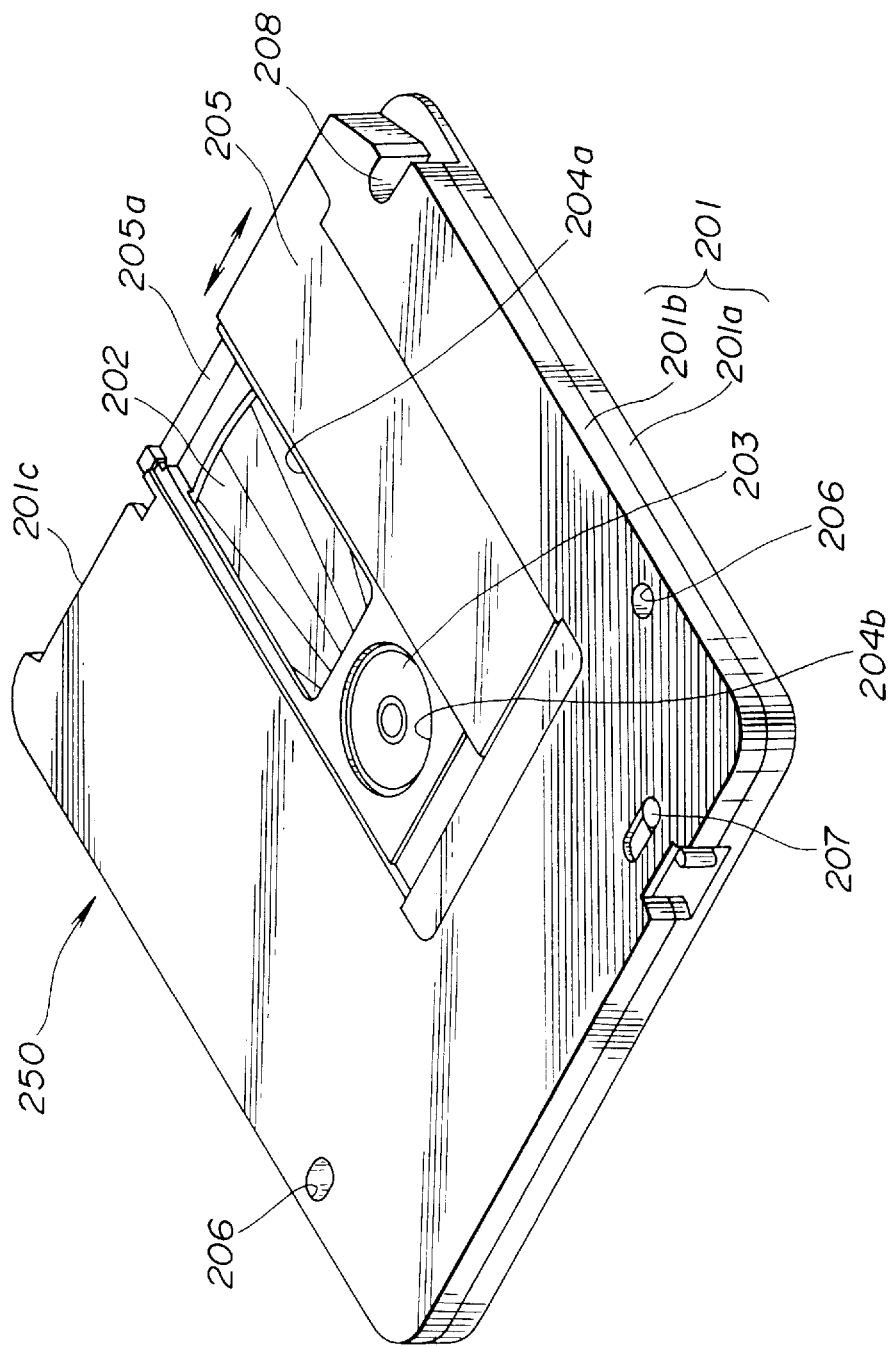
FIG. 37 is a perspective view illustrating the disc cassette, viewing the lower side.
Figure 38:
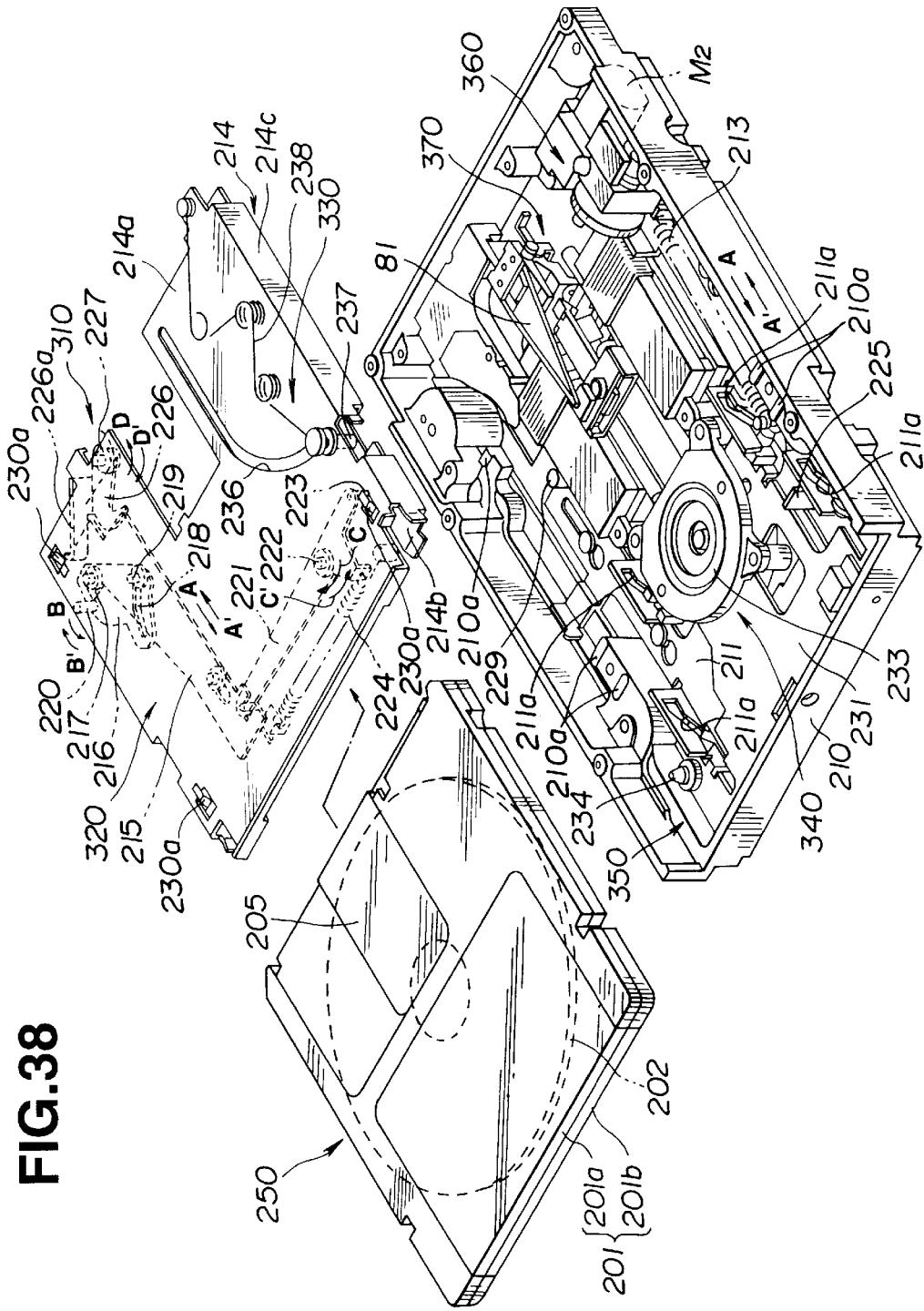
FIG. 38 is an exploded perspective view illustrating a previously proposed disc drive unit.
Figure 39:
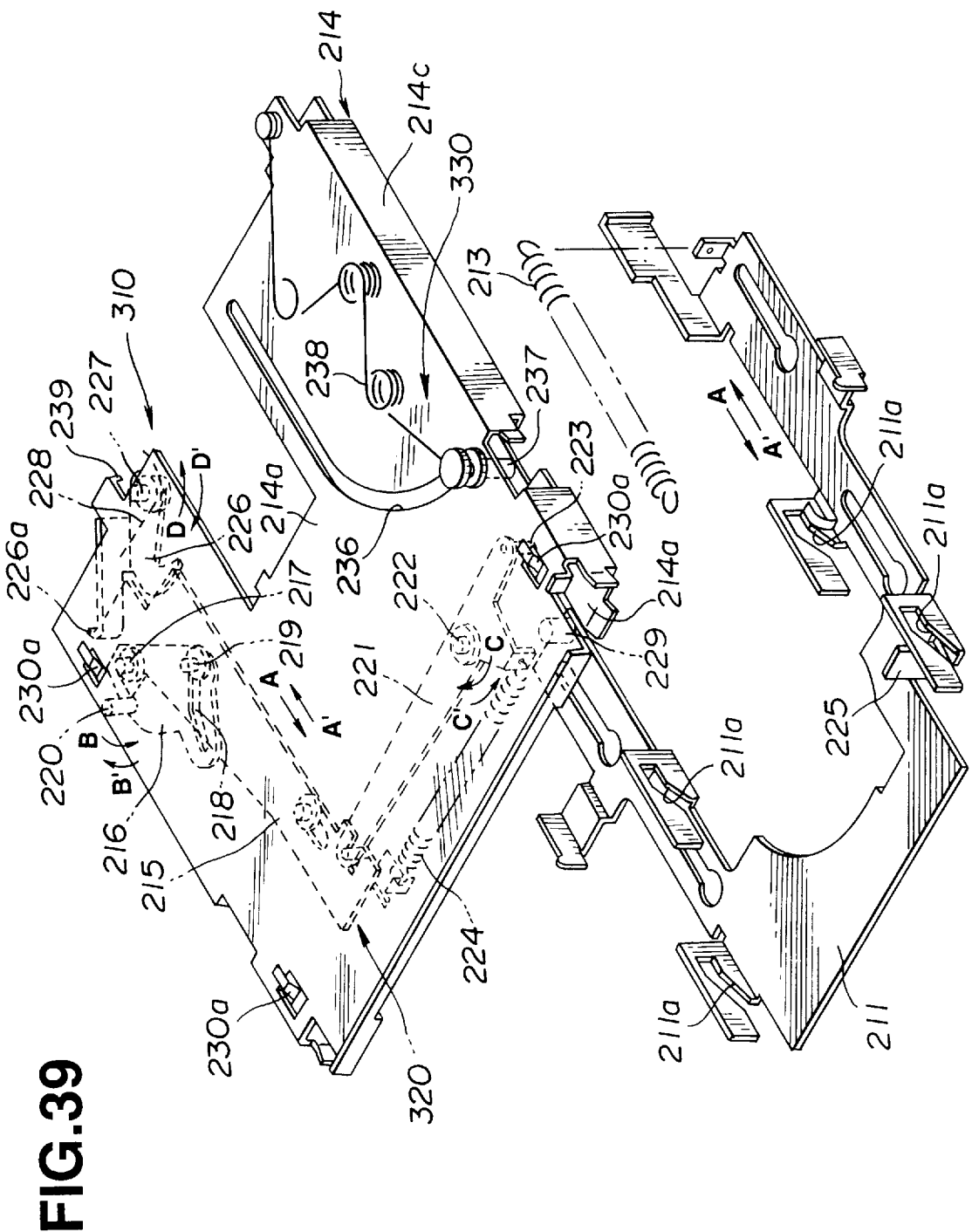
FIG. 39 is an exploded perspective view illustrating the previously proposed disc drive unit except the cassette holder.
Figure 40:
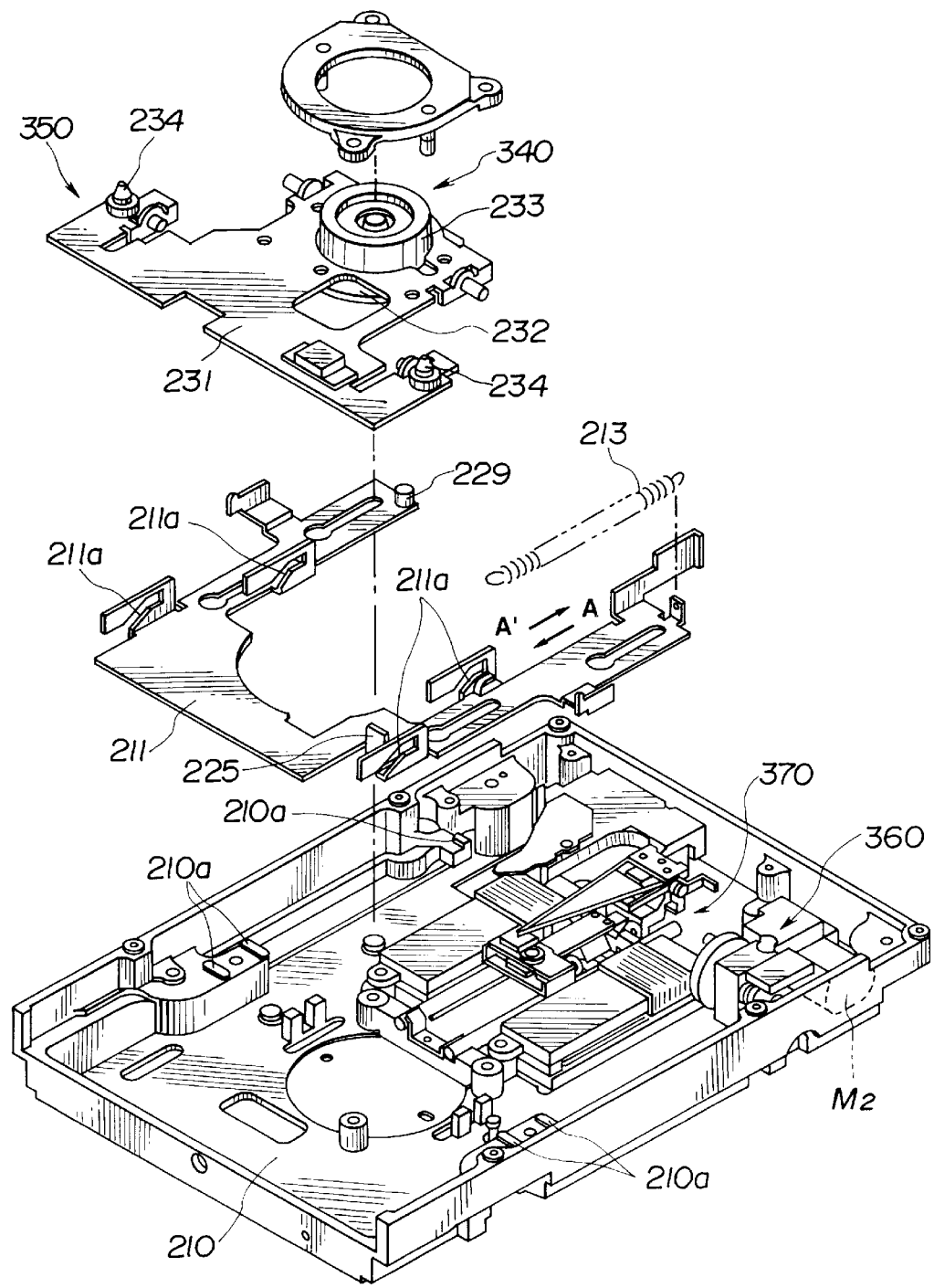
FIG. 40 is a perspective view illustrating a head mechanism and a magnetic head lifting mechanism of the previously proposed disc drive unit.
Figure 41:
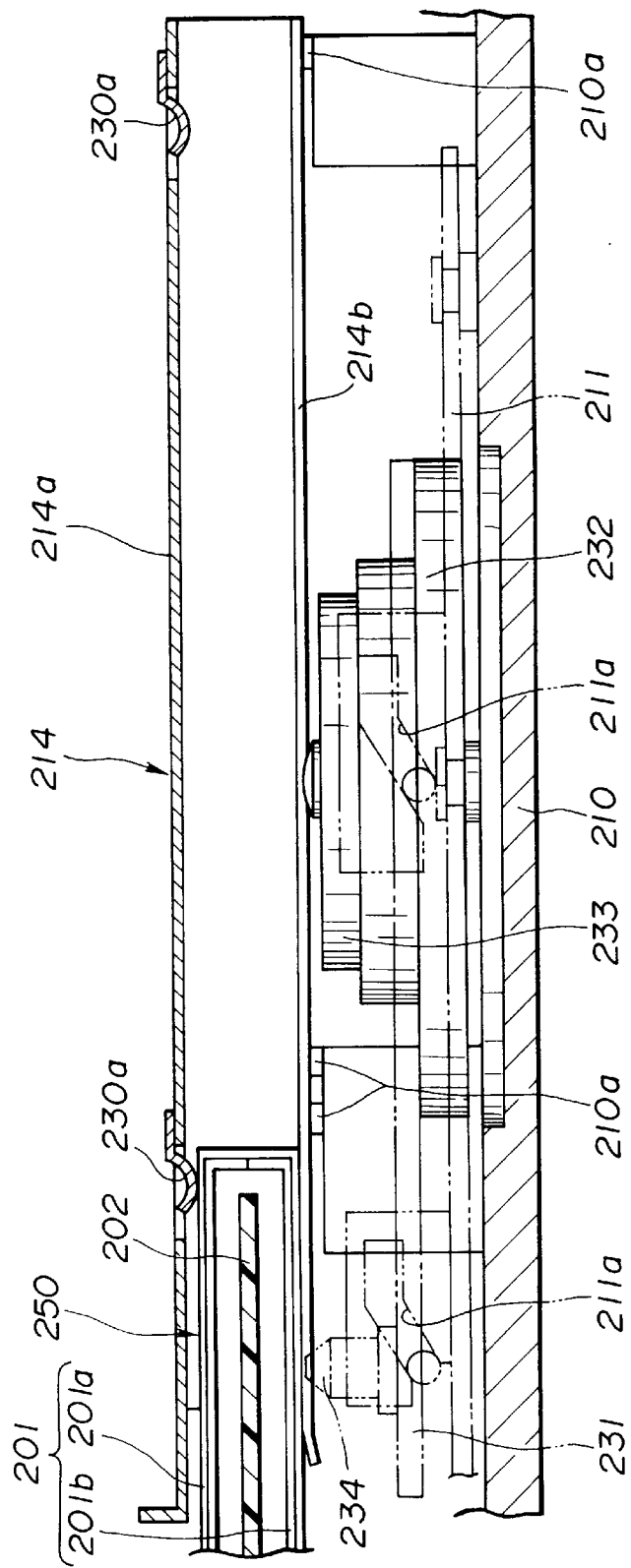
FIG. 41 is a longitudinal cross-sectional view illustrating the previously proposed disc drive unit during insertion of the cassette.
Figure 42:
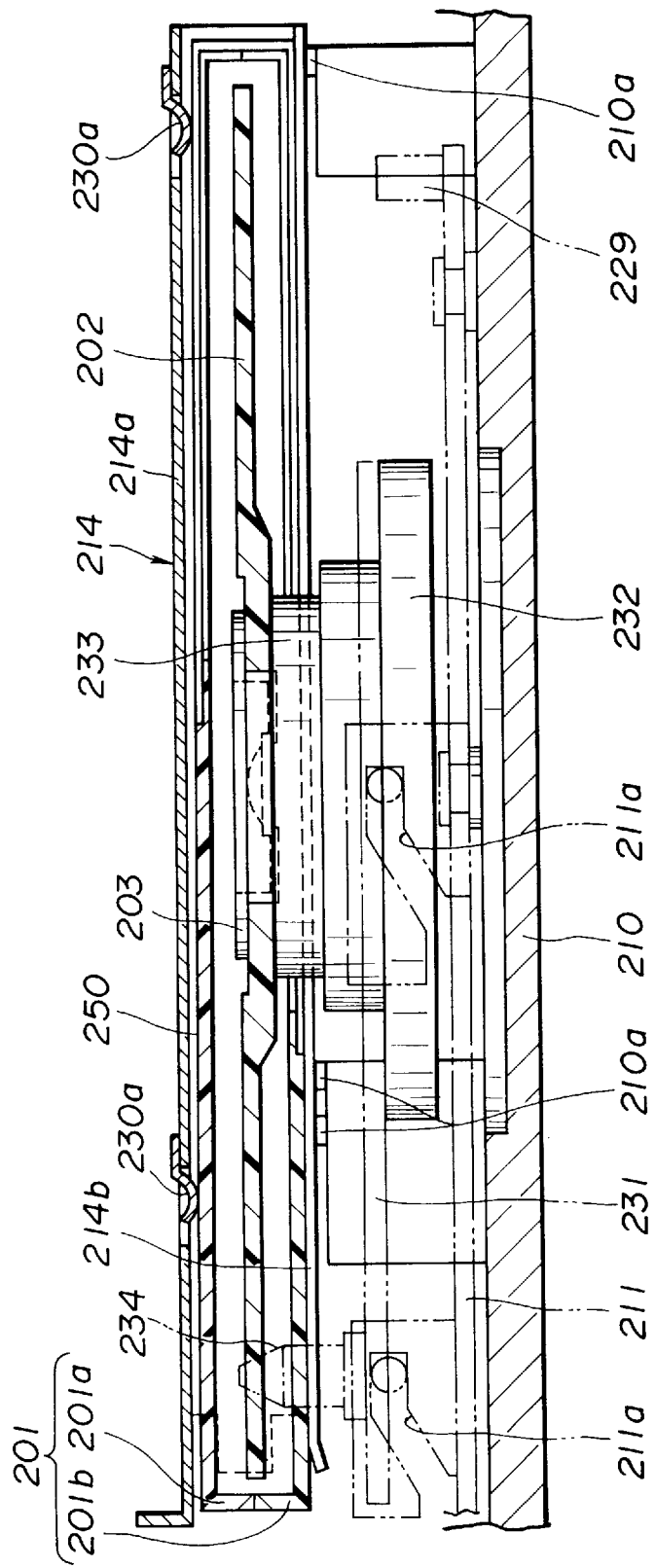
FIG. 42 is a longitudinal cross-sectional view illustrating the previously proposed disc drive unit in the cassette loaded state.
Figure 43:
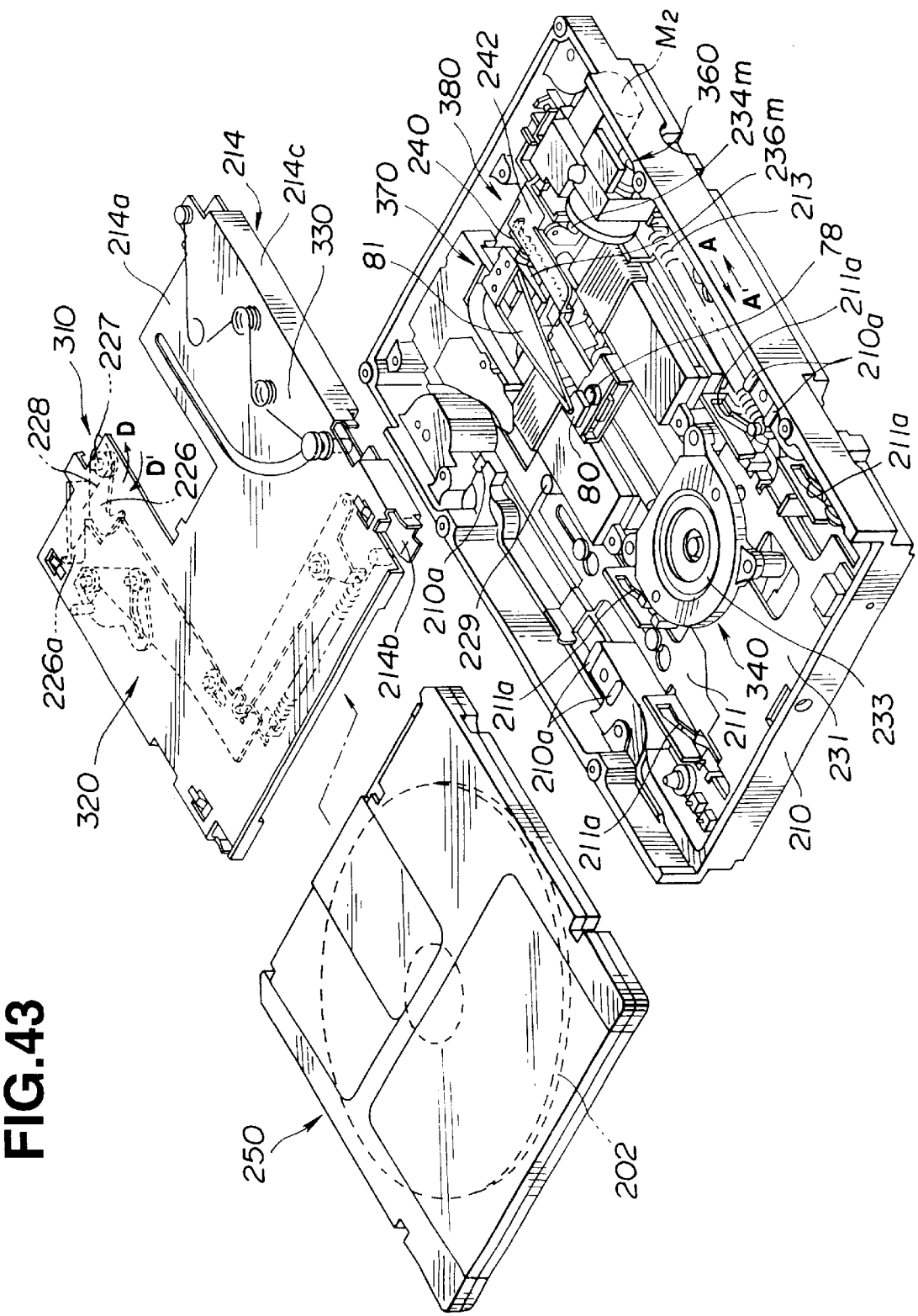
FIG. 43 is an exploded perspective view illustrating a previously proposed disc drive unit, indicating a head mechanism and a magnetic-head lifting mechanism in more detail.
Figure 44:
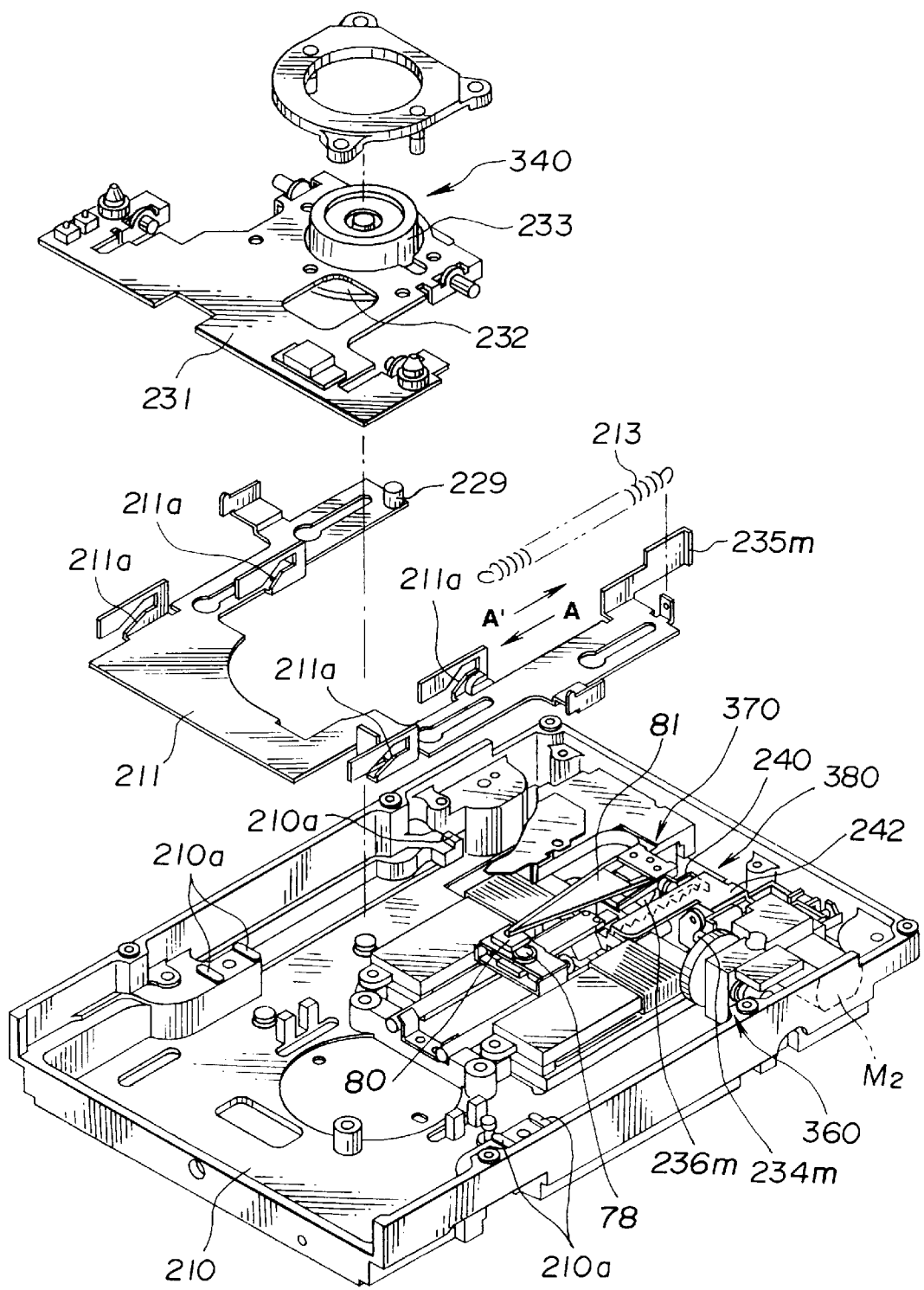
FIG. 44 is an exploded perspective view illustrating the previously proposed disc drive unit except the cassette holder, indicating the head mechanism and the magnetic-head lifting mechanism in detail.
Figure 45:
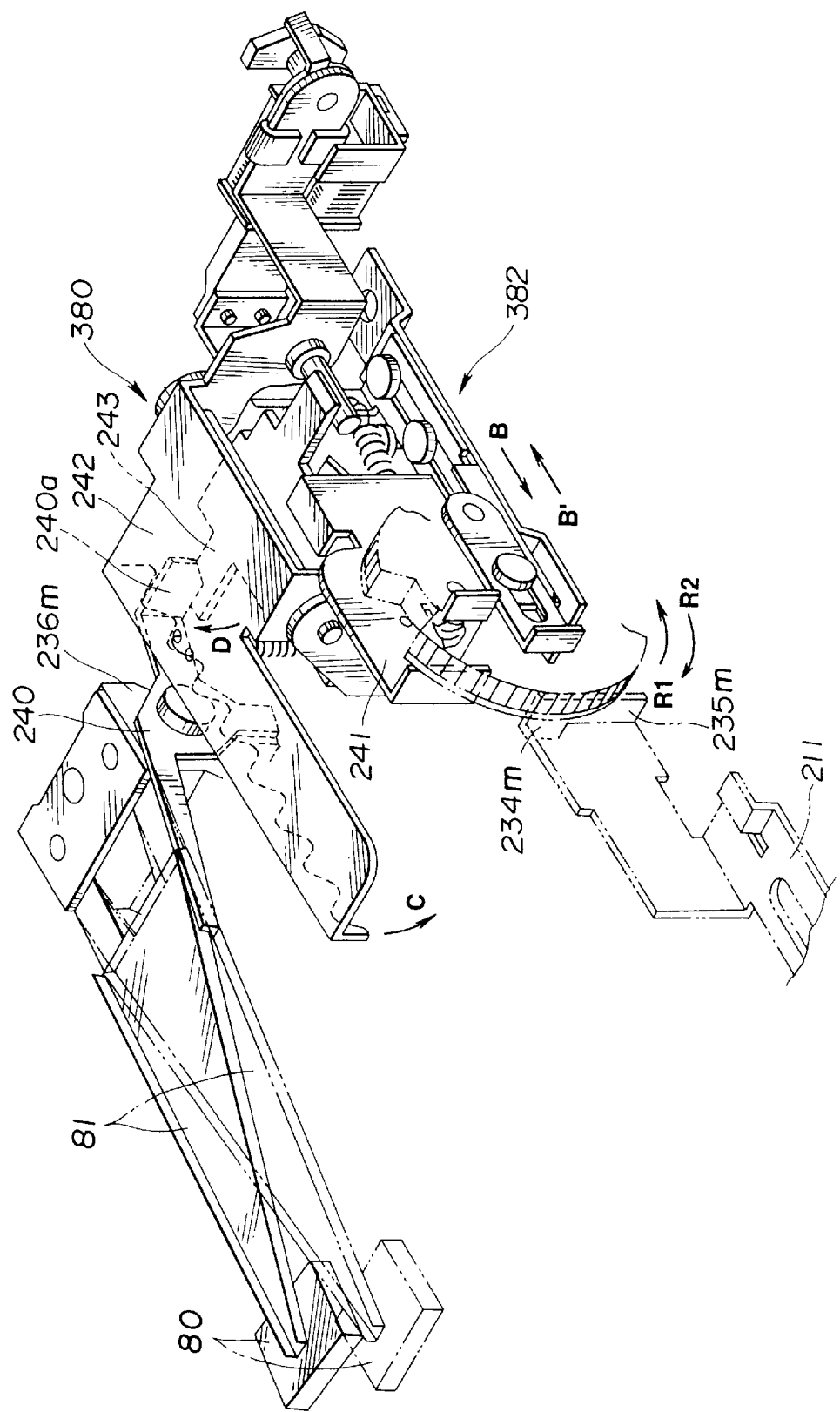
FIG. 45 is a perspective view illustrating the head mechanism and the magnetic head lifting mechanism of the previously proposed disc drive unit.

Referring now to FIGS. 36 and 37, there is shown a disc cassette 250 which is injectable into or ejectable from the disc drive unit. In FIGS. 37 and 38, a magneto-optical disc 202 of the disc cassette 250 is rotatably accommodated in a flat square casing 201 of the disc cassette. A metallic hub 203 is fixed to the center portion of the magneto-optical disc 202. The hub 203 is attracted onto a turn table 52 of the disc drive unit, in the cassette loaded state. The casing 201 is constructed by an upper half 201a and a lower half 201b, such that the upper and lower halves 201a and 201b are integrally connected to each other under abutment between the halves. Each of the upper and lower halves 201a and 201b opposing to each other, is formed with an opening 204a. The lower half 201b is also formed with a hub hole 204b. A part of the magneto-optical disc 202 is exposed to the outside through each opening 204a of the upper and lower halves 201a and 201b. A hub 203 is exposed to the outside through the hub hole 204b of the lower half 201b. A shutter 205 is also provided at the casing 201 so that the shutter is slidable in the direction indicated by the arrow of FIGS. 36 and 37. By way of the shutter 205, the openings 204a and the hub hole 204b can be opened and closed. One end of a coiled torsion spring (not shown) is hanged to the shutter 205, such that the shutter 205 is normally biased to its closed position by way of the bias of the coiled torsion spring. FIGS. 36 and 37 show the open position of the shutter 205. The shutter 205 is mounted on a bridge-like slider 205a. The bridge-like slider 205a is slidably provided along the inserted front end surface 201c of the casing 201. A pair of positioning grooves 206 are formed at the laterally symmetrical positions at the rear end in the cassette insertion direction of the lower half 201b. By way of insertion of the positioning pins of the disc drive unit into the positioning grooves 206, the positioning of the disc cassette 250 with respect to its planar direction is achieved. In the shown embodiment, the disc cassette 250 accommodates therein a magneto-optical disc and thus used as a RAM (random access memory). A write protect member 207 is slidably provided at the rear end of the cassette of the casing 201. Depending on the position of the write protect member 207, it is determined whether write is enable or disable. In case of a disc cassette used as a ROM (read only memory) in which a read-only optical disc is accommodated in the disc cassette in lieu of an magneto-optical disc, a write protect member 207 is not provided. Furthermore, provided at the one side of the front end (in the cassette insertion direction) of the cassette of the casing 201 is a cassette inject groove 208 through which the cassette is injected into the interior. (Disc drive unit)

Figure 2:
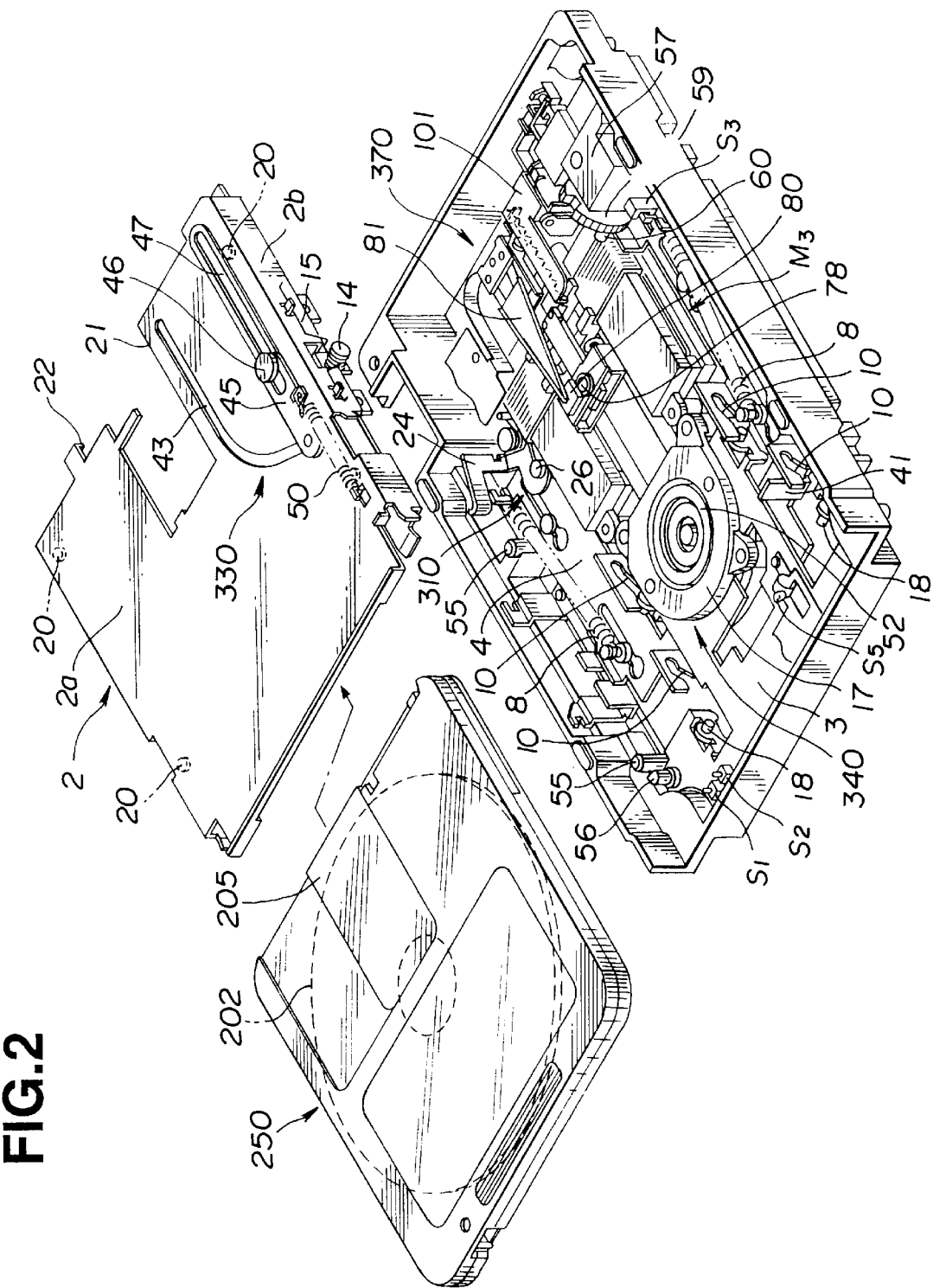
FIG. 2 is an exploded perspective view illustrating the disc drive unit shown in FIG. 1.
Figure 3:
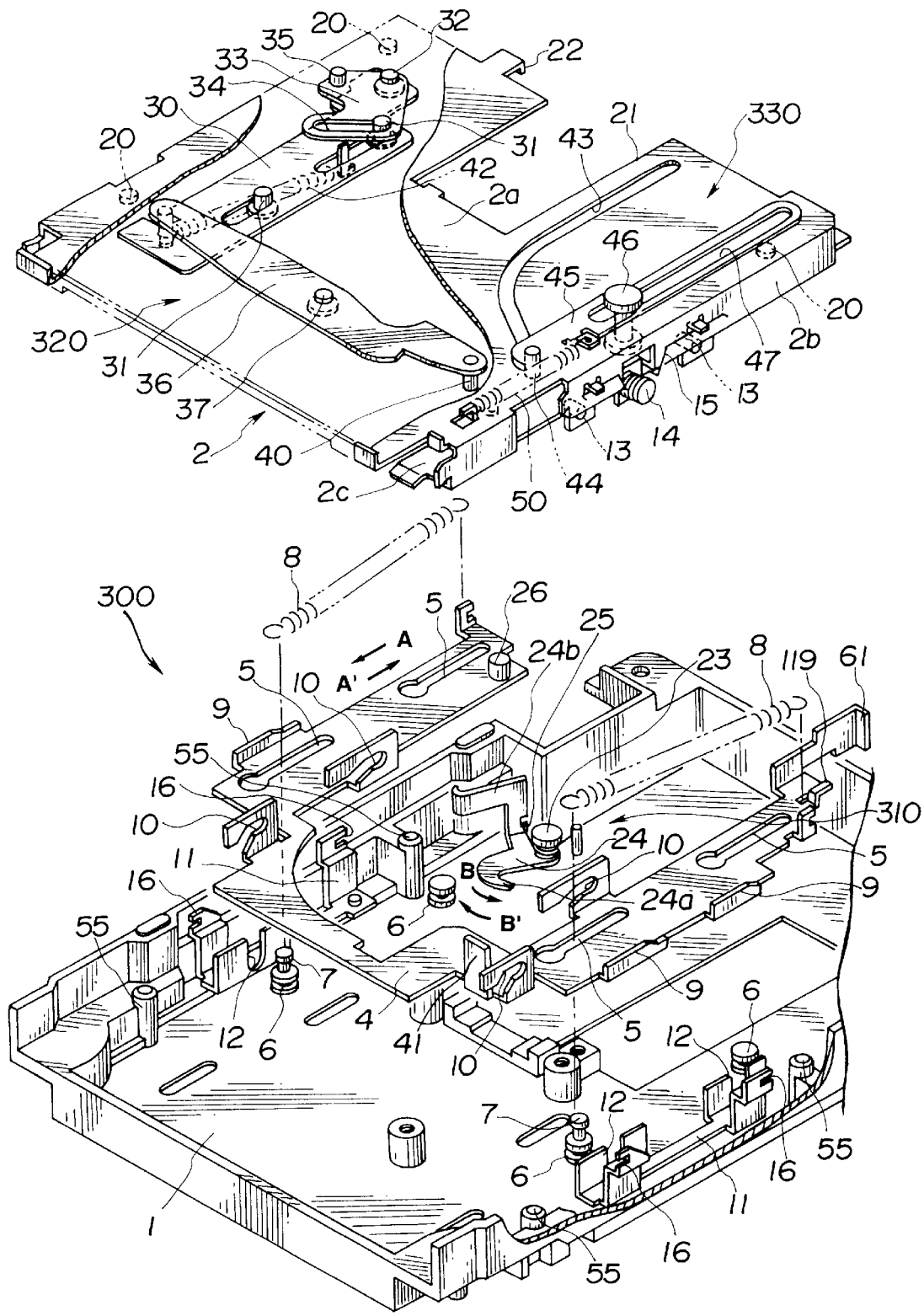
FIG. 3 is an exploded perspective view illustrating a cassette holder and a slide plate and others, according to the invention.
Figure 4:
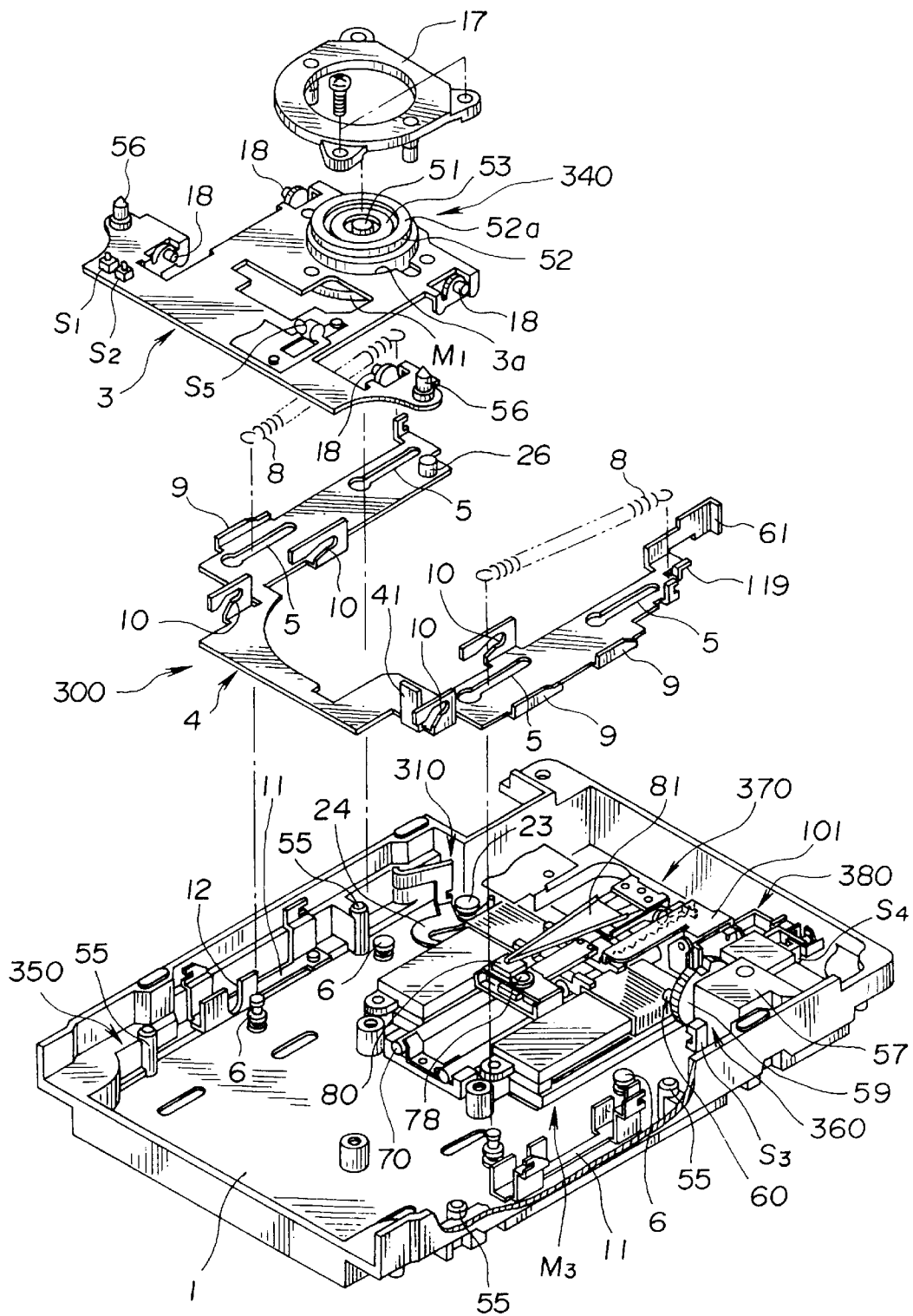
FIG. 4 is an exploded perspective view illustrating the slide plate and a spindle lifting plate and others, according to the invention.
Figure 6:
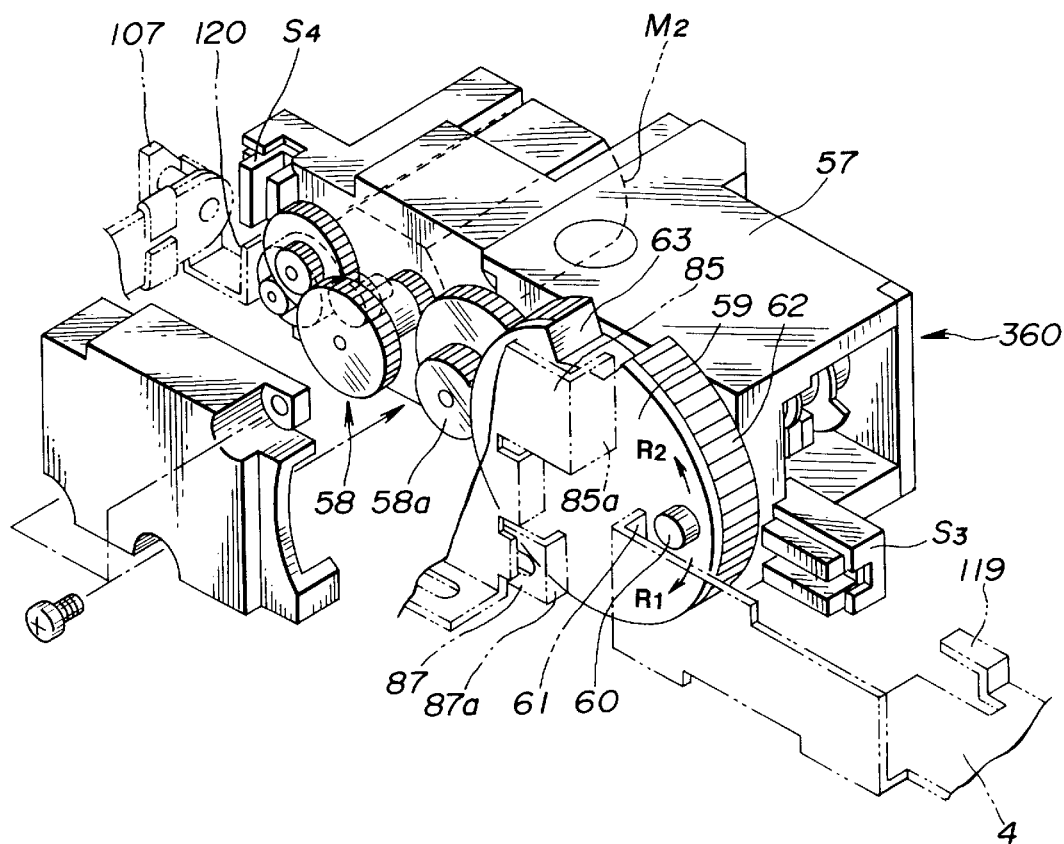
FIG. 6 is a perspective view illustrating a cassette eject mechanism.
Figure 7:
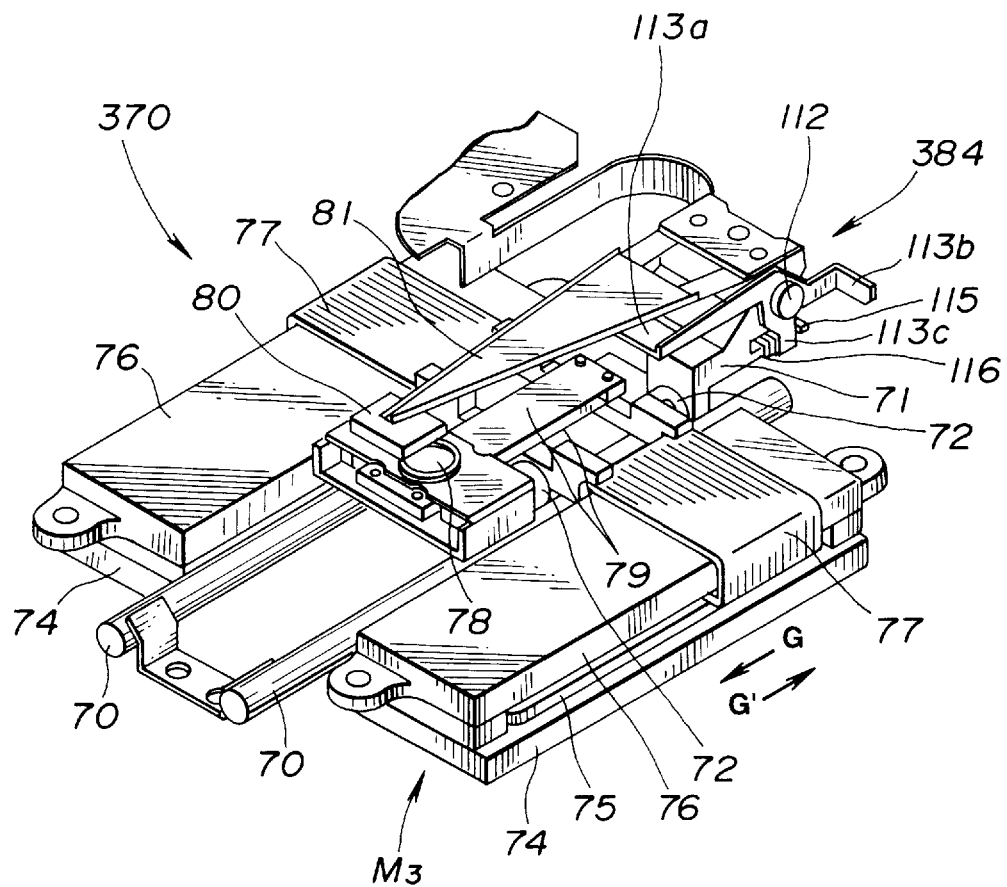
FIG. 7 is a perspective view illustrating a head mechanism.
Figure 8:
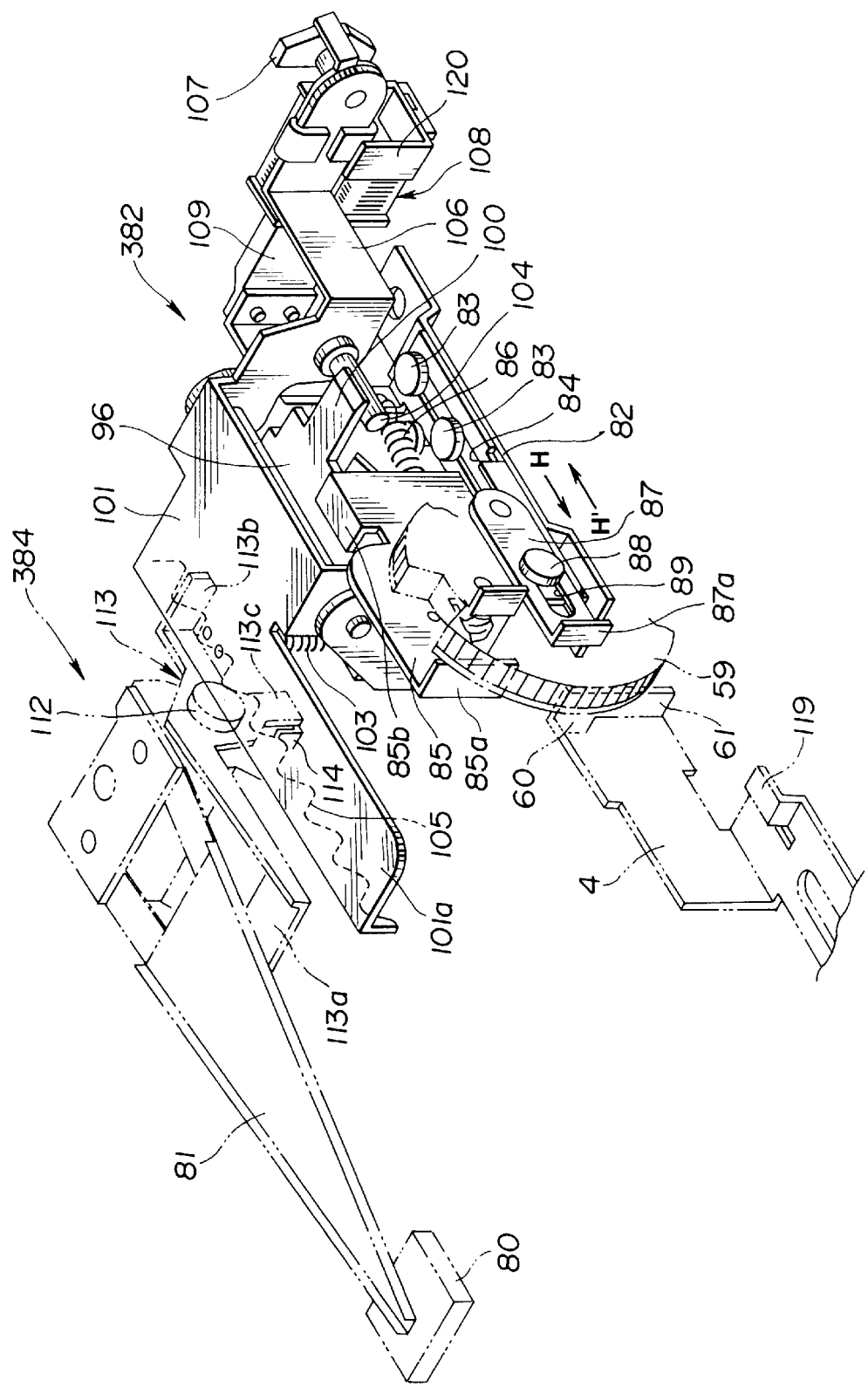
FIG. 8 is a perspective view illustrating a magnetic head lifting mechanism.
Figure 9:
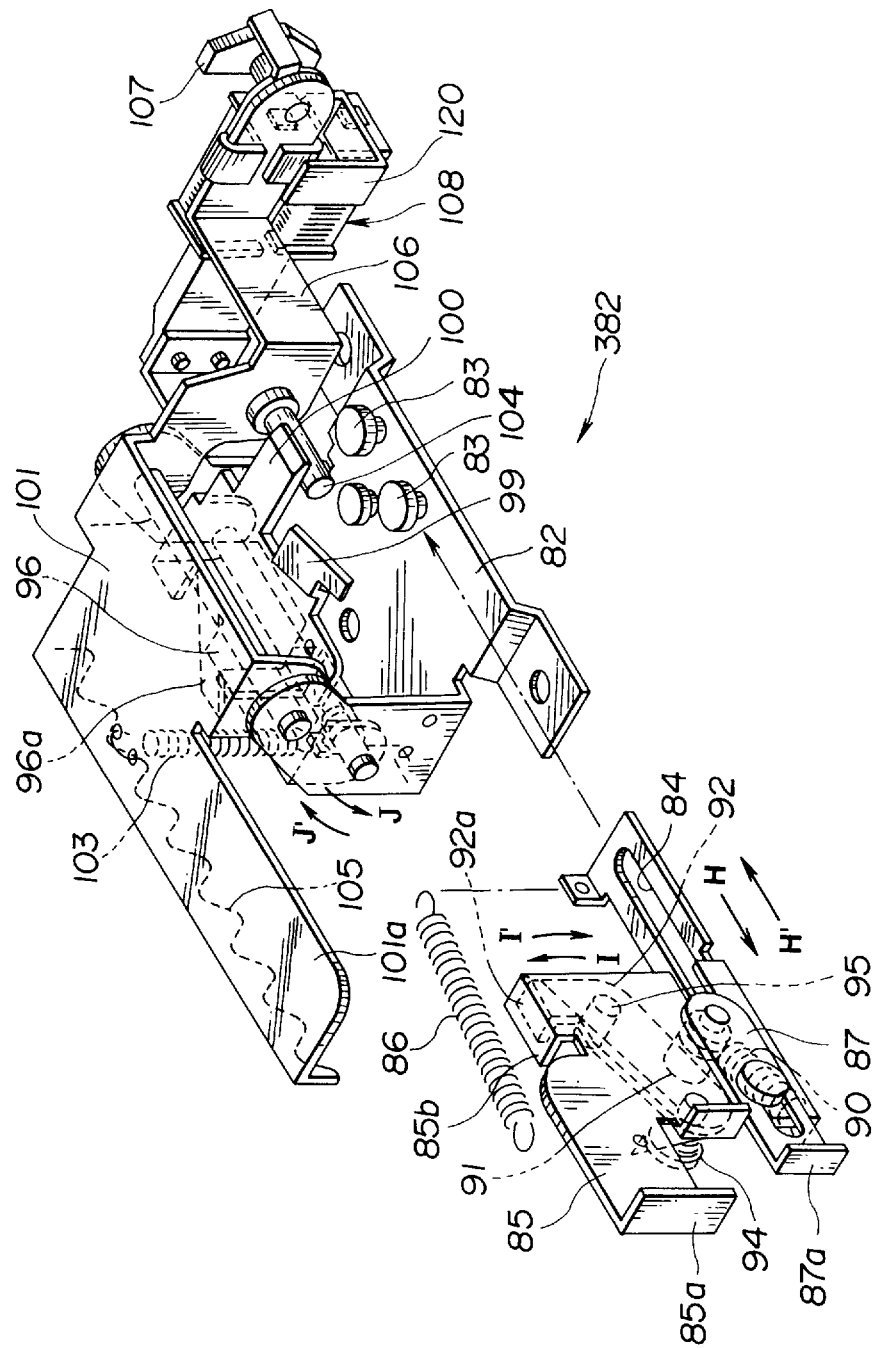
FIG. 9 is a perspective view illustrating a linear-motion to rotational-motion converter of the magnetic head lifting mechanism.
Figure 10:
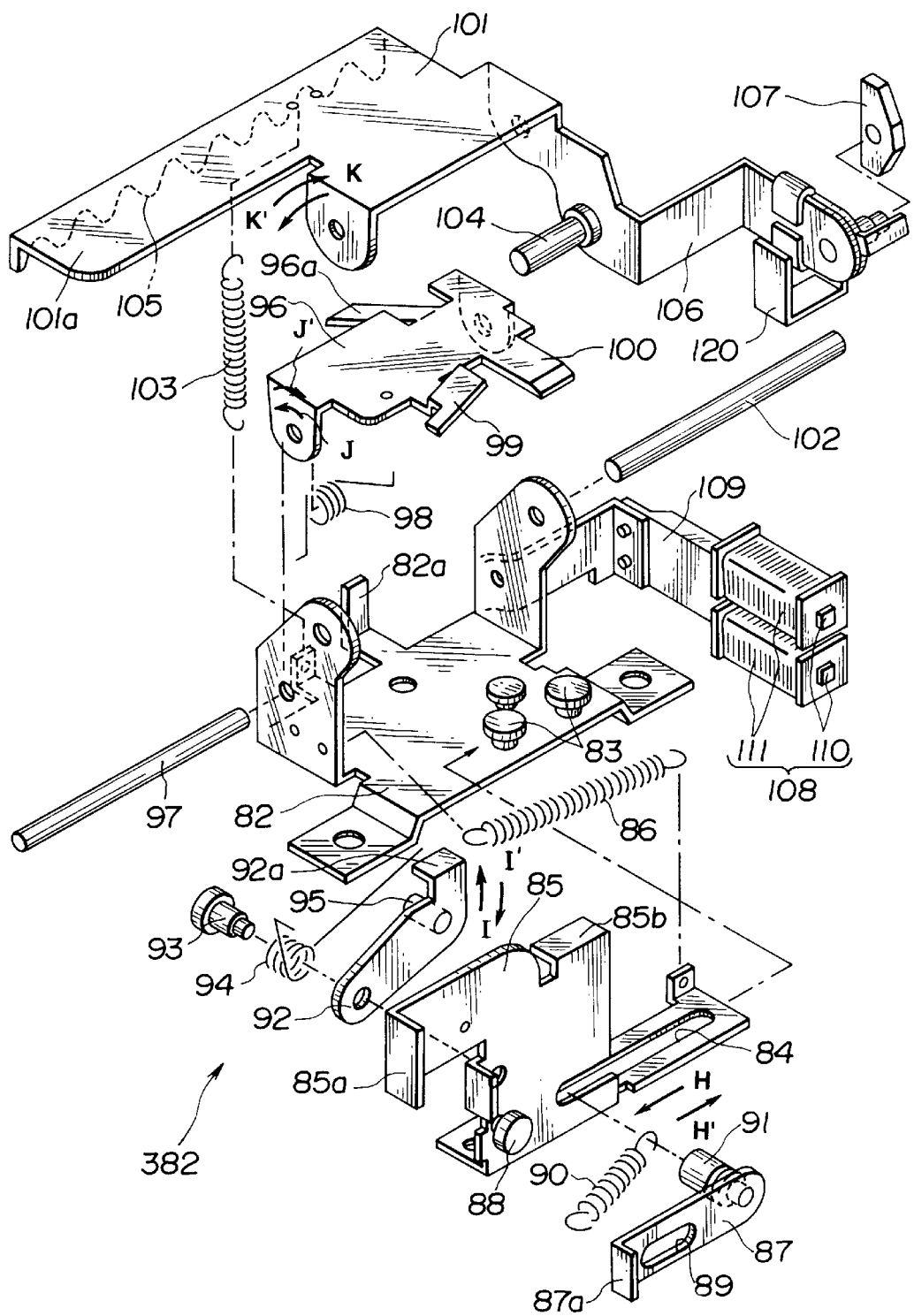
FIG. 10 is an exploded perspective view illustrating the linear-motion to rotational-motion converter of the magnetic head lifting mechanism.

FIG. 1 is a perspective view illustrating the disc drive unit.
FIG. 2 is an exploded perspective view illustrating the disc drive unit. FIG. 3 is an exploded perspective view illustrating a cassette holder 2, a slide plate 4 and the like. FIG. 4 is an exploded perspective view illustrating the slide plate 4, a spindle lifting plate 3 and the like. FIG. 5 is a perspective view illustrating the cassette holder 2. FIG. 6 is a perspective view illustrating a cassette auto-eject mechanism 360. FIG. 7 is a perspective view illustrating a head mechanism 370. FIG. 8 is a perspective view illustrating a head lifting mechanism 380. FIG. 9 is a perspective view illustrating a straight motion-to-rotational motion converting portion 382 of the head lifting mechanism. FIG. 10 is an exploded perspective view of the straight motion-to-rotational motion converting portion.

(1. Summary of disc drive unit)

In FIGS. 1 and 2, the disc drive unit has a cassette holder 2 and a spindle lifting plate 3 both mounted on a chassis 1. The disc drive unit includes a holder/spindle lifting mechanism 300 which is provided to move up and down the cassette holder and the spindle lifting plate by way of sliding motion of the slide plate 4, a slide plate lock mechanism 310 which is provided to lock the slide plate in its unloading position, a cassette auto-inject mechanism 320 which is provided to automatically inject the disc cassette 250 to a position of completion of insertion of the cassette when inserting the disc cassette 250 into the cassette holder 2, a shutter opening mechanism 330 which is provided to open the shutter 205 of the disc cassette 250 when inserting the disc cassette 250 into the cassette holder 2, a disc rotating mechanism 340 which is provided on the chassis 1 in such a manner as to be moveable up and down so as to drive the magneto-optical disc 202 of the disc cassette 250, a cassette positioning means 350 which is provided to position the disc cassette 250 at the loaded position, a cassette auto-eject mechanism 360 which is provided to eject the disc cassette 250 located in the loaded position, a head mechanism 370 which is displaceable in the radial direction of the magneto-optical disc 202 of the disc cassette 250 to ensure magneto-optical recording/reproduction by virtue of the magnetic head 80 and the optical head (optical pick-up) having the objective lens 78, a magnetic head lifting mechanism 380 which is provided to move up and down the magnetic head 80, and a sensor group provided to detect various states of the cassette side and the disc drive side.

(2. Chassis and so on)

In FIGS. 1 and 2, the chassis 1 is made of a high-rigidity material, such as aluminum die-cast. The chassis comprises a bottom portion and an upright wall portion standing at the rear-right and rear-left sides of the bottom portion. Although it is not shown, a front panel is arranged at the front end of the chassis 1. Through a cassette insertion hole of the front panel, the injecting operation or ejecting operation of the disk cassette 250 can be made. The upside plane of the chassis 1 is covered by a cover (not shown). The previously-noted mechanisms are accommodated in a substantially flat rectangular internal space defined by these panels constructing the chassis.

(3. Holder/spindle lifting mechanism)

As clearly seen in FIGS. 2 to 4, the holder/spindle lifting mechanism 300 has the slide plate 4 arranged to contact with the chassis 1. The slide plate 4 is formed with elongated holes 5 extending in the direction indicated by the arrows A and A' at four places. Inserted into the elongated holes 5 are respective guide pins 6 fixedly connected to the chassis 1. The slide plate is so designed to be slidable in the directions A and A' of FIG. 3, while being guided by the guide pins 6. The slide plate 4 is displaceable among its unloading position (the position indicated in FIG. 11) and its loading position (the position indicated in FIG. 12). A coil spring 8 is hanged between the slide plate 4 and a spring hook hanger pin 7. By way of contraction of the spring, the slide plate 4 is normally biased in the direction indicated by the arrow A (i.e., toward the loading position).

A holder lifting guide surface 9 and a spindle lifting guide groove 10 are properly provided at both sides of the slide plate 4. The up-and-down movement of the holder lifting guide surface 9 is so dimensioned to be sufficiently smaller than that of the spindle lifting guide groove 10. A pair of right and left holder lifting supports 11 are mounted on the chassis 1. Respective longitudinal restricting grooves 12 of the holder lifting supports 11 are arranged along the holder lifting guide surface 9.

The cassette holder 2 set out below, is arranged on the chassis 1. Guide pins 13 are properly provided at left-lower and right-lower ends of the cassette holder 2. The guide pins 13 are inserted into the respective longitudinal restricting grooves 12. The respective guide pins 13 are guided by the holder lifting guide surface 9 in such a manner as to move in the vertical direction only. That is, the cassette holder 2 is moveable up and down by way of sliding motion of the slide plate 4. When the slide plate 4 is located in the unloading position (the position indicated in FIG. 11), the cassette holder is positioned in its upper position (the cassette stand-by position indicated in FIG. 11). When the slide plate 4 is located in the loading position (the position indicated in FIG. 12), the cassette holder is positioned in its lower position (the cassette loaded position indicated in FIG. 12). Spring support pins 14 are provided at the left-lower and right-lower ends of the cassette holder 2. One spring hook of each coiled torsion springs 15 is hanged on each of the spring support pins 14. Another spring hook of each coiled torsion spring 15 is hanged on a spring hook hanger 16 of each of the holder lifting supports 11. By way of the bias if the coiled torsion spring 15, the cassette holder 2 is biased in the lower position (in the cassette loaded position).

The spindle lifting plate 3 is guided by a guide block 17 fixedly connected to the chassis 1 in such a manner as to be moveable up and down. Guide pins are provided on the spindle lifting plate 3 in place. Each of the guide pins 18 is provided to move in the vertical direction, while the guide pins are guided by the respective holder lifting guide grooves 10. That is, the spindle lifting plate 3 moves up and down by way of sliding motion of the slide plate 4. When the slide plate 4 is located in the unloading position (the position indicated in FIG. 11), the spindle lifting plate is positioned in the lower position (the cassette stand-by position indicated in FIG. 11). In contrast, when the slide plate 4 is located in the loading position (the position indicated in FIG. 12), the spindle lifting plate is positioned in the upper position (the cassette loaded position indicated in FIG. 12).

Figure 5A:
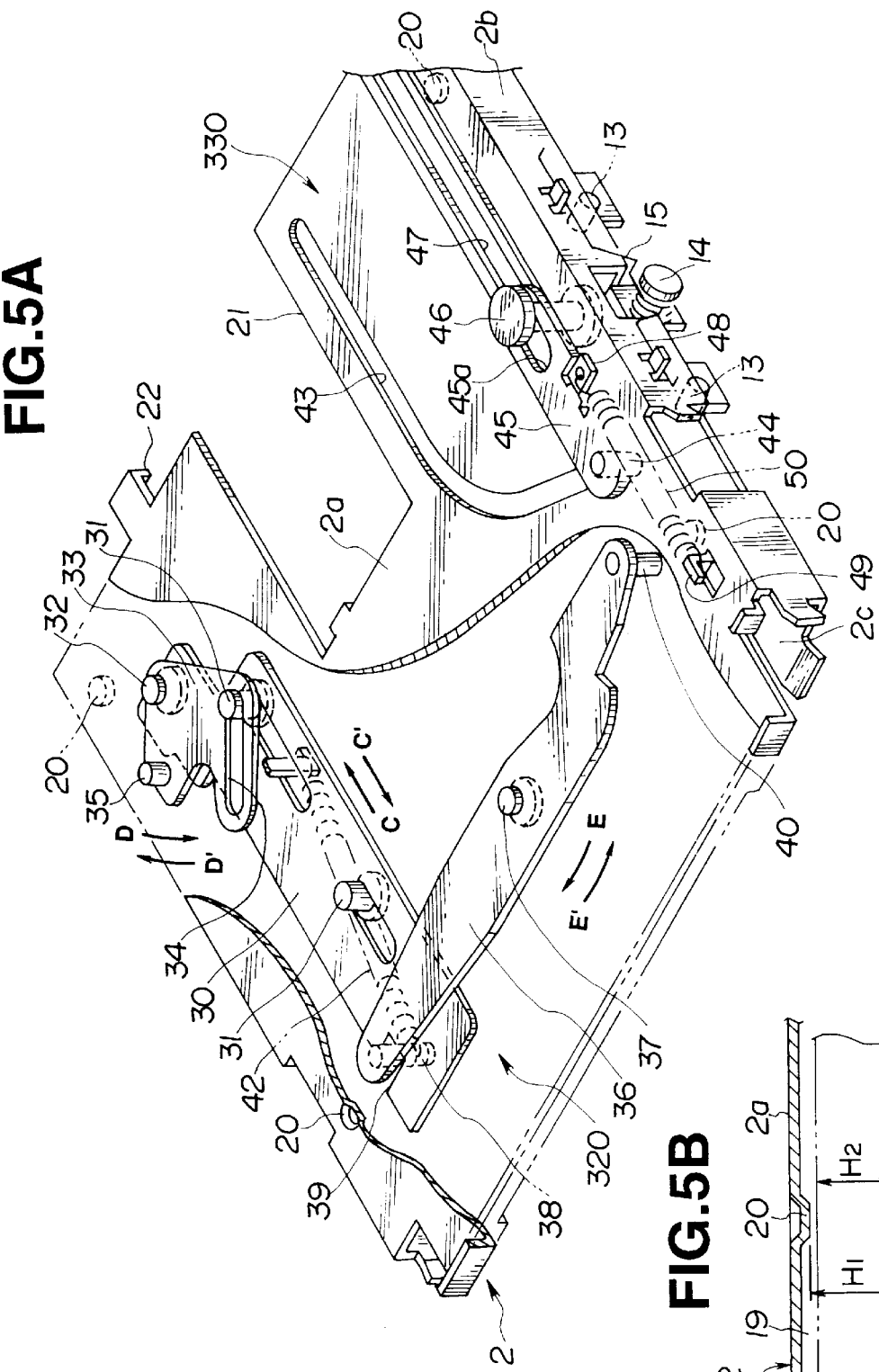
Figure 5B:
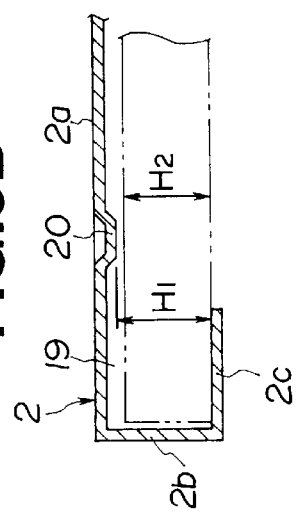
FIG. 5B is a lateral cross-sectional view illustrating the cassette holder, partly sectioned.

As clearly seen in FIGS. 5A and 5B, the cassette holder 2 is formed by bending a sheet of metallic plate. The cassette holder comprises an upper wall portion 2a, a pair of side wall portions 2b downwardly extending from both sides of the upper wall portion 2a, and a pair of bottom edge portions 2c inwardly extending from the lower ends of the side wall portions. These wall portions are cooperative with each other to define a cassette insertion space 19. By way of press-molding, formed at four points of the upper wall portion are projected portions 20 projecting toward the cassette insertion space 19. As indicated in FIG. 5B, the height $H_1$ from the upper surface of the bottom edge 2c to the projected portion 20 is set to be higher than the height (thickness) $H_2$ of the disc cassette 250. Therefore, the disc cassette 250 can be smoothly inserted into the cassette insertion space 19 of the cassette holder 2, or smoothly ejected from the cassette insertion space 19. The above-mentioned projected portions 20 construct a part of the cassette positioning mechanism 350 as set out below.

The upper wall portion 2*a* is also formed with a cut-out 21 into which the magnetic head 80 is inserted, and with a cassette stopper 22. The position of completion of insertion of the cassette is defined by abutment between the cassette stopper 22 and the front end surface 201*c* of the disc cassette 250 in the insertion direction of the cassette.

(4. Slide plate lock mechanism)

As clearly shown in FIG. 3, the slide plate lock mechanism 310 has a lock member 24 which is supported by a support shaft 23 of the chassis 1. The lock member 24 rotates in the directions indicated by the arrows B and B'. One end of a coiled torsion spring 25 is hanged on the lock member 24, such that the lock member 24 is biased in the direction (the locking direction) indicated by the arrow B, by way of the bias of the spring. The lock member 24 is formed with an engaging nail portion 24a and a release lever portion 24*b*. The engaging nail portion 24*a* is engaged with or disengaged from a lock pin 26 of the slide plate 4. That is, the slide plate 4 is locked in its unloading position by way of the engagement between the engaging nail portion 24*a* and the lock pin 26 of the slide plate 4. The release lever portion 24*b* is positioned within the cassette insertion space 19 in the locked state of the engaging nail portion 24*a*, and also rotated in the direction (the release direction) indicated by the arrow B' by way of the pushing force of the disc cassette 250.

(5. Cassette auto-inject mechanism)

As clearly shown in FIGS. 3 and 5A, the cassette auto-inject mechanism 320 has a first inject plate 30 which is arranged under the bottom edge portion 2*c* of the cassette holder 2. The first inject plate 30 is slidably provided in the directions indicated by the arrows C and C' of FIG. 5A, while being guided by the guide pin 31 of the bottom edge portion 2*c*. A rotary support shaft 32 is fixedly connected to one end of the first inject plate 30. A second inject plate 33 is rotatably supported on the rotary support shaft 32. The second inject plate 33 is formed with a cam groove 34 into which the above-mentioned guide pin 31 is inserted. The second inject plate 33 has a cassette inject pin 35 extending upward. The cassette inject pin 35 rotates in the directions indicated by the arrows D and D' of FIG. 5A, by way of rotation of the second inject plate 33.

A third inject plate 36 is supported on a support shaft 37 provided on an extension of the bottom edge portion 2*c* in such a manner as to rotate in the arrows indicated by the arrows E and E' of FIG. 5A. An engaging pin 38 is provided at one end of the third inject plate 36. The engaging pin 38 engages with an engaging groove 39 of the first inject plate 30. A hold pin 40 is provided at the other end of the third inject plate 36. The hold pin 40 is engaged with and disengaged from an inject support piece 41 of the slide plate 4. Both ends of a coil spring 42 are respectively hanged on the engaging pin 38 and the guide pin 31. The contraction of the spring 42 forces the third inject plate 36 in the direction indicated by the arrow E.

When the slide plate 4 is displaced from the loading position to the unloading position, the inject support piece 41 pushes the hold pin 40 and additionally the third inject plate 36 rotates in the direction indicated by the arrow E' against the contraction of the coil spring 42, with the result that the cassette inject pin 35 is positioned in the stand-by position outside of the cassette insertion space 19. In contrast, when the slide plate 4 is displaced from the unloading position to the loading position, the inject support piece moves away from the hold pin 40, and then the third inject plate 36 rotates in the direction indicated by the arrow E by way of the contraction of the coil spring 42. Thus, the cassette inject pin 35 is positioned in the engaging position within the cassette insertion space 19 and slides together with the first inject plate 30 so as to automatically insert the disc cassette 250 to the position of completion of insertion of the cassette.

(6. Shutter opening and closing mechanism)

As clearly shown in FIGS. 3 and 5A, the shutter opening and closing mechanism 330 has a cam hole 43 formed on the upper wall portion 2*a* of the cassette holder 2. The cam hole 43 includes a sloped area which is obliquely arranged with respect to the cassette insertion direction, and a straight area which extends in the same direction as the cassette insertion direction. A shutter opening pin 44, projecting into the cassette insertion space 19, is engaged with the cam hole 43. The shutter opening pin 44 is fixed at one end of a moveable plate 45. An elongated hole 45*a* is formed at the other end of the moveable plate 45, so as to adjust a traveling distance of the moveable plate. A moveable guide pin 46 is engaged with the elongated hole 45. The moveable guide pin 46 is arranged within the cassette insertion space 19 and its both ends are inserted into respective guide holes 47 of the upper wall portion 2*a* and the bottom edge portion 2*c* of the cassette holder 2. The moveable plate 45 is formed with a spring hook hanger 48 at its center portion. A coiled tension spring 50 is hanged between the spring hook hanger 48 and a spring hook hanger 49 of the cassette holder 2. The shutter opening pin 44 is biased at its starting point by way of the contraction of the coil spring 50, as illustrated in FIGS. 3 and 5A.

(7. Disc rotating mechanism)

As clearly shown in FIG. 4, the disc rotating mechanism 340 has a flat spindle motor $M_1$ fixed on the bottom surface of the spindle lifting plate 3. A rotary shaft 51 of the spindle motor $M_1$ is projected at an upper level than the hole 3*a* of the spindle lifting plate 3. A turn table 52 is fixedly connected to the rotary shaft 52. A ring-shaped reference plane 52*a* is defined on the upper surface of the turn table 52. A magnet member 53 is provided at the inside of the ring-shaped reference plane 52*a*, so that the hub 203 of the magneto-optical disc 202 is attracted onto the turn table 52 by way of an attraction force of the magnet member 53.

(8. Cassette positioning mechanism)

As clearly shown in FIGS. 4, 5A, and 5B, the cassette positioning mechanism 360 has height-level positioning members 55 standing at four points of the chassis 1. In the shown embodiment, the height-level positioning members 55 are formed integral with the chassis 1. Alternatively, the height-level positioning members 55 may be formed separately from the chassis 1. Just above the respective height-level positioning members 55, the previously-noted projected portions 20 of the cassette holder 2 are arranged. In the loaded position, the disc cassette 250 is positioned with respect to the height level, such that the disc cassette is mounted on the height-level positioning members 55 in the downwardly pushed state in which the disc cassette is pushed downwardly by the respective projected portions 20 of the cassette holder 2.

A dimensional standard (a thickness, a flatness or the like) of the disc cassette 250 is dependent on the peripheral edge area of the upper and lower halves 201*a* and 201*b*, which area serves as a reference plane. The four height-level positioning members 55 are provided to support four corners of the disc cassette, lying within the reference plane of the square disc cassette 250.

Additionally, the cassette positioning mechanism 350 has a pair of right and left positioning pins 56 standing on the spindle lifting plate 3. These positioning pins 56 are inserted into the positioning grooves 206 of the disc cassette 250 at the ascending position of the spindle lifting plate 3. In the loaded position, the disc cassette 250 is horizontally positioned by way of the pair of positioning pins 56. Alternatively, each of the projected portions 20 may be formed of a resilient member such as a leaf spring having such an elastic or resilient force that will not prevent insertion of the disc cassette 250.

(9. Cassette auto-eject mechanism)

Figure 17:
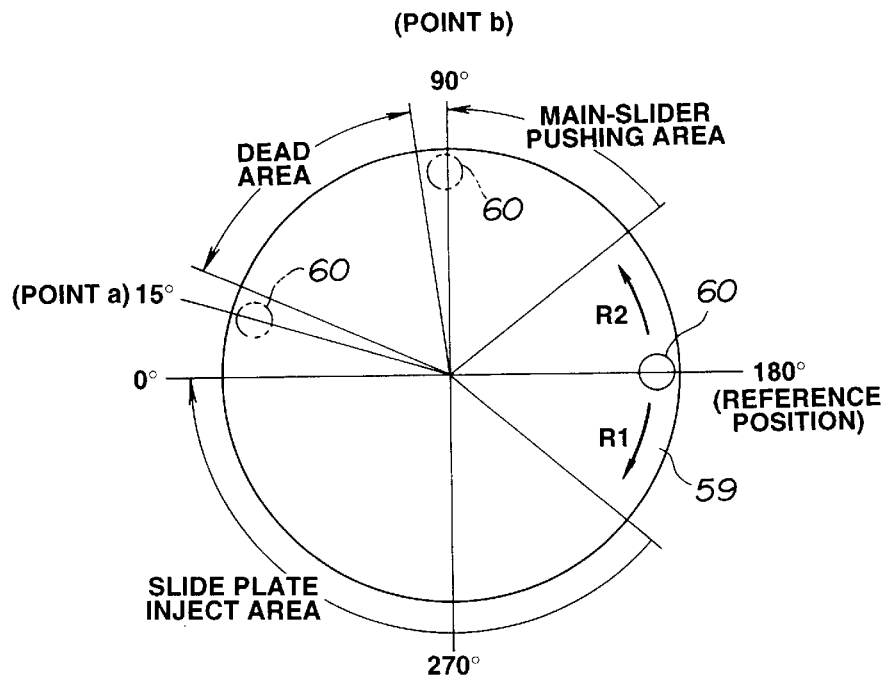
FIG. 17 is an illustration showing the relationship between the angular position of the output pin and its operation.
Figure 18:
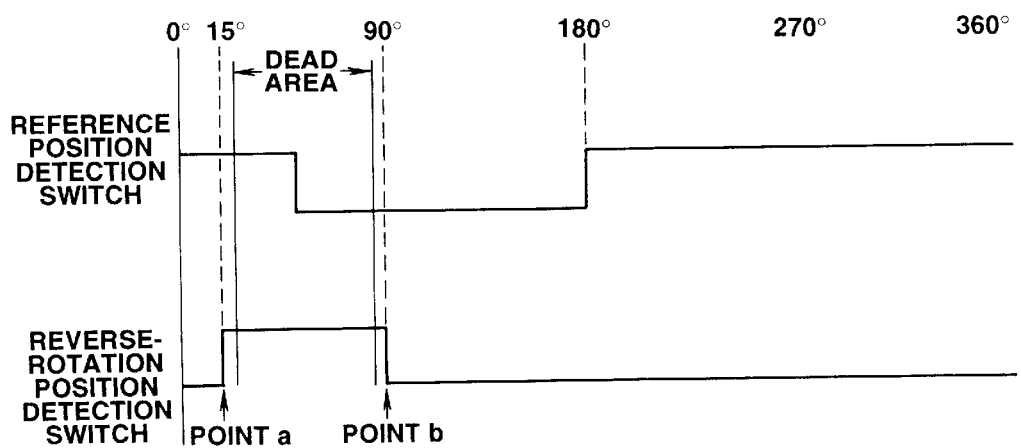
FIG. 18 is an illustration showing the relation between a rotational angle and outputs of respective detection switches.

As shown in FIGS. 4 and 6, the cassette auto-eject mechanism 360 has a loading block member 57 fixed onto the chassis 1. Accommodated in the loading block member 57 are a loading motor $M_2$ consisting of a direct-current motor, and an intermediate gear mechanism 58 outputting an increased torque through an end gear 58a with reduction of the rotational speed of the loading motor $M_2$. Meshed engagement with the end gear 58a is an output gear 59 arranged outside of the loading block member 57. A drive pin 60 is projected from one side wall of the output gear 59 and near the outer periphery of the gear. Also provided in the loading block member 57 are a reference position detection switch $SW_A$ by way of which the angular position of the pin 60 is detected, and a reverse-rotation position detection switch $SW_B$ (not shown in FIGS. 4 and 6). The respective detection switches $SW_A$ and $SW_B$ generate output signals indicated in FIG. 18, in case that angular positions of the pin 60 are defined as shown in FIG. 17. That is, the control to the above-mentioned loading motor $M_2$ is performed on the basis of the outputs from the reference position detection switch $SW_A$ and the reverse-rotation position detection switch $SW_B$. A reference position is discriminated by the output from the reference position detection switch $SW_A$, whereas a point a and a point b are discriminated by the output from the reverse-rotation position detection switch $SW_B$.

Returning to FIG. 6, arranged at the rotationally engaging position of the pin 60 is an injectable bent piece 61 of the slide plate 4. The injectable bent piece 61 is formed by bending one end of the slide plate 4. When the drive pin 60, located in its reference position, rotates in the direction indicated by the arrow R1, the drive pin 60 acts to inject the injectable bent pin 61 in a manner so as to shift the slide plate 4 from the loading position to the unloading position against the contraction of the coil spring 8.

Also arranged at the rotationally engaging position of the drive pin 60 are a pushed portion 85a of a main-slider 85 and a pushed portion 87a of a sub-slider 87, both included in the magnetic-head lifting mechanism 370 as set out later. When the drive pin 60, located in the reference position, rotates in the directions indicated by the arrows R2 or R1, the rotational movement of the drive pin causes the downward or upward movement of the magnetic head 80 by pushing the pushed portion 85a by the drive pin 60 or by pushing the pushed portion 87a through the injectable bent piece 61. The loading block member 57 also serves as a part of the magnetic-head lifting mechanism 380.

(10. Means for preventing a runaway operation of loading motor)

On the other hand, provided at a part of the outer periphery of the output gear 59 is a non-toothed notched portion 63 not having teeth 62. The rotation of the end gear 58a is not transmitted at the notched portion 63. That is to say, as regards the angular position of the drive pin 60, the dead area shown in FIG. 17 corresponds to an area in which the rotation of the end gear 58a is not transmitted. Even when the drive pin 60 rotating in the direction indicated by the arrow R1 has overrun the point a and thus the loading motor $M_2$ has run away (further driven), the drive pin 60 cannot continue to rotate in the direction indicated by the arrow R1, thereby avoiding collision between the pin and the pushed portion 85a of the main-slider 85. Likewise, even when the drive pin 60 rotating in the direction indicated by the arrow R2 has overrun the point b and thus the loading motor $M_2$ has run away (further driven), the drive pin 60 cannot continue to rotate in the direction indicated by the arrow R2, thereby avoiding collision between the pin and the injectable bent piece 61 of the slide plate 4.

Figure 19:
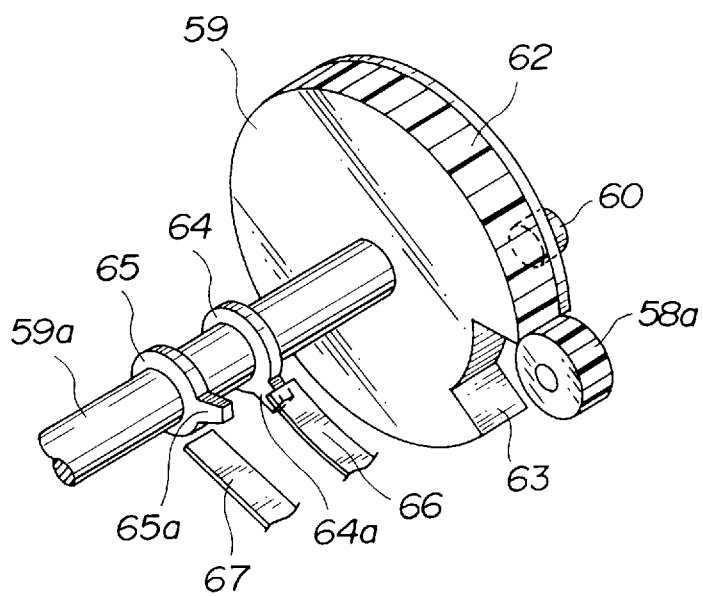
FIG. 19 is a perspective view illustrating the vicinity of an output gear.

As shown in FIG. 19, a first cam plate 64 and a second cam plate 65 are fixedly connected onto the shaft 59a of the output gear 59. These cam plates are so provided that projected portions 64a and 65a of the cam plates 64 and 65 abut respective ends of leaf springs 66 and 67 which springs are supported on the loading block member 57. One leaf spring 66 abuts the projected portion 64a of the first cam plate 64 in a position in which the output gear 59 is disengaged from the end gear 58a by virtue of its rotation to the direction indicated by the arrow R1. The spring bias of the one leaf spring forces the output gear 59 in the direction indicated by the arrow R2. In contrast, the other leaf spring 67 abuts the projected portion 65a of the second cam plate 65 in a position in which the output gear 59 is disengaged from the end gear 58a by virtue of its rotation to the direction indicated by the arrow R2. The elastic force of the other leaf spring forces the output gear 59 in the direction indicated by the arrow R1. That is, even when the output gear 59 is disengaged from the end gear 58a owing to the presence of the notched portion 63, the output gear is forced toward the end gear 58a. Thus, by way of the reverse rotation of the loading motor $M_2$, the out gear is soon returned to the meshed engaging state in which the end gear 58a and the output gear 59 are meshed with each other.

In the shown embodiment, although the means for avoiding a runaway operation of the loading motor $M_2$ are constructed by the cam plates and the leaf springs, such means may be constructed by utilizing a magnetic force of a permanent magnet. Also, the means should not be limited to the two cam plates and the two leaf springs. It may be possible to construct such means by one cam plate and one leaf spring. In this case, projected portions should be formed at two points of the one cam plate.

(11. Head mechanism)

As clearly shown in FIGS. 4 and 7, the head mechanism 370 has a pair of left and right guide rail shafts 70 which are supported on the chassis 1. The guide rail shafts 70 are arranged to extend in the directions indicated by the arrows G and G'. A head carriage 71 is provided midway between the guide rail shafts 70. Rollers 72 are rotatably supported on the head carriage 71 totally at three points of the right-hand and left-hand sides of the carriage. The right and left rollers 72 are arranged to abut the respective guide rail shafts 70 in the direction inclined by 45° in respect to the horizontal direction. The head carriage 71 is so designed to be moveable in the directions indicated by the arrows G and G' by rolling the respective rollers 72 on the pair of guide rail shafts 70.

The linear motor M3 includes a pair of left and right outside yokes 74 fixedly connected to the chassis 1 at the outer position than one pair of guide rail shafts 70, a magnet 75, and a pair of inside yokes 76. These members are formed in the elongated flat plate-like fashion, and aligned in the same direction as the guide rail shafts 70. Each outside yoke 74 and each magnet 75 are fitted to each other, whereas each magnet 75 and each inside yoke 76 are spaced apart from each other by a constant distance. Coil portions 77 are slidably provided on the respective right-hand and left-hand inside yokes 76, in a manner so as to surround the outer peripheries of the inside yokes. The pair of coil portions 77 are fixed on the head carriage 71. The head carriage 71 can be moved in the directions indicated by the arrows G and G', depending on the directions of current flowing through the coil portions 77.

An objective lens 78 of an optical pick-up is fixedly connected onto the head carriage 71 through two parallel flexible plates 79 in such a manner to be displaceable in the vertical direction against the spring bias of the two parallel flexible plates 79. Provided between the objective lens 78 and the head carriage 71 is a small-sized linear motor (not shown). The objective lens 78 is moveable up and down by way of a driving force produced by the linear motor. Laser beam emitted from an optical block element (not shown) is converged to the magneto-optical disc 202 through the objective lens 78. The laser beam reflected from the magneto-optical disc 202 is returned to the optical block element through the objective lens 78. At this time, the focusing control of the laser beam is achieved by displacing the position of the objective lens 78.

A magnetic head 80 used for a magnetic-field modulation, is a flying head supported on a flexible head arm 81 which arm is fixed to the head carriage 71 at one end and supports the flying head at the other end. The magnetic head is located just above the objective lens 78. The head arm 80 is gradually tilted downwardly toward the other end (the head side) of the head arm. The magnetic head 80, conditioned in its free state, is set at a level at which comes into contact with the magneto-optical disc 202, conditioned in the loaded position. During rotation of the magneto-optical disc 202, air stream produces a lift acting on the magnetic head 80. The lift permits the head arm 81 to be bent in the direction opposing the disc. As a consequence, the magnetic head 80 can float on the magneto-optical disc 202. The magnetic head 80, which travels on the magneto-optical disc 202 in the loading state, generates a magnetic field directed perpendicularly to the plane of the magneto-optical disc 202 selectively in the opposing directions.

(12. Magnetic head lifting mechanism)

As clearly shown in FIGS. 4, 6, and 8 to 10, the magnetic head lifting mechanism 380 includes the loading block member 57, the linear-motion to rotational-motion converter 382 serving to rotate a first lifter control member 101 and a second lifter control member 96 by the movement of the pin 60 of the loading block member 57 and the slide plate 4, and a lifter mechanism 384 being moveable up and down by way of rotation of the first lifter control member 101 and the second lifter control member 96, both included in the linear-motion to rotational-motion converter 382.

As shown in FIGS. 8 to 10, the linear-motion to rotational-motion converter 382 has a support member 82 fixed on the chassis 1. The main-slider 85 is supported on the support member 82 in such a manner as to be slidable in the directions indicated by the arrows H and H', by way of the guide pins 83 and the elongated hole 84. The main-slider 85 is biased in the direction (the direction of the initial position) indicated by the arrow H by way of the contraction of the coil spring 86. The main-slider 85 held in the initial position, is positioned in such a manner that its pushed portion 85a is spaced apart from the drive pin 60 held in the reference position.

The sub-slider 87 is arranged to be slidable in the directions indicated by the arrows H and H' in relation to the main-slider 85, by way of the guide pin 88 and the elongated hole 89. The sub-slider 87 is also biased in the direction indicated by the arrow H (the direction of the initial position) by way of the contraction of another coil spring 90. The sub-slider 87 held in the initial position, is positioned in such a manner that its pushed portion 87a is spaced apart from the injectable bent piece 61 of the slide plate 4 held in the loading position. The sub-slider 87 is formed with a second pushing pin 91 at the end facing apart from the pushed portion 87a.

A pivotal plate 92 is supported on the main-slider 85 by way of a support pin 93 in a manner so as to rotatable in the directions indicated by the arrows I and I'. The pivotal plate 92 is biased in the direction indicated by the arrow I by way of the bias of a coil spring 94. The upper wall portion 92a of the pivotal plate 92 is arranged to abut a stopper portion 85b of the main-slider 85. The pivotal plate 92 is formed with a first pushing pin 95.

The second lifter control member 96 is supported on the support member 82 by means of the elongated shaft 97, and provided to be rotatable in the directions indicated by the arrows J and J'. The second lifter control member 96 is biased in the direction indicated by the arrow J by way of the spring bias of a coiled torsion spring 98. Rotation of the second lifter control member 96 is restricted at a lower position (a stand-by position) at which the lifter pushing portion 96a of the second lifter control member abuts the stopper portion 82a of the support member 82. By way of rotation in the direction indicated by the arrow J' against the bias of the coiled torsion spring 98, the second lifter control member 96 is rotatable among the stand-by position and an upper position (the head-down position) in which the lever portion 113b of the lifter 113 is pushed upwards. The second lifter control member 96 is formed with a sloped portion 99 which is gradually sloped upwardly in the direction indicated by the arrow H'. The sloped portion 99 is arranged substantially at the same level as the first pushing pin 95 of the pivotal plate 92. Additionally, the second lifter control member 96 is formed with a rotation transmitting portion 100.

In the same manner as the second lifter control member 96, the first lifter control member 101 is supported on the support member 82 by means of the elongated shaft 102 and provided to be rotatable in the directions indicated by the arrows K and K'. The first lifter control member 101 is biased in the direction indicated by the arrow K by way of the contraction of a coil spring 103. Rotation of the first lifter control member 101 is restricted at a position (a lower position) at which the pin portion 104 of the first lifter control member 101 abuts the rotation transmitting portion 100 of the second lifter control member 96.

By way of rotation in the direction indicated by the arrow K' against the spring bias, the first lifter control member 101 displaceable among a lower position (a head-up position) in which the lever portion 113b of the lifter 113 is pushed downward, and an upper position (the stand-by position) in which the first lifter control member is spaced apart from the lever portion 113b of the lifter 113 described later.

The lifter pushing portion 101a of the first lifter control member 101 extends in the direction of the sliding movement of the head carriage 71. The length of the lifter pushing portion is so designed to be a length enough to satisfy a range of the movement of the lifter 113 hereinafter described in detail. The lifter pushing portion 101a is formed with a saw-toothed portion 105 at its lower portion. Also, the first lifter control member 101 is formed integral with an extended arm portion 106. A magnetic member 107 such as iron is supported at the top end of the extended arm 106.

An electromagnetic attracting/unattracting portion 108 comprises a pair of upper and lower permanent magnets 110 attached to the top end of the extended arm portion 109 of the support member 82, and a coil portion 111 wound on the respective permanent magnets 110. The permanent magnets are arranged such that end surfaces of the permanent magnets 110 are brought into abutment with the magnetic member 107 at the upper position (the stand-by position) of the first lifter control member 101. When the first lifter control member 101 is shifted to the upper position against the contraction of the coil spring 103, the magnetic member 107 is attracted by the magnetic force created by the permanent magnet pair 110. In this manner, the magnetic member is held in the attracted state. On the other hand, when the coil portions 11 are energized, an additional magnetic field is produced so as to cancel the magnetic force which is created by the permanent magnets 110 and acting on the magnetic member, and consequently to release the attracted state.

As shown in FIGS. 7, 8, 15 and 16, the lifter mechanism 384 has the lifter 113 which is supported on the side wall of the head carriage 71 through the support pin 112. The lifter 113 is formed integral with a lift-up portion 113a disposed below the head arm 81, the lever portion 113b projecting into an internal space defined between the first lifter control member 101 and the second lifter control member 96, and a magnet support arm portion 113c with a permanent magnet 114 at its top end. The lever portion 113b is positioned just above the second lifter control member 96 when the magnetic head 80 reaches the outermost peripheral position located outside of the disc recording area. The permanent magnet 114 is arranged between a pair of left and right magnetic members 115 and 116. The left and right magnetic members 115 and 116 are attached to the head carriage 71. That is to say, the lifter 113 is rotatable among a lower position (the state indicated in FIG. 16) in which the permanent magnet 114 is attracted by one 115 of the magnetic members and an upper position (the state indicated in FIG. 15) in which the permanent magnet 114 is attracted by the other magnetic member 116. In the above-mentioned lower position, the lift-up portion 113a is positioned at such a lower level that the lift-up portion does not abut the head arm 81 and the magnetic head 80 is conditioned in the loading state. In the upper position, the lift-up portion 11 3a pushes the head arm 81 upwards, and thus the magnetic head 80 is conditioned in the unloading state.

Figure 20:
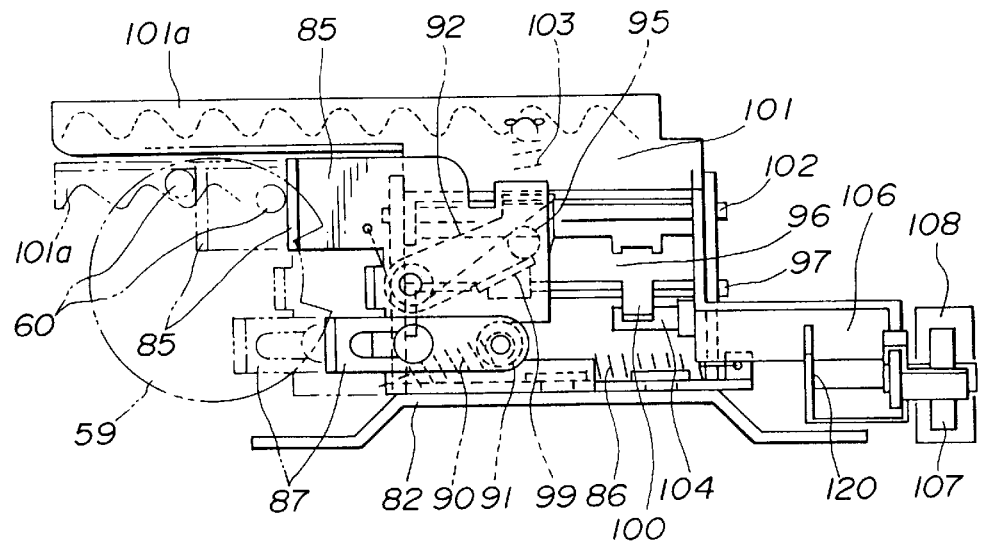
FIG. 20 is a side view illustrating a state in which a first pushing pin pushes a sloped portion and then a second lifter control member is rotated.
Figure 21:
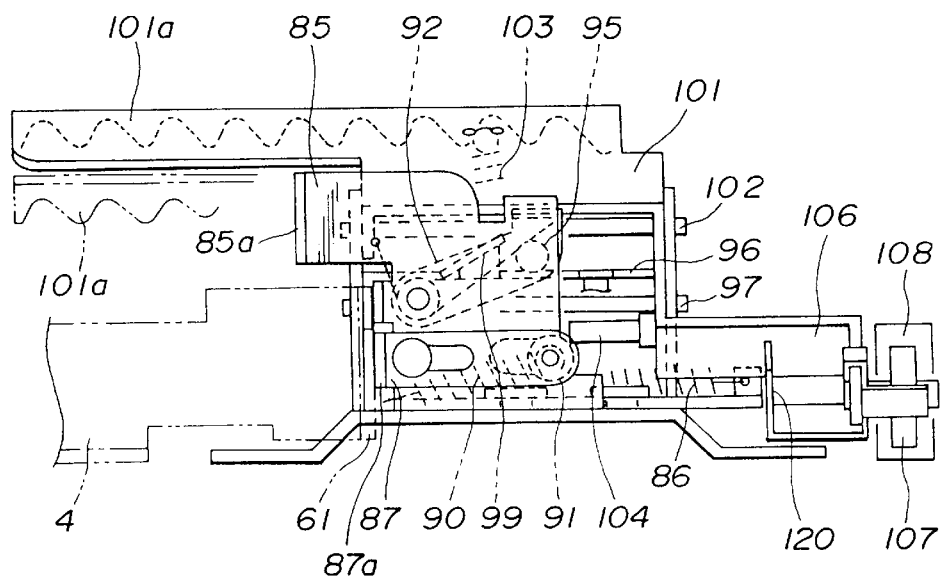
FIG. 21 is a side view illustrating a state in which the second pushing pin pushes a pin and then the first lifter control member is rotated.

In case that the first lifter control member 101 is held in the lower position, the lifter 113 is held in the upper position, and the magnetic head 80 is held in the unloading state, the loading motor $M_2$ is driven in such a manner that the output gear 59 is rotated in the direction indicated by the arrow R2, for the purpose of releasing the locking state of the head carriage 71. That is, when the drive pin 60 rotates in the direction indicated by the arrow R2 by driving the loading motor $M_2$, the main-slider 85 is pushed by the pin 60 and then moves in the direction indicted by the arrow H' against the contraction of the coil spring 86. During the movement of the main-slider, as seen in FIG. 20, the first pushing pin 95 of the pivotal plate 92 pushes the sloped portion 99 of the second lifter control member 96 downward, and thus the second lifter control member 96 rotates in the direction indicated by the arrow J' against the bias of the coil spring 98. This rotation permits the rotation transmitting portion 100 to push the second pushing pin 91 of the first lifter control member 101, and thus the first lifter control member 101 is also rotated in the direction indicated by the arrow K' against the contraction of the coil spring 103. At the time when the first lifter control member 101 has rotated up to the upper position (the stand-by position), the magnetic member 107 is attracted by the permanent magnet pair 110. By way of rotation of the first lifter control member 101, the lifter 113 is held unlocked, so that the head carriage 71 can move freely. On the other hand, just after the first lifter control member 101 has been rotated up to the upper position, the first pushing pin 95 is disengaged from the sloped portion 99. Then, the first lifter control member 101 is held in it upper position by the attracting force created by the permanent magnet pair 110 against the contraction of the coil spring 103, whereas the second lifter control member 96 is returned to the lower position, rotating in the direction indicated by the arrow J by the bias of the coil spring 98. At the time when the first pushing pin 95 is disengaged from the sloped portion 99, the loading motor $M_2$ is rotated in the reverse direction. The output pin 60 is returned and simultaneously the main-slider 85 slides in the direction indicated by the arrow H by way of the contraction of the coil spring 86. During the above-noted returning motion, the first pushing pin 95 of the pivotal plate 92 is brought into abutment with sloped portion 99 of the second lifter control member 96. Also, the first pushing pin 95 slides along the sloped portion 99, while the pivotal plate 92 rotates in the direction indicated by the arrow I' against the bias of the coil spring 94. At the time when the first pushing pin 95 has been disengaged from the sloped portion 99, the pivotal plate 92 is recovered to its initial position, rotating in the direction indicated by the arrow I by way of the bias of the coiled torsion spring 94. Thus, the main-slider 85 is returned to the initial position in accordance with the angular displacement of the pin 60.

In case that the first lifter control member is held in the upper position (the stand-by position), the lifter is held in the upper position, and the magnetic head 80 is held in the unloading state, for the purpose of shifting the magnetic head 80 to the loading state, the loading motor $M_2$ is driven in such a manner that the output gear 59 is rotated in the direction indicated by the arrow R2, after the head carriage has been displaced to the outermost peripheral position. During operation, only the rotational operation of the first lifter control member 101 is omitted. By way of rotation of the second lifter control member 96 from the lower position to the upper position, the lifter pushing portion 96a lifts up the lever portion 113b of the lifter 113. As a result, according to the displacement of the lifter 113 from the lower position to the upper position, the lift-up portion 113a is displaced downward to avoid the abutment with the head arm 81, with the result that the magnetic head 80 becomes conditioned in the loading state.

In case that the first lifter control member 101 is positioned in the upper position (the stand-by position), in order to shift the magnetic head 80 to the unloading state, the coil portion 111 of the electromagnetic attracting/unattracting portion 108 is energized for a short time duration. Therefore, since the magnetic force of the permanent magnets 110 can be temporarily canceled, the first lifter control member 101 rotates in the direction indicated by the arrow K by way of the contraction of the coil spring 103. In accordance with the movement of the first lifter control member 101 from the upper position to the lower position, the lever portion 113b of the lifter 113 is also displaced from the upper position to the lower position, and thus the lift-up portion 113a pushes the head arm 81 upward, with the result that the magnetic head 80 becomes conditioned in the unloading state.

When the first lifter control member 101 is positioned in the upper position (the stand-by position) and the disc cassette 250 is ejected, the slide plate 4 is shifted from the loading position to the unloading position by driving the loading motor $M_2$. During shift, the injectable bent piece 61 of the slide plate 4 pushes the pushed portion 87a of the sub-slider 87. At this time, the sub-slider 87 is displaced in the direction indicated by the arrow H' against the contraction of the coil spring 90. After the pushed portion 87a is shifted to a fixed sub-pushed portion 117, the sub-slider moves in the direction indicated by the arrow H' together with the main-slider 85 against the contraction of the coil spring 86. Just after the first pushing pin 95 is disengaged from the sloped portion 99, the second pushing pin 91 of the sub-slider 87 is brought into abutment with the pin portion 104 of the first lifter control member 101, and then the pin portion 104 is pushed upward so that the first lifter control member 101 is slightly rotated in the direction indicated by the arrow K. As a result, the magnetic member 107 of the first lifter control member 101 is spaced apart from the permanent magnet pair 110 and almost unaffected by the attracting force. Thus, the first lifter control member 101 shifts to the lower position, rotating in the direction indicated by the arrow K by way of the contraction of the coil spring 103. In this manner, the lever portion 113b of the lifter 113 is pushed down, and thus the lifter 113 is displaced from the lower position to the upper position, with the result that the magnetic head 80 becomes conditioned in the unloading state.

(13. Sensor group)

A pair of cassette state detection sensors $S_1$ and $S_2$ are provided to mechanically detect the state of the cassette by determining whether or not a detection rod 118 is pushed down. As shown in FIG. 4, the sensors are provided on the spindle lifting plate 3 and below each detecting area of the write protect member 207 of the disc cassette 250 used as a RAM. In case that the spindle lifting plate 3 is held in the descending position, as illustrated in FIG. 14A, the outputs of the cassette state detection sensors $S_1$ and $S_2$ are both maintained at a L level, irrespective of insertion or noninsertion of the disc cassette 250. In contrast, in case that the spindle lifting plate 3 is held in the ascending position, as illustrated in FIG. 14B, the outputs of the cassette state detection sensors $S_1$ and $S_2$ are both maintained at a H level, when inserting the disc cassette 250 used as a ROM. On the other hand, when inserting the disc cassette 250 used as a RAM, the either one of the above-noted outputs is maintained at a H level, whereas the other output is maintained at a L level. This is dependent on the position of the write protect member 207. That is, this is dependent on whether the write is enable or disable.

In other words, the cassette state detection sensors $S_1$ and $S_2$ are provided for detecting whether the disc cassette is loaded (cassette in/out), the loaded disc cassette 250 is used as a RAM or a ROM, and the loaded disc cassette 250 serving as a RAM is conditioned in a state of prevention of erroneous erase to the disc cassette (presence of write protect).

A loading state detection sensor $S_3$ is a light interception type sensor in which a detection is made to determine whether or not a detecting light is intercepted by a detected element. As shown in FIG. 6, the loading state detection sensor is fixed on the loading block member 57 the loading state detection sensor $S_3$ utilizes a detected piece 119 of the slide plate 4 serving as the detected element. The loading state detection sensor outputs a signal of the L level when the detected piece 119 intercepts the detecting light in the unloading position of the slide plate 4, and outputs a signal of the H level when the detected piece 119 does not intercept the detecting light in the loading position of the slide plate 4. That is, the loading state detection sensor $S_3$ detects the loading state or the unloading state of the disc cassette 250 (cassette in/out) depending on the relative position of the slide plate to the drive unit.

Similarly to the loading state detection sensor $S_3$, a head-up detection sensor $S_4$ is a light interception type sensor in which a detection is made to determine whether or not a detecting light is intercepted by a detected element. As shown in FIG. 6, the head-up detection sensor is fixed on the loading block member 57. The head-up detection sensor $S_4$ utilizes a detected piece 120 provided on the extended arm portion 106 of the first lifter control member 101, serving as the detected element. The headup sensor outputs a signal of the L level when the detected piece 120 intercepts the detecting light in the head-up position (the lower position), and outputs a signal of the H level when the detected piece 120 does not intercept the detecting light in the stand-by position (the upper position).

On the other hand, a temperature sensor $S_5$ is supported on a flexible base plate 121 of the spindle lifting plate 3, as shown in FIGS. 2, 4, 14A, 14B, and 22A. Concretely, as appreciated from FIG. 22A, an elastically deforming portion 121a is formed on the spindle lifting plate 3 by winding a part of the flexible base plate 121 by one curl in a cylindrical fashion. The temperature sensor $S_5$ is fixed on the elastically deforming portion 121a. In the descending position of the spindle lifting plate 3, as shown in FIG. 14A, the temperature sensor $S_5$ is held at a level at which the temperature sensor is not in contact with the disc cassette 250 to be inserted into the cassette holder 2. In the ascending position of the spindle lifting plate 3, as shown in FIG. 14B, the temperature sensor $S_5$ is held at a level at which the temperature sensor is brought into press-contact with the disc cassette 250 to be inserted into the cassette holder 2 according to the descending motion of the cassette holder 2. That is, the temperature sensor $S_5$ can be brought into press-contact with the bottom surface of the disc cassette 250 by way of elastic deformation of the elastically deforming portion 121a of the flexible base plate 121.

Figure 22A:
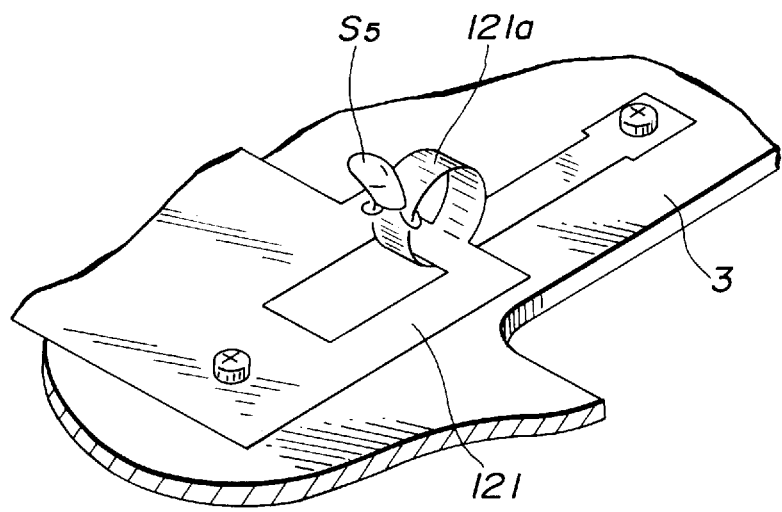
Figure 22B:
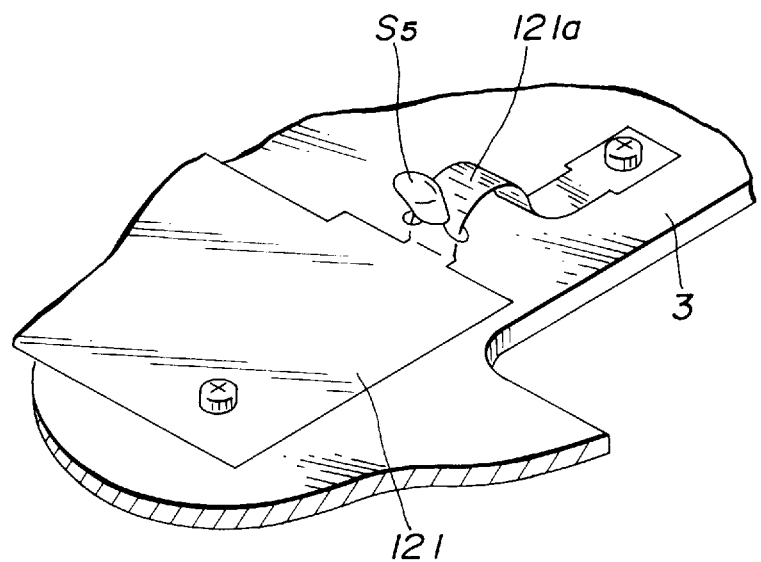
FIG. 22B is a perspective view illustrating am installation state of a modified temperature sensor.
Figure 23:
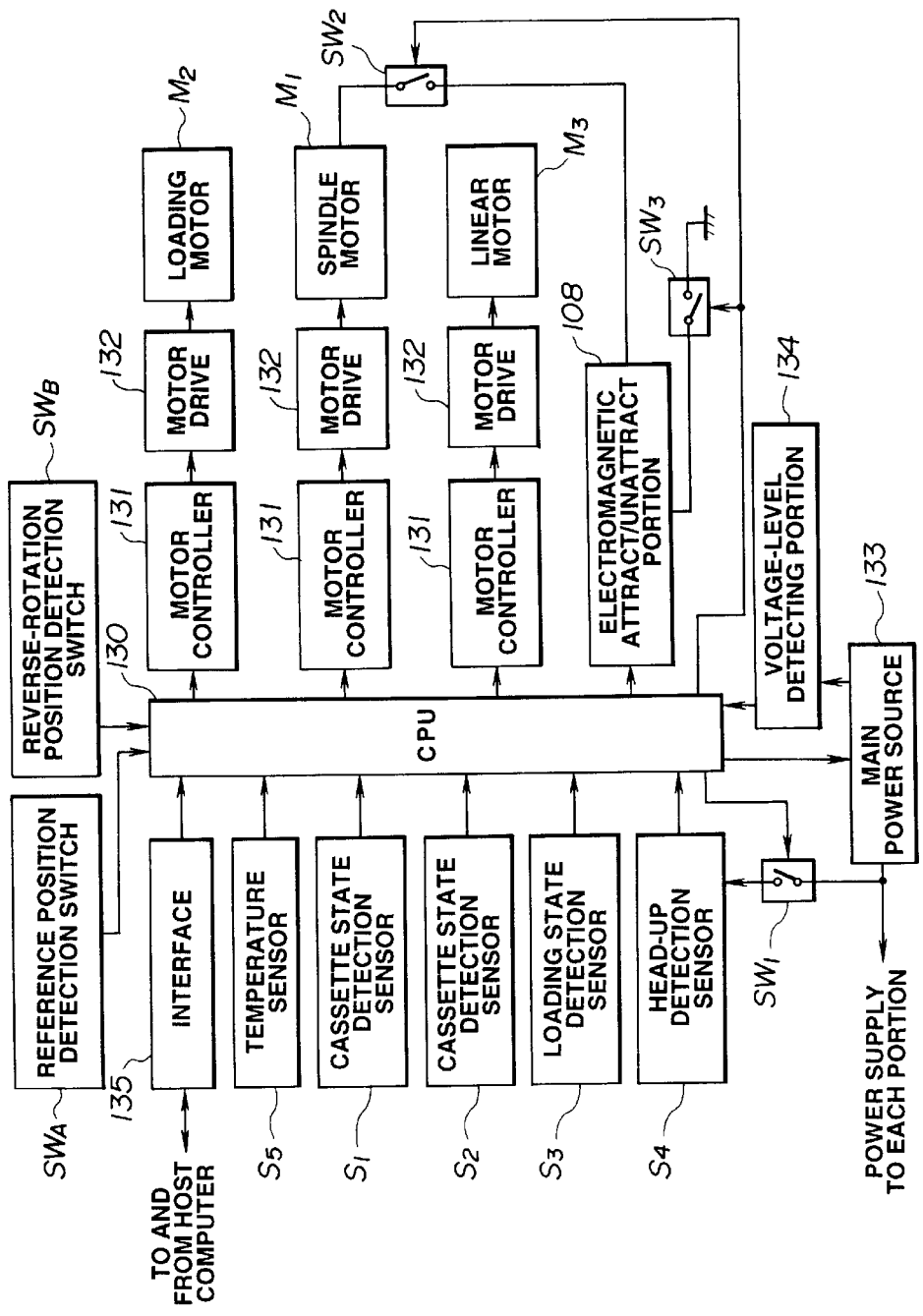
FIG. 23 is a block diagram illustrating a control circuit.

Alternatively, as shown in FIG. 22B, the elastically deforming portion 121a may be formed by bending a part of the flexible base plate 121 in an omega fashion. On the basis of the output from the temperature sensor $S_5$, a drive power for laser beam (not shown) can be controlled.

(14. Explanation of motor control or the like)

The outputs from the reference position detection switch $SW_A$ and the reverse-rotation position detection switch $SW_B$, and the sensors $S_1$ to $S_5$ are supplied to a CPU 130. In order to execute respective programs according to a command, the CPU 130 outputs a command signal to each motor controller 131, so as to start or stop the motor, for instance. Each motor controllers 131 is responsive to the command signal, to output control signals to respective motor drive circuits 132. In accordance with drive signals of the respective motor drive circuits 132, the previously-noted loading motor $M_2$, the spindle motor $M_1$ and the linear motor $M_3$ are driven.

The CPU 130 is constantly connected to a power source. When a power-ON is selected, a main power source 133 outputs a control signal so as to supply electrical power to the respective parts. A first switch $SW_1$ is electrically disposed in an electrical power supply line connected to the head-up detection sensor $S_4$. The opening/closing operation of the first switch $SW_1$ is controlled by the CPU 130. The CPU 130 executes the flow chart illustrated in FIG. 29. The CPU controls the first switch to maintain the first switch $SW_1$ in the ON state in a normal mode, and to maintain the first switch $SW_1$ in the OFF state in a sleep mode.

Firstly, in step S101, a test is made to determine whether a command is generated from a host computer (not shown) through an interface 135. When the command is generated from the host computer, step S102 enters in which a counted value is cleared. Thereafter, step S103 proceeds in which a normal mode is executed on the basis of the command. In step S101, in the absence of the command from the host computer, step S104 proceeds in which the counted value is incremented. Then, in step S105, a test is made to determine whether the counted value exceeds a predetermined value. In the case of the counted value above the predetermined value, this means that the command is not supplied for a predetermined time period or more. In this case, a sleep mode is set and then the first switch $SW_2$ is switched OFF. Thereafter, in step S105, in the case of the counted value below the predetermined value, the procedure returns to step S101. In this manner, the above-noted routine is repeatedly executed. As can be appreciated from the above, by way of the above-noted control procedure, the normal mode or the sleep mode is selectively switchable.

A voltage-level detecting portion 134 detects the output voltage from the main power source 133 so as to output a voltage-drop signal to the CPU 130 when the output voltage is below a predetermined level. In the presence of the voltage-drop signal, the CPU 130 outputs control signals to a second switch $SW_2$ and a third switch $SW_3$ so that the second and third switches are switched ON. If required, the CPU 130 operates to shift the magnetic head 80 to the unloading state and to shift the head carriage 71 to the locked state, by outputting a release pulse to the electromagnetic attracting/unattracting portion 108.

Figure 24:
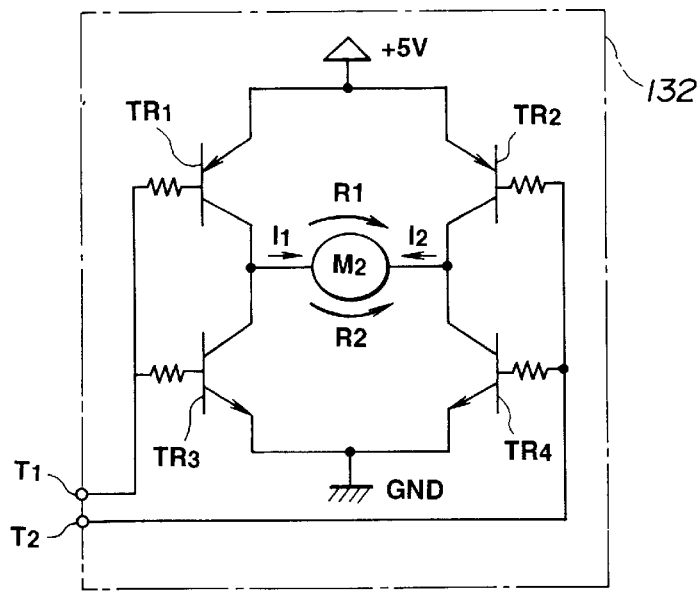
FIG. 24 is a circuit diagram illustrating a motor drive circuit for a loading motor.

Referring to FIG. 24, there is shown a circuit diagram of the motor drive circuit 132 of the loading motor $M_2$. In FIG. 24, the motor drive circuit 132 is constructed in a manner so as to arrange four transistors $TR_1$ to $TR_4$ in bridge-like fashion.

Figure 25:
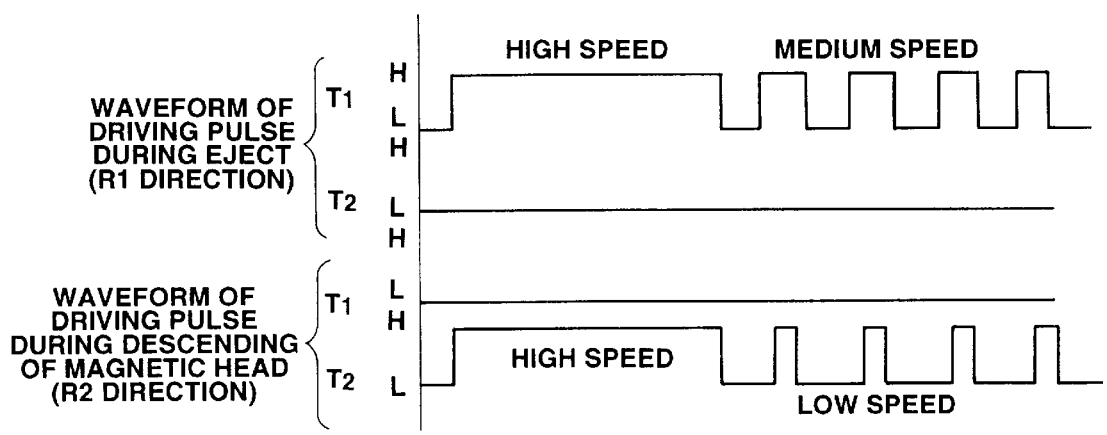
FIG. 25 is an illustration of a waveform of drive signals during respective operations.

Connected between output terminals of the circuit is the loading motor $M_2$ serving as a direct-current motor. In the case that voltages of a same level are applied to respective input terminals $T_1$ and $T_2$, the loading motor $M_2$ is disenergized. In the case that a voltage of the H level is applied to the input terminal $T_1$ and a voltage of the L level is applied to the input terminal $T_2$, a current $I_1$ flows through the loading motor. In contrast to the above, in the case that a voltage of the L level is applied to the input terminal $T_1$ and a voltage of the H level is applied to the input terminal $T_2$, a current $I_2$, flowing in the opposite direction to the current $I_1$, flows through the loading motor. In this manner, the rotational direction of the loading motor $M_2$ can be controlled. The rotational speed of the motor is controlled by varying duty-ratios for the voltages respectively applied to the input terminals $T_1$ and $T_2$, i.e., by way of a pulse-width modulation control (PWM control). During the cassette eject, the CPU 130 performs a flow chart illustrated in FIG. 27, while the motor controller 131 outputs a drive signal having a waveform as shown in FIG. 25. During the descending operation of the magnetic head, the CPU performs a flow chart illustrated in FIG. 26, while the motor controller 131 outputs a drive signal having a waveform as shown in FIG. 25. That is to say, the loading motor $M_2$ is adjusted to a high speed in the former half of the cassette eject operation, to a medium speed in the latter half of the eject operation, to a high speed in the former half of the head descending operation, and to a low speed in the latter half of the head descending operation. As a whole, the rotational speed of the loading motor is controlled to a higher speed during the cassette eject operation and to a lower speed during the head descending operation.

Hereinafter explained in detail is a control routine of descending operation of the magnetic head in accordance with the flow chart indicated in FIG. 26.

Firstly, in step S201, the loading motor $M_2$ is driven at a high speed for a predetermined constant time period so that the output gear 59 is rotated in the direction indicated by the arrow R2. For the above-noted time period, the output gear 59 is rotated without torque transmission. Thereafter, in step S202, the loading motor $M_2$ is driven at a low speed so that the output gear 59 is rotated in the direction indicated by the arrow R2. When the reverse-rotation position detection switch $SW_B$ detects that the pin 60 reaches the point b through step S203, S204 proceeds in which the loading motor $M_2$ is stopped. Subsequently, in step S205, the loading motor $M_2$ is driven to rotate the output gear in the direction indicated by the arrow R1, for the purpose of returning the pin 60 to its reference position. At the time when returning the pin, it is unnecessary for the driving speed of the loading motor $M_2$ to limit to a particular speed. In step S206, the reference position detection switch $SW_A$ detects that the pin 60 reaches the reference position, step S207 enters in which the loading motor $M_2$ is stopped. In this manner, one cycle of the control routine terminates.

Hereinbelow explained in detail is a control routine of ejecting operation of the cassette in accordance with the flow chart indicated in FIG. 27.

Firstly, in step S301, the loading motor $M_2$ is driven at a high speed for a predetermined time period, so that the output gear 59 is rotated in the direction indicated by the arrow R1. In step S302, the loading motor $M_2$ is driven at a medium speed faster than at step S202 shown in FIG. 26, so that the output gear 59 is rotated in the direction indicated by the arrow R1. In step S303, when the reverse-rotation position detection switch $SW_B$ detects that the pin 60 reaches the point a, step S304 enters in which the loading motor $M_2$ is stopped. In step S305, for the purpose of returning the pin 60 to the reference position, the loading motor $M_2$ is driven so that the output gear 59 is rotated in the direction indicated by the arrow R2. In step S305 when returning the pin, it is unnecessary for the driving speed of the loading motor $M_2$ to limit to a particular speed. In step S306, the reference position detection switch $SW_A$ detects that the pin 60 reaches the reference position, step S307 enters in which the loading motor $M_2$ is stopped. In this manner, one cycle of the control routine terminates.

Figure 28:
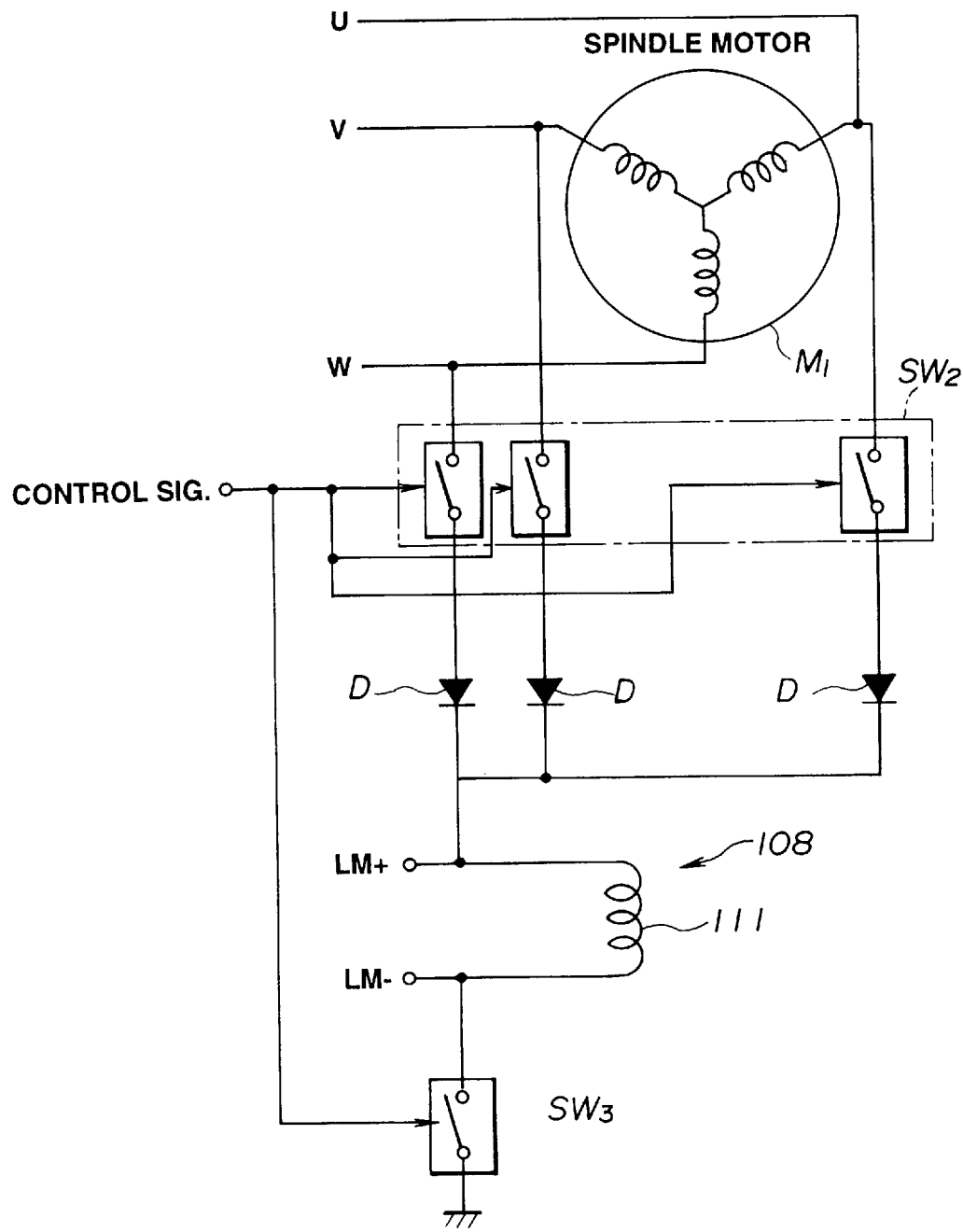
FIG. 28 is a circuit diagram illustrating a part utilizing a counter-electromotive force of a spindle motor.

Referring to FIG. 28, there is shown a circuit diagram of a counter-electromotive force utilizing portion of the spindle motor $M_1$. In FIG. 28, the input terminal of each phase of the spindle motor $M_1$ and one end of the coil portion 111 of the electromagnetic attracting/unattracting portion 108 are connected to each other through a series circuit consisting of the second switch $SW_2$ and a diode D. The other end of the coil portion 111 of the electromagnetic attracting/unattracting portion 108 is grounded through the third switch $SW_3$. When the second and third switches $SW_2$ and $SW_3$ are switched ON in response to the control signal from the CPU 130 during rotation of the spindle motor $M_1$, a counter-electromotive force created by the spindle motor $M_1$ is supplied to the coil portion 111.

(15. Conditions of respective members in a stand-by state for cassette insertion)

Figure 11:
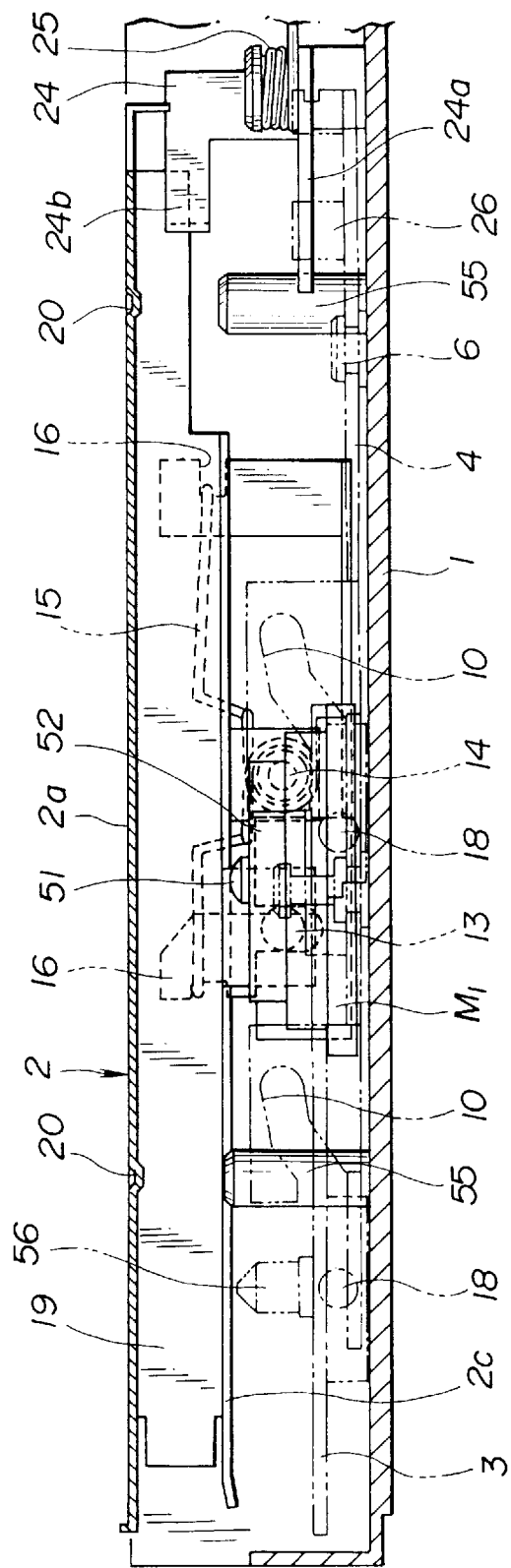
FIG. 11 is a longitudinal cross-sectional view illustrating the disc drive unit in a cassette stand-by state.
Figure 16:
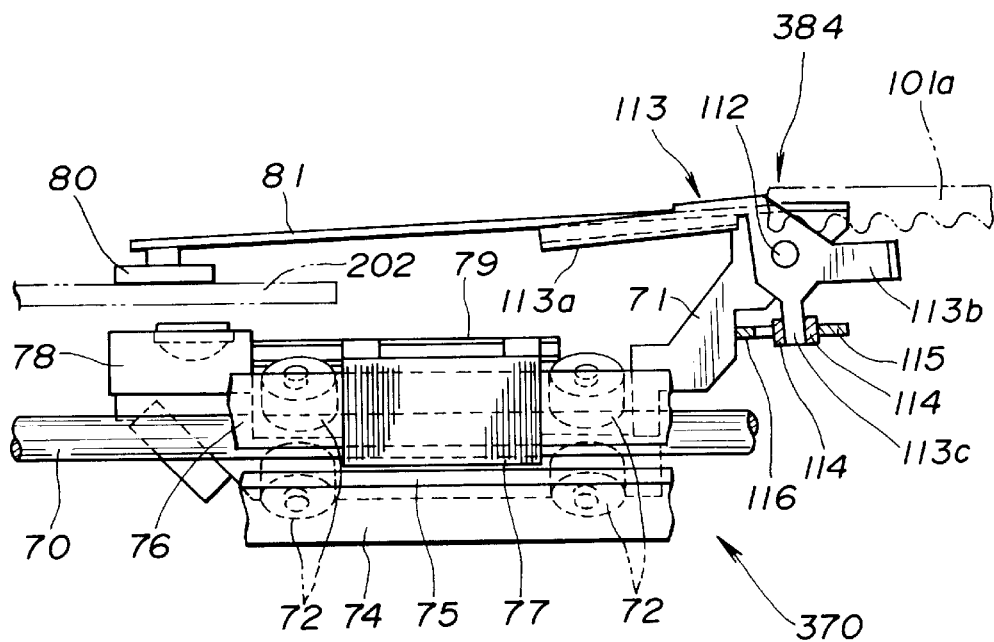
FIG. 16 is a side view illustrating the head mechanism in the loading state.

In this case, since the first lifter control member 101 of the head lifting mechanism I is held in the head-up position (the lower position) and the lifter 113 is held in the lower position, the magnetic head is positioned in the unloading position and additionally the head carriage 71 is locked, as illustrated in FIG. 16. On the other hand, the slide plate 4 is maintained in the unloading position, because its lock pin 26 is engaged with the lock member 24. As shown in FIGS. 11, 13A and 14A, the cassette holder 2 is held in the ascending position, whereas the spindle lifting plate 3 is held in the descending position. In the unloading position of the slide plate 4, the inject support piece 4 of the slide plate 4 engages with the hold pin 40 of the third inject plate 36, and as a result the cassette inject pin 35 is maintained in the stand-by position.

(16. Shutter opening operation)

Figure 30:
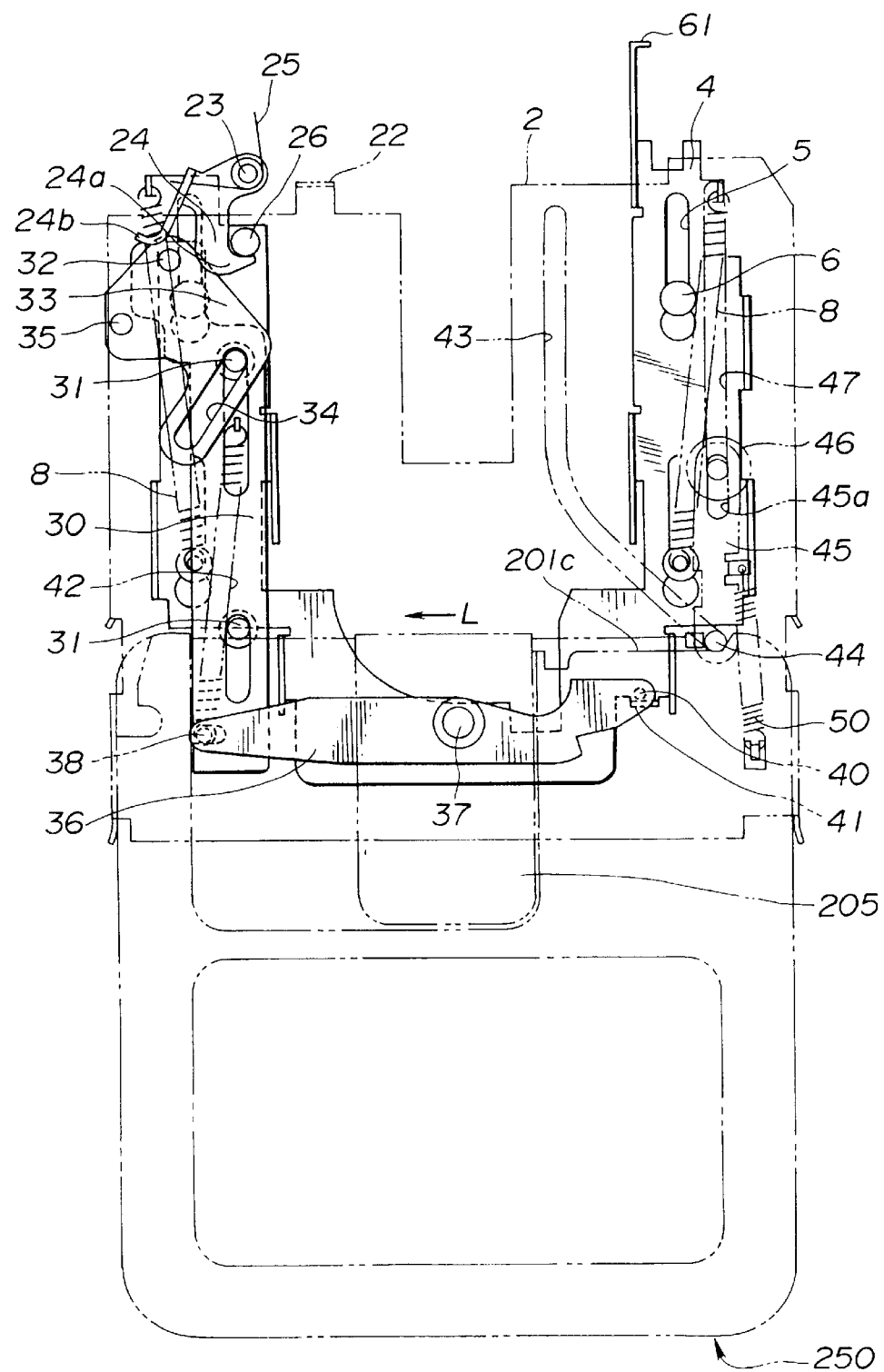
FIG. 30 is a plan view illustrating a state in which the front end surface of the disc cassette abuts the shutter opening pin.
Figure 31:
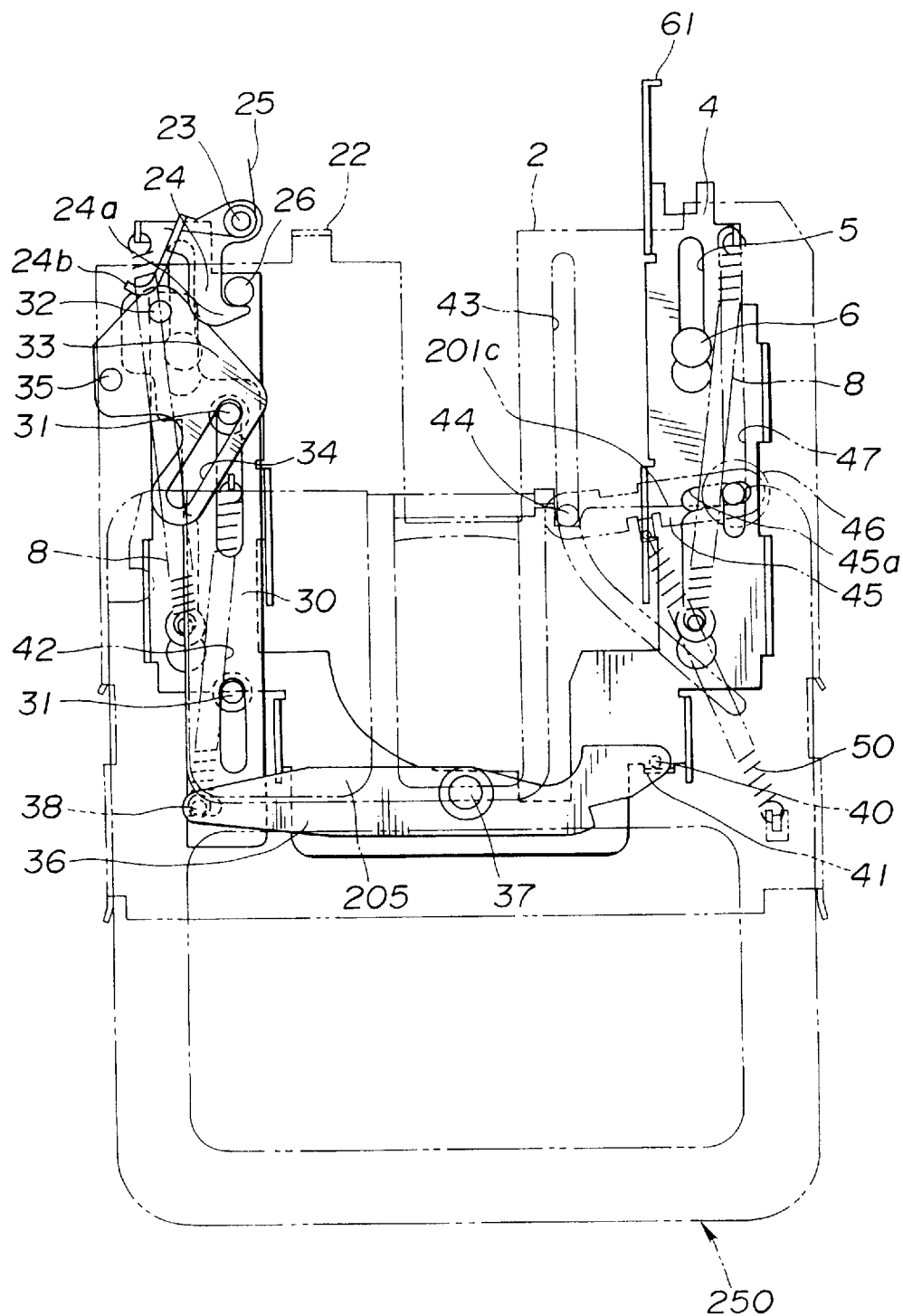
FIG. 31 is a plan view illustrating a state in which a shutter is fully opened.
Figure 35:
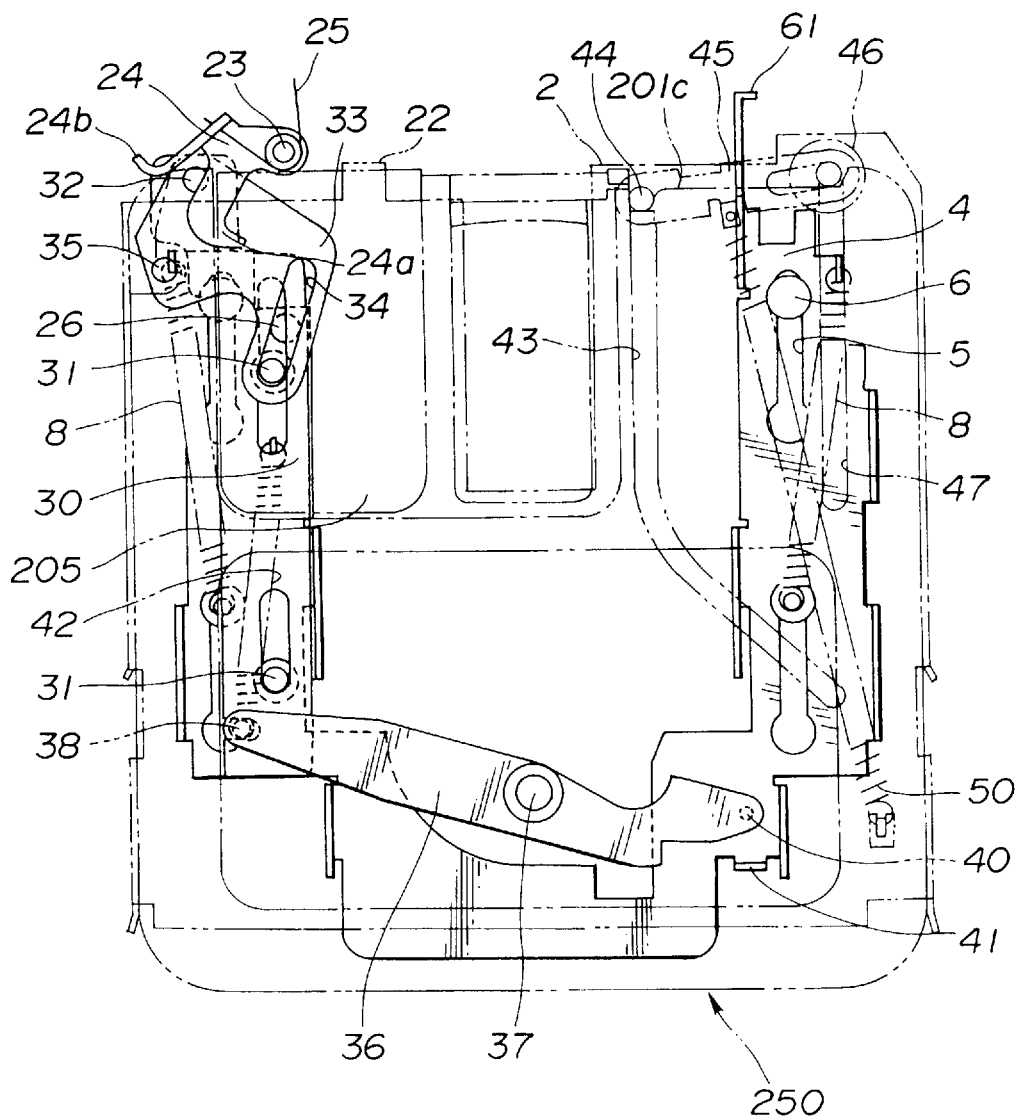
FIG. 35 is a plan view illustrating a state in which the disc cassette is positioned in its insertion completion position.

Under the cassette stand-by condition, when the disc cassette 250 is inserted into the cassette holder 2, the inserted front end surface 201*c* of the disc cassette 250 is brought into abutment with the shutter opening pin 44, as illustrated in FIG. 30. When the disc cassette 250 is further inserted into the inside, the shutter opening pin 44 moves along the cam hole 43 against the contraction of the coil spring 50, and thus the shutter 205 is gradually opened, while moving in the direction indicated by the arrow L. As shown in FIG. 31, when the shutter opening pin 44 is transferred from the sloped portion of the cam hole 43 to the straight portion, the shutter 205 is fully opened and additionally the inserted front end surface 201*c* of the disc cassette 250 abuts the moveable guide pin 46. Under this condition, when the disc cassette 250 is further inserted into the inside, the shutter opening pin 44 moves along the cam hole 43 and the moveable guide pin 46 moves along the guide hole 47. That is, the moveable plate 45 moves in parallel in the cassette insertion direction against the contraction of the coil spring 50, and the disc cassette 250 reaches the position of completion of insertion, as shown in FIG. 35.

(17. Cassette auto-inject operation)

Figure 32:
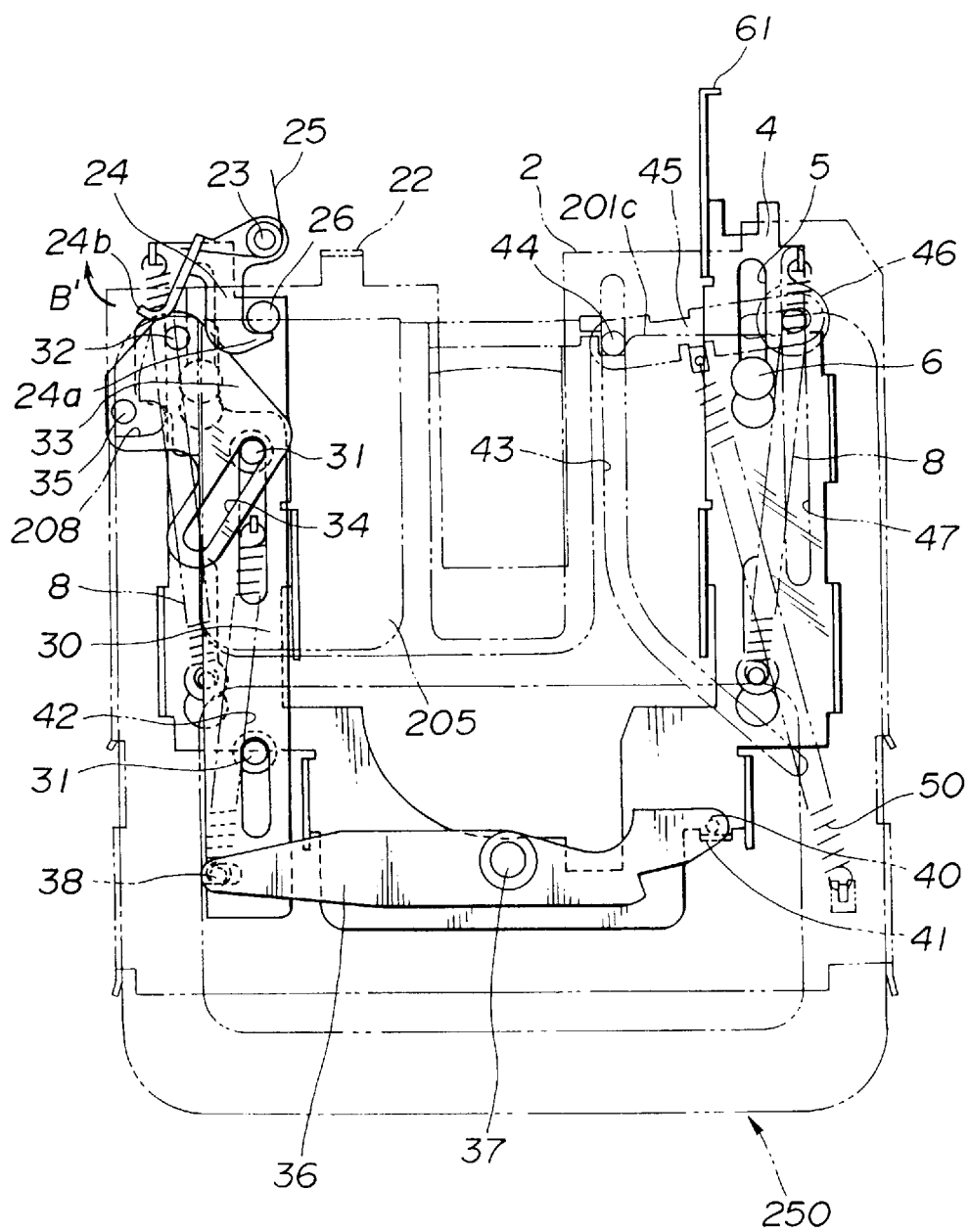
FIG. 32 is a plan view illustrating a state in which the front end surface of the disc cassette abuts a release lever portion of a lock member.
Figure 33:
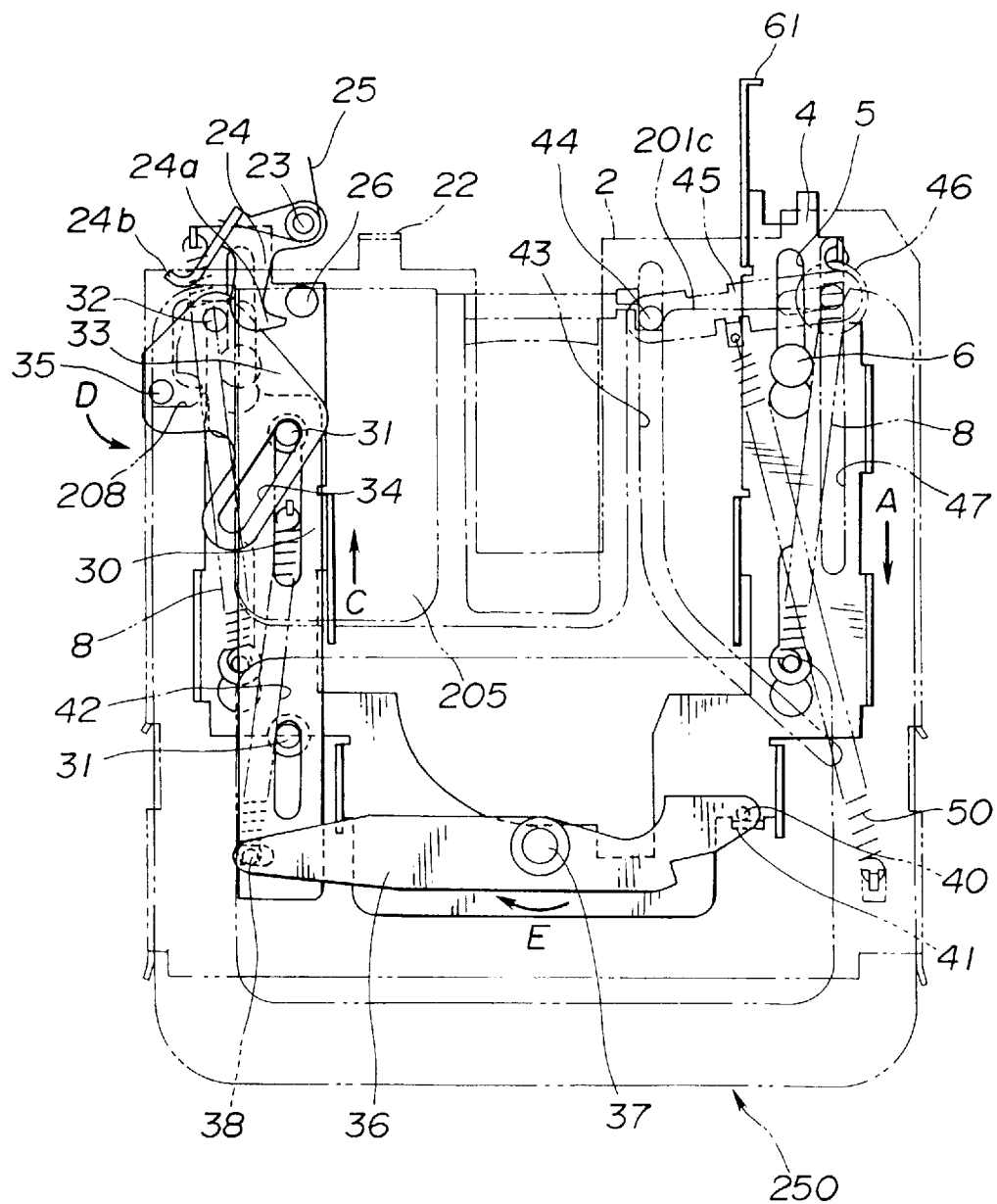
FIG. 33 is a plan view illustrating a moment when the lock member is unlocked.

In the inserting process of the disc cassette 250, as shown in FIG. 32, the lock member 24 rotates in the direction indicated by the arrow B' against the bias of the coiled torsion spring 25 by pushing the release lever 24*b* of the lock member 24 by the inserted front end of the disc cassette 250, thereby permitting insertion of the disc cassette 250 into the inside. Just before the lock pin 26 is unlocked, the cassette inject pin 35 is positioned in the inlet of the cassette inject groove 208 of the disc cassette 250. As shown in FIG. 33, when the lock pin 26 is unlocked, the slide plate 4 slides in the direction (toward the loading position) indicated by the arrow A. Owing to the above-noted sliding movement, restriction to the hold pin 40 is released, and as a result the third inject plate 36 can rotate in the direction indicated by the arrow E.

Figure 34:
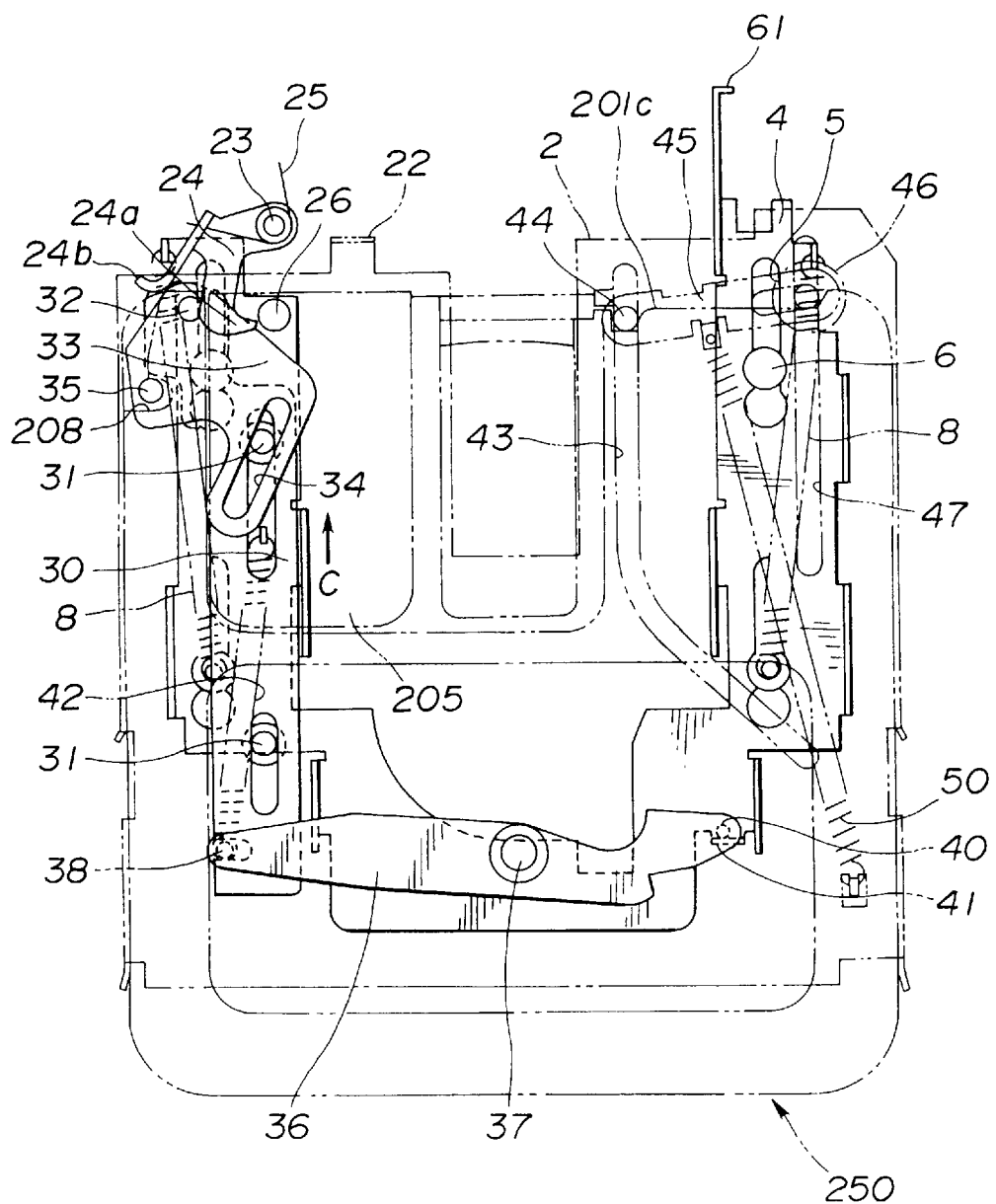
FIG. 34 is a plan view illustrating a state in which the disc cassette is pulled into the interior by the cassette inject pin.

Rotation of the third inject plate 36 permits the first inject plate 30 to slide in the direction indicated by the arrow C and permits the second inject plate 33 to rotate in the direction indicated by the arrow D. Thus, the cassette inject pin 35 enters the inject groove 208 of the disc cassette 250, as shown in FIG. 34. Under this condition, a further sliding movement of the first inject plate 30 in the direction indicated by the arrow C by way of the contraction of the coil spring 42, permits the disc cassette 250 to be automatically injected into the cassette holder 2. In this manner, as illustrated in FIG. 35, the disc cassette reaches the insertion completion position in which the inserted front end surface 201*c* of the disc cassette 250 abuts the cassette stopper 22.

For the inserting operation of the disc cassette 250, as shown in FIG. 5B, since the height of the cassette insertion space defined in the cassette holder 2, is so dimensioned to be greater than the thickness of the disc cassette 250, the disc cassette 250 can be smoothly inserted to the insertion completion position. For the same reasons, the disc cassette can be smoothly ejected during the cassette eject.

(18. Operation during cassette loading (cassette positioning, disc loading))

Figure 12:
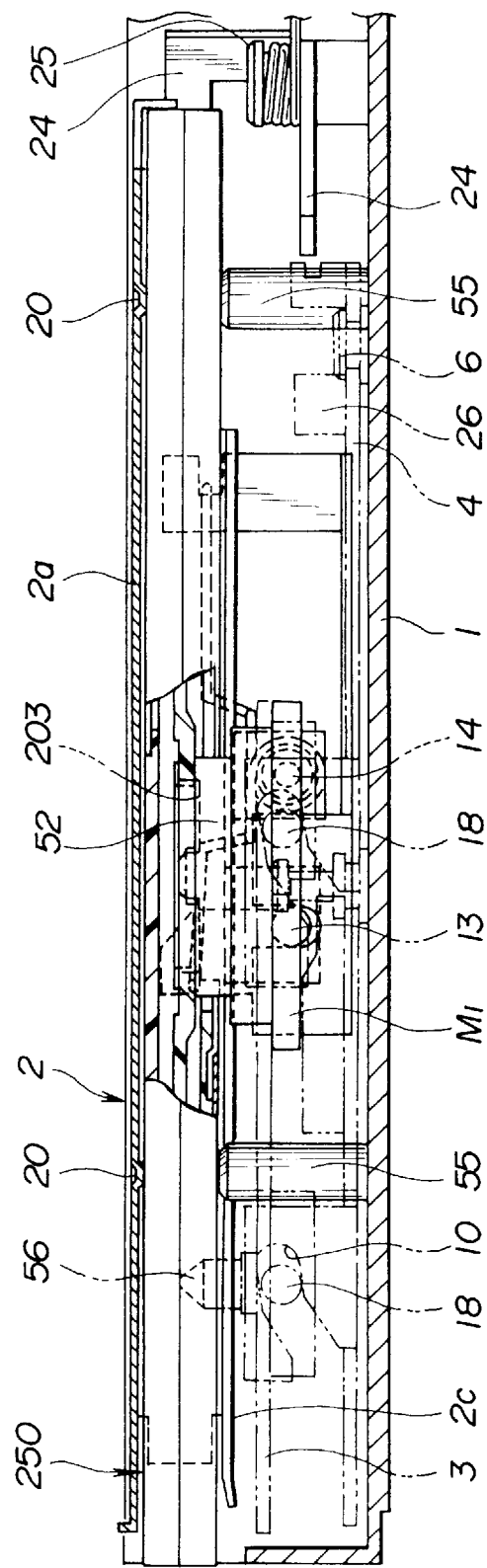
FIG. 12 is a longitudinal cross-sectional view illustrating the disc drive unit in a cassette loading state.
Figure 15:
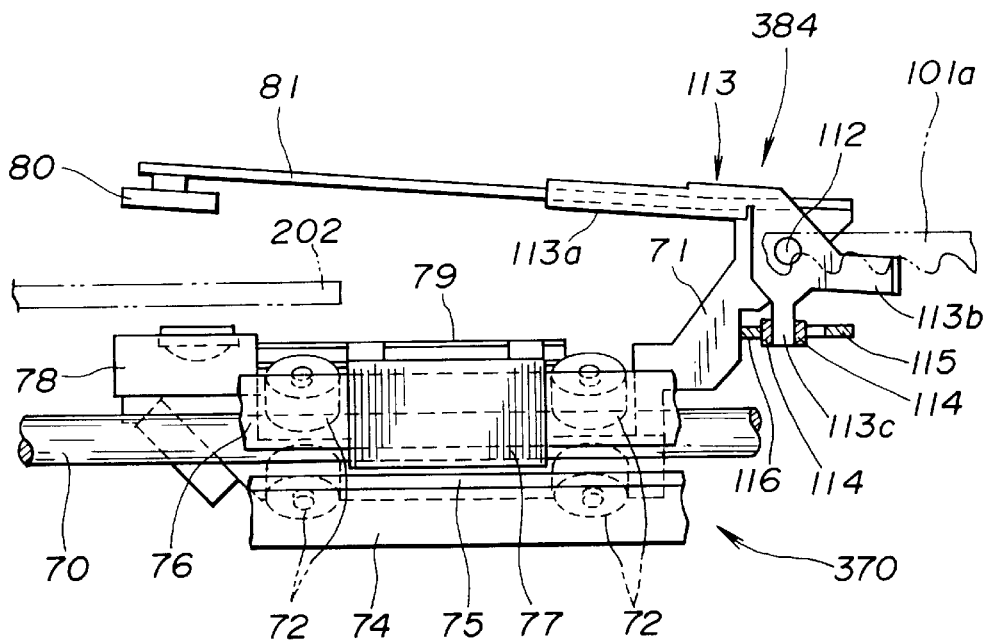
FIG. 15 is a side view illustrating the head mechanism in the unloading state.

After the disc cassette 250 is injected into the insertion completion position, the inserting operation for the slide plate 4 is continued, and as a result the spindle lifting plate 3 is moved along the spindle lifting guide groove 10 and shifted to the upper position, and additionally the cassette holder 2 is moved along the holder lifting guide surface 9, and shifted to the lower position by virtue of the bias of the coiled torsion spring 15, as seen in FIGS. 12, 13B and 14B.

The lifting motion of the spindle lifting plate 3 and the descending motion of the cassette holder 2 permit the turn table 52 to approach to the hub 203 of the magneto-optical disc 202. As a result, the hub 203 is attracted onto the turn table 52 by way of a magnetically attracting force caused by the magnetic member 53, such that the magneto-optical disc 202 can be driven by the spindle motor $M_1$.

Owing to the ascending motion of the spindle lifting plate 3 and the descending motion of the cassette holder 2, the positioning pin pair 56 standing on the spindle lifting plate 3 are inserted into the positioning grooves 208 of the disc cassette 250. Due to the descending motion of the cassette holder 2, the four height-level positioning members 55 attached onto the chassis 1, are brought into abutment with the bottom surface of the disc cassette 250 within the cassette insertion space 19. That is to say, as shown in FIGS. 12, 13B and 14B, the positioning of the disc cassette 250 with respect to the horizontal direction, is achieved by way of insertion of the positioning pins 56 into the positioning grooves 208, whereas the positioning of the disc cassette with respect to the vertical direction, is achieved by supporting the upper surface of the disc cassette by projected portions 20 of the upper wall portion 2*a* of the cassette holder 2 and by supporting the bottom surface of the disc cassette by the four height-level positioning members 55. Also, since the square disc cassette 250 is supported at its four corners lying within its reference plane by the height-level positioning members 55, a precise positioning with respect to the vertical direction can be ensured. Furthermore, the disc cassette 250 supported by the height-level positioning members 55 are merely pushed by the projected portions 20 facing the respective height-positioning members 55, the positioning of the disc cassette is precisely achieved with respect to the vertical direction, even when the upper half 201*a* of the disc cassette 250 is deformed to be raised in the vicinity of its central portion.

(19. Spindle motor drive & Unlock operation of Head carriage)

The pair of cassette state detection sensors $S_1$ and $S_2$ are lifted up together with the spindle lifting plate 3 and shifted to their detectable position. Depending on the write protected state of the disc cassette, only one of the outputs from the sensors is switched from the L level to the H level, in case of the disc cassette 250 used as a RAM. In contrast, in case of the disc cassette 250 used as a ROM, the outputs from the sensors are both switched from the L level to the H level.

When the slide plate 4 is shifted from the unloading position to the loading position, the output of the loading state detection sensor $S_3$ is switched from the L level to the H level.

Under a particular condition wherein the at least one of the outputs from the cassette state detection sensors $S_1$ and $S_2$, becomes kept at the H level and the output from the loading state detection sensor $S_3$ becomes kept at the H level, the CPU determines that the disc cassette 250 is conditioned in the loading state. Then the CPU operates to drive the spindle motor $M_1$ and to unlock the head carriage 71, as follows. That is, by driving the loading motor $M_2$, the drive pin 60 is rotated in the direction indicated by the arrow R2 and displaced from the reference position to the point b, and further returned from the point b to the reference position by way of the reverse rotation to the direction indicated by the arrow R1. Thus, the first lifter control member 101 is displaced from the lower position to the upper position, with the result that the head carriage 71 is unlocked. A judgment as to whether or not the first lifter control member 101 has been displaced to the upper position, is made by checking whether or not the output from the head-up detection sensor $S_4$ is switched to the H level. In case of the output of the L level, the unlocking operation is repeated again.

(20. Magnetic head descending operation)

The CPU 130 is responsive to the outputs from the cassette state detection sensors $S_1$ and $S_2$ to discriminate a class of the loaded disc cassette 250 and to read out a disc class data recorded on the magneto-optical disc 202 by way of a photo detector (not shown) through the objective lens 78, consequently to discriminate the class of the disc cassette 250. Based on both the discriminations, in the case that the disc cassette is used as a ROM, the unit waits for a next command in the unloading state without descending the magnetic head 80.

In contrast, based on both the discriminations, in the case that the disc cassette is used as a RAM, the magnetic head 80 is descended in the following order. In detail, the linear motor 73 is first driven, in a manner so as to move the head carriage 71 to the outermost peripheral position. Next, the loading motor $M_2$ is driven to rotate the drive pin 60 in the direction indicated by the arrow R2, so as to shift the output pin from the reference position to the point b and to return again the output pin to the reference position with reverse rotation of the motor to the direction indicated by the arrow R1. Thus, the second lifter control member 96 is displaced from the lower position to the upper position, with the result that the second lifter control member 96 pushes the lever portion 113*b* of the lifter 113 up. The pushing force produces a downward displacement of the lifter 113, and thus the magnetic head 80 moves downward owing to the recovery of deformation of the head arm 81, as shown in FIG. 16. Then, a lift caused by rotation of the magneto-optical disc 202 exerts on the magnetic head 80, so that the unit is maintained in the loading state in which the magnetic head is floated and traveled on the magneto-optical disc. In the above-noted loading state, the unit waits for a next command for a recording or reproduction.

Figure 26:
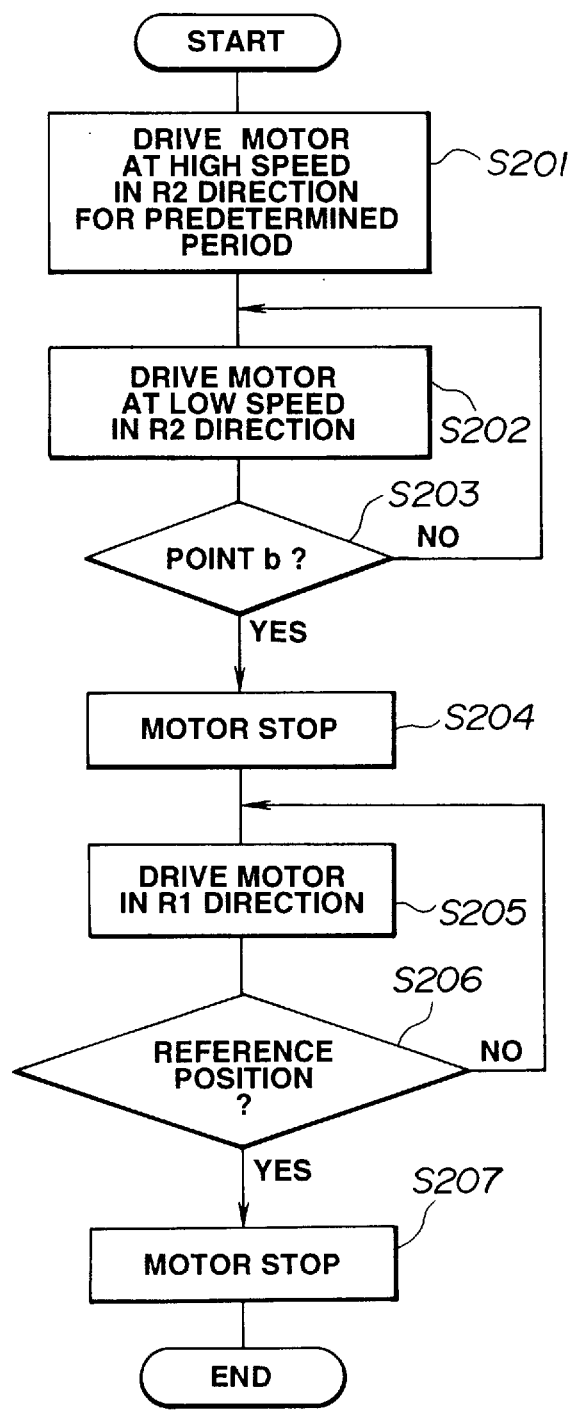
FIG. 26 is a flow chart during descending operation of the magnetic head.

Hereinafter described in accordance with the flow chart shown in FIG. 26 is the control of the loading motor $M_2$ during descending operation of the magnetic head. That is, the loading motor $M_2$ is driven at a high speed in the direction indicated by the arrow R2 for a predetermined time duration, by outputting the drive signal having a waveform as shown in FIG. 25. After the predetermined time duration has elapsed, the motor is driven at a low speed. Thus, the speed of displacement of the second lifter control member 96 from the lower position to the upper position is set to a high speed at the former half of the displacement, and to a very slow speed at the latter half. Accordingly, the magnetic head 80 which descends with restriction on the head through the lift-up portion 113*a* of the lifter 113, the magnetic head can make a soft landing on the magneto-optical disc 202. This avoids damage to the disc surface owing to collision contact between the magnetic head 80 and the magneto-optical disc 202 and to avoid the focusing-error owing to the contact between the magnetic head 80 and the disc surface, and additionally to prevent a longer descending time of the head, because the descending speed of the magnetic head 80 is controlled to be a high speed at the former half of the descending motion.

(21. Operation during sleep mode)

Figure 29:
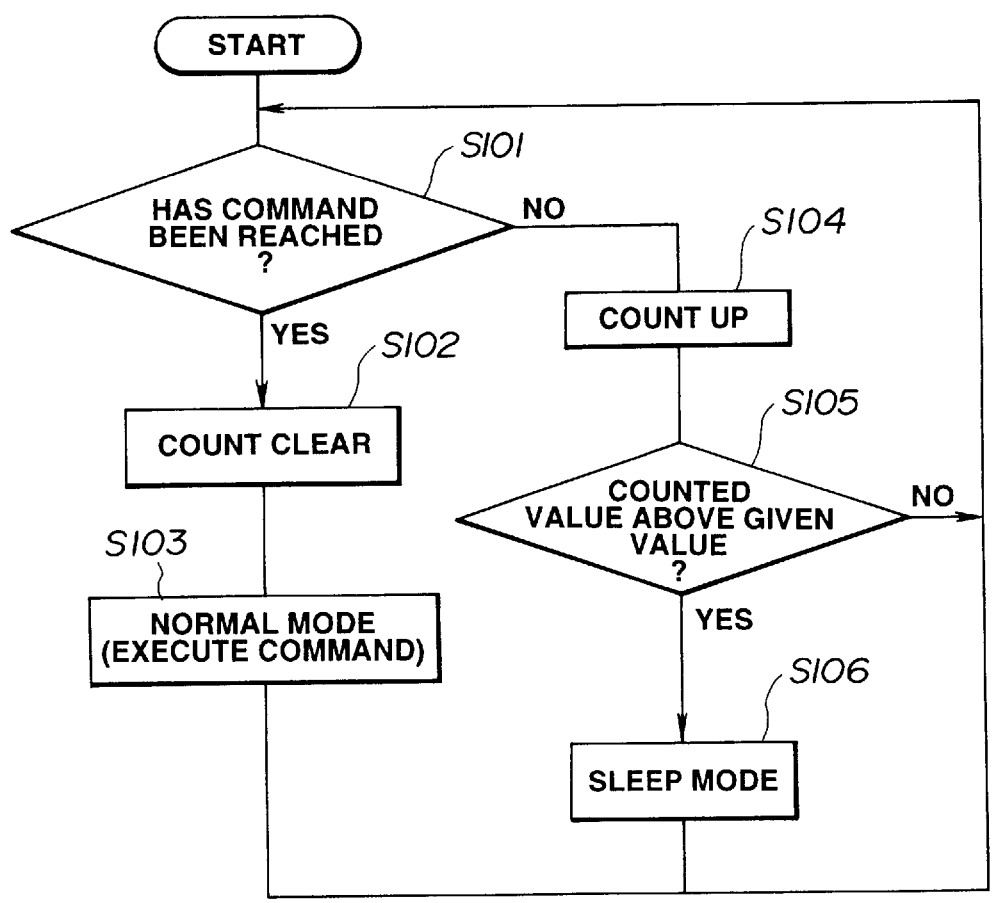
FIG. 29 is a flow chart illustrating a switching relation among a normal mode and a sleep mode.

As set forth above, in the case that the loaded disc cassette 250 is held in its recordable/reproducible state, when waiting for a next command, the CPU 130 operates to shift its internal counter at the count-up state, as shown in the flow chart of FIG. 29. Thereafter, when the counted value has exceeded a predetermined value, i.e., when the predetermined time duration has elapsed without receiving the next command, the sleep mode is established. When entering the sleep mode, the CPU 130 stops the power supply to the head-up detection sensor $S_4$ by switching the first switch $SW_1$ OFF. Traditionally, the head-up detection sensor $S_4$ is necessary only when the unit is turned ON or during insertion of the cassette. The electric power consumption can be reduced by shutting off the electric power supply for a particular time zone in which there is no necessity of the sensor $S_4$.

When receiving the next command before the counted value of the counter exceeds the predetermined value, the counted value of the counter is cleared and the next command is executed.

(Operation during service interruption)

Owing to service interruption or the like, in the event that the electric power supply is shut off, the voltage-level detecting portion 134 detects a voltage drop that the detected voltage becomes below the predetermined voltage level, so as to output a signal to the CPU 130. Hence, the CPU 130 generates control signals so as to switch the second and third switches $SW_2$ and $SW_3$ ON. In this manner, a counter-electromotive force produced by the spindle motor $M_1$ is supplied to the electromagnetic attracting/unattracting portion 108, with the result that a counter-magnetic field is produced. Owing to the counter-magnetic field, the first lifter control member 101 rotates in the direction indicated by the arrow K by way of the contraction of the coil spring 103, so that the first lifter control member is shifted from the upper position to the lower position. Due to the displacement of the first lifter control member 101, the lever portion 113*b* of the lifter 113 is pushed down and the lifter is shifted to the upper position, such that the magnetic head 80 is conditioned in the unloading state. Additionally, the lever portion 113*b* of the lifter 113 is engaged with the saw-toothed portion 105 of the first lifter control member 101, and as a result the head carriage 71 is held in the locked state.

When released from the above-noted service interruption, the unlocking operation for the head carriage 71 is performed.

(23. Operation during cassette eject)

When the cassette eject mode is selected, the CPU 130 stops the spindle motor $M_1$ and validates that the rotation of e spindle motor $M_1$ has been stopped. Thereafter, the CPU 130 drives the loading motor $M_2$ to rotate the output pin 60 in the direction indicated by the arrow R1 so that the output pin is displaced from the reference position to the point a and returned to the reference position with the reverse rotation from the point a to the direction indicated by the arrow R2. In this case, according to the rotation of the output pin 60 in the direction indicated by the arrow R1, the injectable bent piece 61 of the slide plate 4 is pushed, with the result that the slide plate 4 slides to the unloading position against the contraction of the coil spring 8. Owing to the former half of the sliding movement of the slide plate 4, the spindle lifting plate 3 is moved along the spindle lifting guide groove 10 and displaced to the lower position, and additionally the cassette holder 2 is moved along the holder lifting guide surface 9 and displaced to the upper position against the bias of the coiled torsion spring 15.

Due to the downward displacement of the spindle lifting plate 3, the turn table 52 is spaced apart from the hub 203 of the magneto-optical disc 202, and also the positioning pins 56 are disengaged from the positioning grooves 206 of the disc cassette 250. Due to the upward displacement of the cassette holder 2, the four height-level positioning members 55 are moved out of the cassette insertion space 19.

Owing to the latter half of the sliding movement of the slide plate 4, the injectable support piece 41 of the slide plate 4 pushes the hold pin 40, and as a result the third inject plate 36 rotates in the direction indicated by the arrow E' against the contraction of the coil spring 42. By way of rotation of the third inject plate 36, the first inject plate 30 slides in the direction indicated by the arrow C', and thus the second inject plate 33 rotates in the direction indicated by the arrow D'. Owing to the sliding movement of the first inject plate 30 and the rotational movement of the second inject plate 33, the cassette inject pin 35 rotates in the direction indicated by the arrow C', rotating in the cassette eject direction, so that it goes out of the inject groove 208 of the disc cassette 250. Thus, a restricting force on the disc cassette 250 is released, the shutter opening pin 44 moves along the cam groove 43 to its starting point by way of the bias of the coil spring 50, with the result that the disc cassette 250 is moved in the eject direction by pushing the cassette with the shutter opening pin 44. In this manner, the disc cassette 250 is forcibly ejected out of the cassette holder 2.

Figure 27:
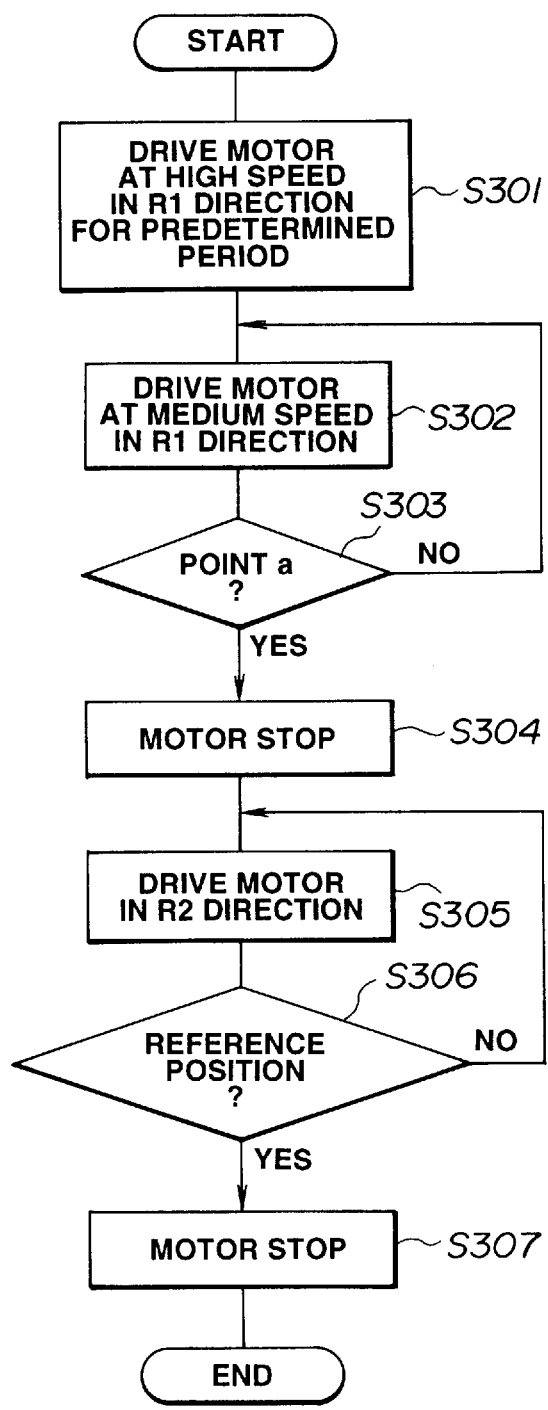
FIG. 27 is a flow chart during the cassette eject.

During the cassette eject operation, the control for the loading motor $M_2$ is executed on the basis of the flow shown in FIG. 27. That is, in accordance with the output of the drive signal of the waveform shown in FIG. 27 to the loading motor $M_2$, the motor is driven at a high speed for a predetermined period of time in the direction indicated by the arrow R1, and driven at a medium speed after the predetermined time period has elapsed. As a result of the above, the displacing speed of the slide palate 4 from the loading position to the unloading position is controlled to be a high speed during a former half, and to be a lower speed than the former half during a latter half. Therefore, the cassette eject operation can be performed very quickly. Since the displacing speed is set to the medium speed during the latter half, when stopping the motion of the slide plate 4 and the motion of the spindle lifting plate 3 linked to it, mechanical shock can be suppressed to the same extent as the prior art unit.

During the above-noted operation, the slide plate 4 reaches the unloading position at the time when the cassette inject pin 35 goes out of the inject groove 208 of the disc cassette 250. The lock member 24, being free from the restriction thereon, rotates in the direction indicated by the arrow B by way of the bias of the coiled torsion spring 25 and engages with the lock pin 26 of the slide plate 4, and whereby the slide plate is held in the unloading position even if the output pin 60, shifting the slide plate to the unloading position, is returned from the point a to the reference position.

On the other hand, during the sliding movement of the slide plate 4, the injectable bent piece 61 of the slide plate 4 pushes the pushed portion 87a of the sub-slider 87 of the head lifting mechanism 380. Subsequently to the sub-slider 87, the main-slider 85 also shifts in the direction indicated by the arrow H', and thus the second pushing pin 91 of the sub-slider 87 pushes up the pin portion 104 of the first lifter control member 101. As a result, the first lifter control member 101 is displaced from the upper position to the lower position by way of the contraction of the coil spring 103. Owing to the displacement of the first lifter control member 101, the lever portion 113b of the lifter 113 is pushed down and the lifter 113 is displaced to the upper position, and thus the magnetic head 80 is maintained in the unloading state. Also, the lever portion 113b of the lifter 113 is engaged with the saw-toothed portion 105 of the first lifter control member 101, with the result that the head carriage 71 is becomes locked.

As will be appreciated from the above, according to the present invention, since the disc rotating mechanism is provided to be moveable up and down with respect to the chassis, the cassette holder is provided to be moveable up and down, the positioning member is provided at the chassis for positioning the disc cassette in the vertical direction, and during loading of the disc cassette the disc cassette can be positioned in the vertical direction (the direction of height of the disc cassette) by way of the positioning members, while the cassette holder descends toward the chassis, it is not required to provide a restricting member such as cassette pushing portions on the cassette holder for restricting the movement of the disc cassette, and thus preventing the disc cassette from being brought into sliding-contact with such cassette pushing portions, during the cassette eject or during the cassette inject. This prevents undesired wear at the upper wall of the disc cassette and ensures a smooth ejecting and injecting operation of the disc cassette.

According to the invention, since four corners of a substantially square disc cassette is supported by way of the positioning members in the height direction of the cassette, the positioning of the disc cassette can be achieved with a high accuracy.

According to the invention, since upper and lower surfaces of the disc cassette, which surfaces extend at the four corners of the cassette, are supported by the projected portions of the cassette holder and the height-positioning members formed on the chassis, a precise positioning can be made in the height direction of the disc cassette, even when the central portion of the upper surface of the disc cassette deforms in convex fashion.

Furthermore, in a disc drive unit made according to the invention, in which a cassette eject operation and a head descending operation are performed by utilizing a same loading motor, a rotational speed of the loading motor is set to be faster during the cassette eject operation and to be slower during the head descending operation, and thus ensuring a quick cassette eject operation and preventing damage to the disc surface and the focusing-error during the head descending operation.

According to the invention, the rotational speed of the loading motor is set to be faster during the former half of the head descending operation and to be slower during the latter half, thereby enabling the magnetic head to make a soft landing on the disc surface without increasing the entire time period required for completion of descending motion of the head.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A disc driving apparatus for driving a disc recording medium accommodated in a disc cassette, said apparatus comprising:

a chassis;

a cassette holder having an upper wall section and a lower wall section spaced apart from said upper wall section by a distance slightly greater than a thickness of said disc recording medium, and being moveable up and down between an upper position and a lower position with respect to said chassis, and the disc cassette being injectable into and ejectable from an internal space defined between said upper and lower wall sections, said cassette holder having one of a first guide pin and a first guide surface;

a disc rotating mechanism provided to be moveable up and down between an upper position and a lower position with respect to said chassis, and being chucked with said disc recording medium accommodated in said disc cassette at said upper position, for rotatively driving said disc recording medium, said disc rotating mechanism having one of a second guide pin and a second guide surface;

height-level positioning members fixedly attached to said chassis so that at least an upper end of each of said height-level positioning members is located at a higher level than said lower wall section of said cassette holder, said upper ends of said positioning members define a non-movable reference plane relative to said chassis to support a bottom surface of the disc cassette thereon when said cassette holder is held at its lower position; and moving means for simultaneously moving said cassette holder from its upper position to its lower position and for shifting said disc rotating mechanism from its lower position to its upper position, during loading of said disc cassette, said moving means including a slide plate that is slideably mounted to said chassis, said slide plate having the other one of the first guide pin and first guide surface, and having the other one of the second guide pin and the second guide surface, wherein when said slide plate slides relative to said chassis from a first position to a second position, said first guide pin slides along said first guide surface to move said cassette holder from its upper position to its lower position, and said second guide pin slides along said second guide surface to shift said disc rotating mechanism from its lower position to its upper position.

2. An apparatus as set forth in claim 1, wherein said height-level positioning members are provided on four places of said chassis, to support the bottom surface of said disc cassette in a vicinity of four corners of said disc cassette having a substantially square shape.

3. An apparatus as set forth in claim 2, wherein said cassette holder has projected portions downwardly projecting from its upper wall section so that said projected portions face the respective height-level positioning members.

4. An apparatus as set forth in claim 1, wherein said moving means comprises a loading motor and a gear being rotatively driven by said loading motor by gear teeth formed on an outer periphery of said gear, said gear having a motion transmission area in which a toothed portion of said periphery having said gear teeth is formed within a first predetermined angular range of said gear and a dead area in which a non-toothed portion of said periphery not having said gear teeth is formed within a second predetermined angular range of said gear.

5. An apparatus as set forth in claim 1, further comprising a flexible base plate attached to said disc rotating mechanism so that a portion of said flexible base plate is deformable elastically, and a temperature sensor being attached to said portion of said flexible base plate to abut with a lower surface of said disc cassette when said disc rotating mechanism is held in its upper position.

6. An apparatus as set forth in claim 1, wherein said slide plate slides in a direction that is substantially perpendicular to the up and down movement of said cassette holder and said disc rotating mechanism.

7. A disc driving apparatus for driving a disc recording medium accommodated in a disc cassette, said apparatus comprising:

a chassis;

a cassette holder having an upper wall section and a lower wall section spaced apart from said upper wall section by a distance slightly greater than a thickness of said disc recording medium, and being moveable up and down between an upper position and a lower position with respect to said chassis, and the disc cassette being injectable into and ejectable from an internal space defined between said upper and lower wall sections;

a disc rotating mechanism provided to be moveable up and down between an upper position and a lower position with respect to said chassis, and being chucked with said disc recording medium accommodated in said disc cassette at said upper position, for rotatively driving said disc recording medium;

height-level positioning members provided at said chassis, so that at least an upper end of each of said height-level positioning members is located at a higher level than said lower wall section of said cassette holder, when said cassette holder is held at its lower position;

moving means for moving said cassette holder from its upper position to its lower position and for shifting said disc rotating mechanism from its lower position to its upper position, during loading of said disc cassette;

a magnetic head applying a magnetic field to said disc recording medium consisting of a magneto-optical disc;

a magnetic-head moving mechanism moving said magnetic head from its loading position to its unloading position;

an eject mechanism ejecting said disc cassette;

a motor;

transmission means for transmitting a rotational force of said motor to said magnetic-head moving mechanism by rotation of said motor in its one rotational direction and for transmitting the rotational force of said motor to said eject mechanism by rotation of said motor in its other rotational direction; and control means for controlling said motor so that a rotational speed of said motor in said other rotational direction is faster than a rotational speed of said motor in said one rotational direction.

8. A disc driving apparatus for driving a disc recording medium accommodated in a disc cassette, said apparatus comprising:

a chassis;

a cassette holder defining a internal space and being moveable up and down between an upper position and a lower position with respect to said chassis, the disc cassette being injectable into and ejectable from said internal space, said cassette holder having one of a first guide pin and a first guide surface;

a disc rotating mechanism provided to be moveable up and down between an upper position and a lower position with respect to said chassis, and being chucked with said disc recording medium accommodated in said disc cassette at said disc rotating mechanism upper position, for rotatively driving said disc recording medium, said disc rotating mechanism having one of a second guide pin and a second guide surface;

a plurality of height-level positioning members extending from said chassis and having upper ends that together define a non-movable reference plane relative to said chassis for supporting a bottom surface of the disc cassette thereon when said cassette holder is held at its lower position; and moving means for simultaneously moving said cassette holder from its upper position to its lower position and for shifting said disc rotating mechanism from its lower position to its upper position, during loading of said disc cassette, said moving means including a slide plate that is slidably mounted to said chassis, said slide plate having the other one of the first guide pin and first guide surface, and having the other one of the second guide pin and the second guide surface, wherein when said slide plate slides relative to said chassis from a first position to a second position, said first guide pin slides along said first guide surface to move said cassette holder from its upper position to its lower position, and said second guide pin slides along said second guide surface to shift said disc rotating mechanism from its lower position to its upper position.

9. An apparatus as set forth in claim 8, wherein:

said height-level positioning members are provided on four places of said chassis to support the bottom surface of said disc cassette in a vicinity of four corners of said disc cassette having a substantially square shape; and said cassette holder has projected portions downwardly projecting into said internal space and directly opposing the respective height-level positioning members.

10. An apparatus as set forth in claim 8, wherein said slide plate slides in a direction that is substantially perpendicular to the up and down movement of said cassette holder and said disc rotating mechanism.

\* \* \* \* \*